US012524571B2

(12) United States Patent
Han et al.

(10) Patent No.: US 12,524,571 B2
(45) Date of Patent: Jan. 13, 2026

(54) GENERATION OF VECTORS AND MAPPINGS OF CORRESPONDING DATA PORTIONS FOR RETRIEVAL AUGMENTED GENERATION USING BACKUP DATA

(71) Applicant: Rubrik, Inc., Palo Alto, CA (US)

(72) Inventors: Seungyeop Han, San Jose, CA (US); Adam Gee, Palo Alto, CA (US); Logan Short, Saratoga, CA (US)

(73) Assignee: Rubrik, Inc., Palo Alto, CA (US)

( * ) Notice: Subject to any disclaimer, the term of this patent is extended or adjusted under 35 U.S.C. 154(b) by 0 days.

(21) Appl. No.: 19/041,202

(22) Filed: Jan. 30, 2025

(65) Prior Publication Data

US 2025/0328431 A1   Oct. 23, 2025

Related U.S. Application Data

(60) Provisional application No. 63/637,524, filed on Apr. 23, 2024.

(51) Int. Cl.
*G06F 11/14* (2006.01)
*G06F 16/21* (2019.01)
*G06F 16/22* (2019.01)

(52) U.S. Cl.
CPC ........ *G06F 11/1464* (2013.01); *G06F 16/211* (2019.01); *G06F 16/2237* (2019.01); *G06F 2201/80* (2013.01)

(58) Field of Classification Search
None
See application file for complete search history.

(56) References Cited

U.S. PATENT DOCUMENTS

2025/0110834 A1* 4/2025 Karuppur Rajagopalan ............... G06F 11/1451

* cited by examiner

*Primary Examiner* — Eddy Cheung
(74) *Attorney, Agent, or Firm* — Rimon Law, P.C.

(57) ABSTRACT

Methods, apparatuses, and computer readable media are configured to perform operations comprising: obtaining, by a data management system (DMS), a first snapshot of a computing system; generating, by the DMS, one or more vectors based at least in part on data from the first snapshot, the one or more vectors representative of one or more respective portions of text within one or more files represented by the first snapshot; adding, by the DMS, the one or more vectors to a vector database along with metadata or a pointer to the metadata; storing, by the DMS, the one or more respective portions of text in a secondary storage environment; and adding, by the DMS to a mapping log, respective indications of mappings between the one or more vectors and the one or more respective portions of text.

20 Claims, 23 Drawing Sheets

GENERATION OF VECTORS AND MAPPINGS OF CORRESPONDING DATA PORTIONS FOR RETRIEVAL AUGMENTED GENERATION USING BACKUP DATA

CROSS-REFERENCE TO RELATED APPLICATIONS

This application claims priority to U.S. Provisional Patent Application No. 63/637,524, filed on Apr. 23, 2024 and entitled "RETRIEVAL AUGMENTED GENERATION USING BACKUP DATA", which is incorporated in its entirety herein by reference.

FIELD OF TECHNOLOGY

The present disclosure relates generally to data management, including techniques for retrieval augmented generation using backup data.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

SUMMARY

Various embodiments of the present technology can include methods, apparatuses, and computer readable media configured to perform operations comprising: obtaining, by a data management system (DMS), a first snapshot of a computing system; generating, by the DMS, one or more vectors based at least in part on data from the first snapshot, the one or more vectors representative of one or more respective portions of text within one or more files represented by the first snapshot; adding, by the DMS, the one or more vectors to a vector database along with metadata or a pointer to the metadata, wherein the metadata is associated with the data from the first snapshot; storing, by the DMS, the one or more respective portions of text in a secondary storage environment, wherein the vector database in conjunction with the secondary storage environment comprises a knowledge repository that is accessible to an application associated with the DMS, the application further associated with communication with a large language model (LLM); and adding, by the DMS to a mapping log, respective indications of mappings between the one or more vectors and the one or more respective portions of text.

In some embodiments, the methods, apparatuses, and computer readable media are configured to perform operations further comprising: receiving, by the DMS, configuration information that schedules the DMS to generate vectors for addition to the vector database in association with obtention of snapshots of the computing system, wherein generating the one or more vectors is based at least in part on the configuration information.

In some embodiments, the methods, apparatuses, and computer readable media are configured to perform operations further comprising: receiving, by the DMS within the configuration information, an indication to store the one or more respective portions of text in the secondary storage environment.

In some embodiments, the methods, apparatuses, and computer readable media are configured to perform operations further comprising: receiving, by the DMS within the configuration information, an indication of one or more types of files for which to generate vectors for addition to the vector database; and identifying, by the DMS, a set of files within the first snapshot comprising the one or more types of files, wherein the one or more vectors are generated based at least in part on the set of files.

In some embodiments, the methods, apparatuses, and computer readable media are configured to perform operations further comprising: determining, by the DMS, that two or more respective portions of text within the one or more files represented by the first snapshot satisfy a semantic similarity threshold, wherein storing the one or more respective portions of text comprises storing a single portion of text in the secondary storage environment based at least in part on the two or more respective portions of text satisfying the semantic similarity threshold, the single portion of text comprising one of the two or more respective portions of text.

In some embodiments, the methods, apparatuses, and computer readable media are configured to perform operations further comprising: determining, by the DMS, a satisfaction of a semantic similarity threshold between a respective portion of text of the one or more respective portions of text and a prior respective portion of text within one or more second files represented by a second snapshot of the computing system, the second snapshot corresponding to an earlier time than the first snapshot, wherein the prior respective portion of text is stored at the secondary storage environment; deleting, based at least in part on determining of the satisfaction of the semantic similarity threshold, the prior respective portion of text from the secondary storage environment; and deleting, based at least in part on determining of the satisfaction of the semantic similarity threshold and based at least in part on the mapping log, a vector from the vector database that corresponds to the prior respective portion of text.

In some embodiments, the methods, apparatuses, and computer readable media are configured to perform operations further comprising: determining, by the DMS, a satisfaction of a semantic similarity threshold between a respective portion of text of the one or more respective portions of text and a prior respective portion of text within one or more second files represented by a second snapshot of the computing system, the second snapshot corresponding to an earlier time than the first snapshot, wherein the prior respective portion of text is stored at the secondary storage environment; refraining, based at least in part on determining of the satisfaction of the semantic similarity threshold, from storing the respective portion of text in the secondary storage environment; and refraining, based at least in part on determining of the satisfaction of the semantic similarity threshold, from adding a vector that corresponds to the respective portion of text to the vector database.

In some embodiments, the metadata is indicative of an identifier for the first snapshot, an identifier of the computing system, or any combination thereof.

In some embodiments, the methods, apparatuses, and computer readable media are configured to perform operations further comprising: generating, by the DMS, one or more second vectors based at least in part on data from the first snapshot, the one or more second vectors representative of one or more second respective portions of text within one or more second files represented by the first snapshot; adding, by the DMS, the one or more second vectors to a second vector database along with second metadata or a second pointer to the second metadata, wherein the second metadata is associated with the data from the first snapshot; storing, by the DMS, the one or more second respective portions of text in the secondary storage environment, wherein the second vector database in conjunction with the secondary storage environment comprises a second knowledge repository that is accessible to a second application associated with the DMS, the second application further associated with communication with the LLM; and adding, by the DMS to the mapping log or a second mapping log, second respective indications of mappings between the one or more second vectors and the one or more second respective portions of text.

In some embodiments, the methods, apparatuses, and computer readable media are configured to perform operations further comprising: obtaining, by the DMS and subsequent to obtaining the first snapshot, a second snapshot of the computing system, wherein the second snapshot includes one or more second files that are modified with respect to the first snapshot; generating, by the DMS, one or more second vectors based at least in part on second data from the second snapshot, the one or more second vectors representative of one or more second respective portions of text within the one or more second files that are modified with respect to the first snapshot; adding, by the DMS, the one or more second vectors to the vector database along with second metadata or a second pointer to the second metadata, wherein the second metadata is associated with the second data from the second snapshot; storing, by the DMS, the one or more second respective portions of text in the secondary storage environment; and adding, by the DMS to the mapping log, second respective indications of mappings between the one or more second vectors and the one or more second respective portions of text.

It should be appreciated that many other embodiments, features, applications, and variations of the present technology will be apparent from the following detailed description and from the accompanying drawings. Additional and alternative implementations of the methods, systems, and non-transitory computer readable media, and structures described herein can be employed without departing from the principles of the present technology.

DETAILED DESCRIPTION

Figure 1:
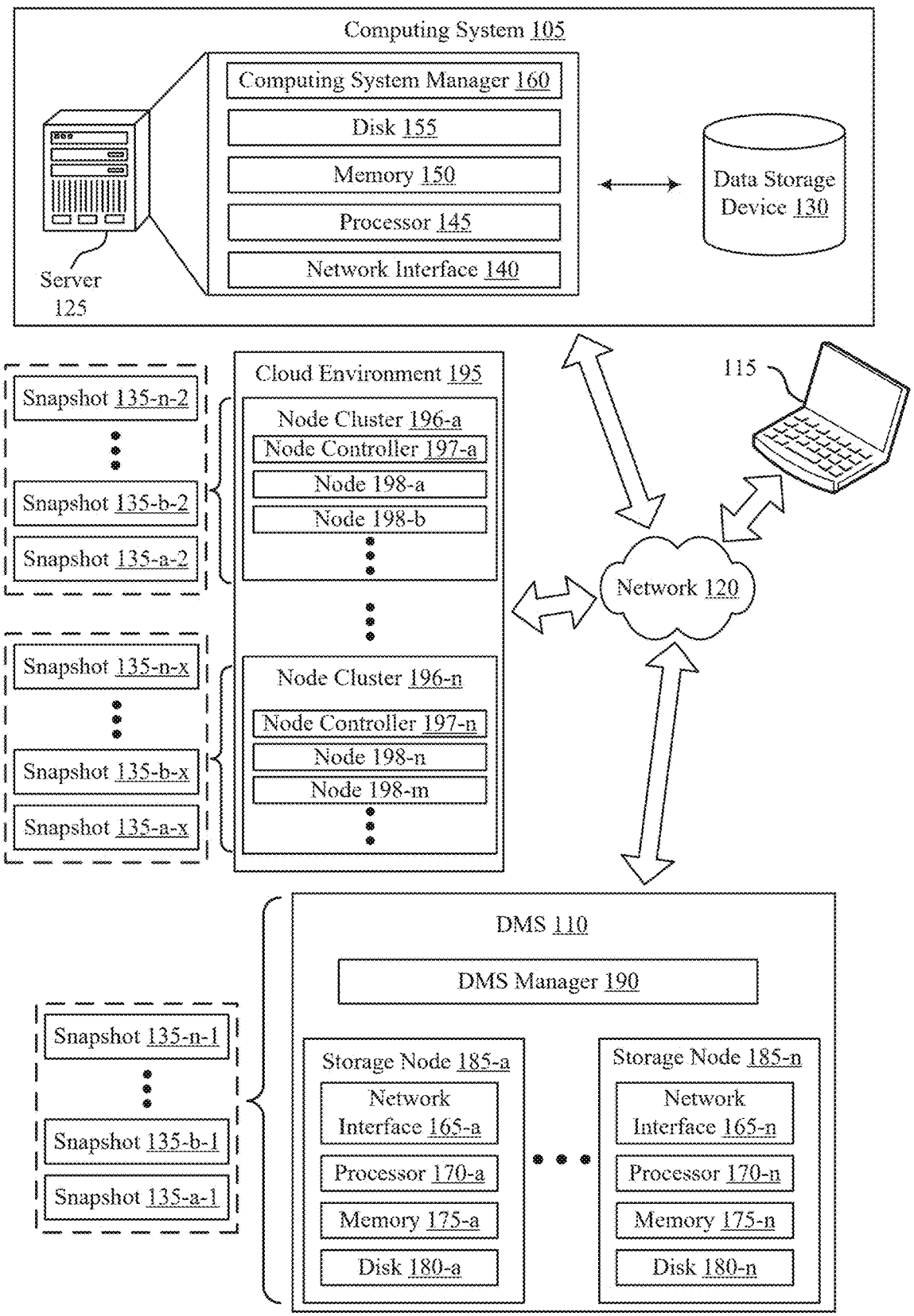
FIG. 1 illustrates an example of a computing environment that supports retrieval augmented generation (RAG) using backup data in accordance with aspects of the present disclosure.

A data management system (DMS) may include various nodes, clusters, and sub-systems that provide backup and recovery services, malware protection services, sensitive data classification services, or other services for one or more target computer systems. The DMS may implement or support a communication application (such as a chatbot or interactive user platform) that enables users to ask questions, troubleshoot problems, or initiate workflows associated with the one or more target computer systems. A user may initiate a communication session with the communication application by inputting a query or other message to the communication application (for example, via a user interface (UI) provided by the DMS). In turn, the communication application may use a large language model (LLM) to process and/or respond to the query or message submitted by the user. An LLM generally refers to a type of artificial intelligence (AI) model that is designed to understand and generate human-like text, image data, audio data, or video data based on patterns and information the LLM learns from various data sources. LLMs may be trained on large datasets that contain a wide range of human language, such as books, articles, websites, and other written content, as well as potentially image files, audio files, or video files. The communication application may send the user's message/query to the LLM in the form of a prompt.

To improve the accuracy and/or relevance of responses generated by LLMs, some communication applications may implement retrieval augmented generation (RAG). RAG uses techniques to retrieve relevant contextual information from an enterprise's or an organization's document corpus (e.g., based on input in the natural language of a query) to improve the response provided by an LLM to a query (e.g., by generating a prompt for the LLM that is based on the query as well as the contextual information, such that the prompt leads to an improved response by the LLM, as compared to a prompt based on the query alone). For example, RAG may leverage an enterprise's or an organization's data such as support documents, marketing documents, technical documents, or code snippets to provide context to an LLM. The document corpus may include structured data (e.g., tables, graphs, hierarchical data) and/or unstructured data (e.g., natural language text). Use of live enterprise data for RAG purposes, however, may involve significant information technology investment to generate data pipelines from the host of the live data to the communication application without disruption to use of the live data, among other potential complications or other drawbacks.

Aspects of the present disclosure relate to use of backup data managed by a DMS for RAG purposes. For example, the DMS may support or implement a communication application that operates with an LLM. For example, based on obtaining a snapshot of a customer computing system, the DMS may extract and organize data and metadata from the snapshot, and the DMS may generate one or more vectors based on the extracted data, which may be referred to as vector embedding. Vectors generated based on the extracted data may be referred to as embedded vectors. For example, the embedded vectors may be semantically representative of the extracted data. The DMS may store the embedded vectors in a vector database accessible to the communication application, to support RAG based on the embedded vectors and hence based on the backup data obtained by the DMS. RAG based on backup data as curated and maintained by the DMS (e.g., rather than live contents of the customer computing system) may beneficially avoid adversely affecting (e.g., infecting, loading, etc.) the computing system, may beneficially allow for more streamlined and customizable implementations of various communication applications (e.g., chatbots) associated with the various services supported by the DMS, or any combination thereof, along with other potential benefits.

In some examples, the DMS may link portions of text within files of (e.g., represented by) the snapshots (e.g., the portions of text for which the vectors are semantically representative) to the corresponding vectors via a mapping log, and the DMS may store the portions of data in a secondary storage environment (e.g., separate from the vector database). Data for RAG may be identified based on the embedded vectors and based on the context or purpose of a communication session (e.g., based on contextual information corresponding to the associated communication application, contextual information corresponding to one or more queries, the content of one or more queries, or any combination thereof). In some examples, the portions of text may be stored along with the embedded vectors in the vector database. Accordingly, the DMS may retrieve the portions of the data for RAG purposes from the secondary storage environment using the mapping log, based on the corresponding identified vectors, or from the vector database, depending on implementations. For example, different vectors in a vector database may be identified based on the context or purpose of a communication session, and the DMS may retrieve the corresponding portions of data based on the corresponding identified vectors, to generate improved (e.g., retrieval-augmented) prompts for an LLM.

As additional snapshots of a computing system are captured, the DMS may update the vector database and/or the secondary storage environment with the new information included in the additional snapshots. The DMS may perform deduplication so that identical or highly similar portions of data are not embedded into vectors and stored at the vector database and/or a secondary storage environment more than once. In some examples, files or portions of files containing sensitive data (e.g., personal identifiable information (PII)) may be filtered out from the embedding process for some vector databases (e.g., based on the purpose of the corresponding communication application). These and other aspects of the present disclosure are further explained elsewhere herein, including with reference to the accompanying figures.

FIG. 1 illustrates an example of a computing environment 100 that supports RAG using backup data in accordance with aspects of the present disclosure. The computing environment 100 may include a computing system 105, a DMS 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally, or alternatively, a computing device 115 may output (e.g., display) data or other information received from the computing system 105, the DMS 110, or both. A user of a computing device 115 may, for example, use the computing device 115 to interact with one or more UIs (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random access memory (SRAM), dynamic random access memory (DRAM), read-only memory (ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. A computing object of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described below.

To obtain a snapshot 135 of a target computing object associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target computing object into a frozen state (e.g., a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot 135 to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally, or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally, or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots 135, including for the same computing object. For example, the DMS 110 may store both base snapshots 135 and incremental snapshots 135. A base snapshot 135 may represent the entirety of the state of the corresponding computing object as of a point in time corresponding to the base snapshot 135, and may alternatively be referred to as a full snapshot. An incremental snapshot 135 may represent the changes to the state-which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a base snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a base snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally, or alternatively, the DMS 110 may detect whether aspects of the computing system 105 have been impacted by malware (e.g., ransomware). Additionally, or alternatively, the DMS 110 may relocate data or create copies of data based on using one or more snapshots 135 to restore the associated computing object within its original location or at a new location (e.g., a new location within a different computing system 105). Additionally, or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely affecting (e.g., infecting, loading, etc.) the computing system 105.

In some examples, the DMS 110, and in particular the DMS manager 190, may be referred to as a control plane. The control plane may manage tasks, such as storing data management data or performing restorations, among other possible examples. The control plane may be common to multiple customers or tenants of the DMS 110. For example, the computing system 105 may be associated with a first customer or tenant of the DMS 110, and the DMS 110 may similarly provide data management services for one or more other computing systems associated with one or more additional customers or tenants. In some examples, the control plane may be configured to manage the transfer of data management data (e.g., snapshots 135 associated with the computing system 105) to a cloud environment 195 (e.g., Microsoft Azure or Amazon Web Services). In addition, or as an alternative, to being configured to manage the transfer of data management data to the cloud environment 195, the control plane may be configured to transfer metadata for the data management data to the cloud environment 195. The metadata may be configured to facilitate storage of the stored data management data, the management of the stored management data, the processing of the stored management data, the restoration of the stored data management data, and the like.

Each customer or tenant of the DMS 110 may have a private data plane, where a data plane may include a location at which customer or tenant data is stored. For example, each private data plane for each customer or tenant may include a node cluster 196 across which data (e.g., data management data, metadata for data management data, etc.) for a customer or tenant is stored. Each node cluster 196 may include a node controller 197 which manages the nodes 198 of the node cluster 196. As an example, a node cluster 196 for one tenant or customer may be hosted on Microsoft Azure, and another node cluster 196 may be hosted on Amazon Web Services. In another example, multiple separate node clusters 196 for multiple different customers or tenants may be hosted on Microsoft Azure. Separating each customer or tenant's data into separate node clusters 196 provides fault isolation for the different customers or tenants and provides security by limiting access to data for each customer or tenant.

The control plane (e.g., the DMS 110, and specifically the DMS manager 190) manages tasks, such as storing backups or snapshots 135 or performing restorations, across the multiple node clusters 196. For example, as described herein, a node cluster 196-a may be associated with the first customer or tenant associated with the computing system 105. The DMS 110 may obtain (e.g., generate or receive) and transfer the snapshots 135 associated with the computing system 105 to the node cluster 196-*a* in accordance with a service level agreement for the first customer or tenant associated with the computing system 105. For example, a service level agreement may define backup and recovery parameters for a customer or tenant such as snapshot generation frequency, which computing objects to backup, where to store the snapshots 135 (e.g., which private data plane), and how long to retain snapshots 135. As described herein, the control plane may provide data management services for another computing system associated with another customer or tenant. For example, the control plane may generate and transfer snapshots 135 for another computing system associated with another customer or tenant to the node cluster 196-*n* in accordance with the service level agreement for the other customer or tenant.

To manage tasks, such as storing backups or snapshots 135 or performing restorations, across the multiple node clusters 196, the control plane (e.g., the DMS manager 190) may communicate with the node controllers 197 for the various node clusters via the network 120. For example, the control plane may exchange communications for backup and recovery tasks with the node controllers 197 in the form of transmission control protocol (TCP) packets via the network 120.

In some examples, the DMS 110 may support one or more communication applications (such as chatbots or interactive user platforms), each of which may enable users to ask questions, troubleshoot problems, or initiate workflows. A user may initiate a communication session with a communication application by inputting (e.g., transmitting) a query or other message to the communication application (for example, via a UI provided by the DMS 110 displayed at a computing device 115). The communication application may use an LLM to process and/or respond to the message submitted by the user. For example, the LLM may be hosted in the cloud environment 195. The communication application may send the user's queries to the LLM in the form of a prompt. To improve the accuracy and/or relevance of responses generated by the LLM, the communication application may implement RAG to improve or otherwise contextualize prompts.

RAG uses techniques to retrieve relevant information from an enterprise's or an organization's document corpus (e.g., based on input in the natural language of a query) to provide a prompt with appropriate context to an LLM. For example, an organization or an enterprise may be a customer of the DMS 110. RAG may leverage enterprise or organization data such as support documents, marketing documents, technical documents (e.g., requirements documents, data sheets, or product manuals), or code snippets to provide context to an LLM (e.g., by generating and providing to the LLM improved or otherwise contextualized prompts).

For example, RAG may pull relevant documents or portions of documents from a knowledge source or database, such as via a vector search, a traditional search (e.g., keyword-based search), or a hybrid search. The documents or portions of documents may be represented as vectors embedded using an embedding model and stored in a vector database. Based on a search query, a RAG process may identify the top k most relevant vectors (e.g., based on semantic similarity between the search query and the vectors). The search query may be a vector representation of the text in a query received from a user of a chat application or communication application. For example, the search query may be embedded into a vector using an embedding model. The amount k of results may be configurable. The portions of documents that correspond to the identified top k vectors may be retrieved and concatenated to the query, and the query concatenated with the portions of documents that correspond to the identified top k vectors may be provided as a prompt to the LLM. In some examples, the final set of portions of documents may be selected from a candidate set (e.g., the set of k documents corresponding to the k vectors) using a re-ranking process. For example, the RAG process may implement a 2-stage retrieval process. Thus, a RAG process may identify documents or portions of documents from an organization's or an enterprise's document corpus that may provide context for an LLM to provide a more accurate or relevant response. An organization's or an enterprise's document corpus may include millions or billions of documents, and accordingly, full text searching may not be scalable or practical. Accordingly, for searching purposes, the portions of documents may be represented as semantic vectors which may be searched using search techniques such as nearest neighbor search techniques such as hashing, hierarchical navigable small worlds graphs, or product quantization to quickly return nearest matches to a search query (e.g., based on the vector representation of the search query).

The DMS 110 may use backup data (e.g., data from snapshots 135) for RAG purposes. For example, based on obtaining a snapshot 135 of the computing system 105, the DMS 110 may extract and organize data, metadata, or both from snapshots and embed the extracted data into one or more vectors. For example, text portions from files of (e.g., represented by) the snapshots may be embedded as vectors using vector generation models such as embedding models produced by OpenAI (e.g., text-embedding-ada-002 or text-embedding-3-small/large), Bidirectional Encoder Representations from Transformers (BERT), sentence BERT (SBERT), Word2vec, or Global Vectors. Such vector embedding models may take text as input and output numerical vectors that capture the semantic meaning of the text, allowing similar pieces of text to be represented by similar vectors.

For example, the vectors may be semantically representative of the extracted data from files in the snapshots 135. The DMS 110 may store the embedded vectors in a vector database accessible to the communication application supported or implemented by the DMS 110. For example, the vector database may be implemented by any suitable functionality or combination (e.g., Pinecone, Azure AI Search, Milvus, etc.). The vector database may be stored locally at the DMS 110 or may be hosted remotely (e.g., in the cloud environment 195). In some examples, the DMS 110 may link portions of text within files of the snapshots (e.g., the portions of data for which the vectors are semantically representative) to the corresponding vectors via a mapping log, and the DMS 110 may store the portions of data in a secondary storage environment (e.g., separate from the vector database). For example, the secondary storage environment may be hosted locally at the DMS 110 or may be hosted remotely (e.g., in the cloud environment 195). In some examples, the portions of text may be stored along with the embedded vectors in the vector database. In some examples, the metadata corresponding to the embedded vectors may be stored separately from the vector database (e.g., in a secondary storage environment) and the vector database may include pointers to the location at which the metadata corresponding to the embedded vectors is stored. Additionally or alternatively, the metadata that corresponds to the embedded vectors may be stored in the vector database along with the embedded vectors.

Data for RAG purposes may be identified based on the embedded vectors and based on the context of a communication session or the context of a query. Accordingly, the DMS 110 may retrieve the portions of the data from the secondary storage environment using the mapping log based on the corresponding identified vectors, or the DMS 110 may retrieve the portions of the data from the vector database, depending on implementation. For example, different vectors in a vector database may be identified based on the context or purpose of a communication session (e.g., based on similarity to a vector representation of the query received from a user), and the DMS 110 may retrieve the corresponding portions of data based on the corresponding identified vectors.

In some examples, the DMS 110 may perform one or more windowing processes when performing retrieval. For example, based on identifying k vectors as described above, the DMS 110 may retrieve k portions of text that correspond to the k vectors as well as additional portions of text related to those k portions of text. The additional portions of text may be larger portions of text from the same files as the k portions of text and that include one or more of the k portions (e.g., the DMS 110 may retrieve an entire file based on identifying any vector from a file). Additionally or alternatively, the additional portions of text may be portions of text that are separate but related to the k portions of text (e.g., adjacent to one or more of the k portions of text within a file, or within a same portion or section of a file as one or more of the k portions of text). For example, one or more respective portions of text that are adjacent to or surround at least one of the k portions of text within a file may be retrieved. Further, in some cases, the size (e.g., extent, amount) of additional text that is retrieved based on being adjacent to or surrounding at least one of the k portions may be configurable (e.g., by an administrator or user of the DMS 110). Such windowing processes may be used to provide additional context for the LLM, among other potential benefits.

As additional snapshots of the computing system 105 are captured, the DMS 110 may update the vector database and the secondary storage environment with the new information included in the additional snapshots. The DMS 110 may perform deduplication so that identical or highly similar portions of data may not be embedded into vectors and stored at the vector database or a secondary storage environment more than once.

In some examples, the DMS 110 may implement multiple communication applications (e.g. chatbots) for different purposes (e.g., for human resources, for engineering, for accounting, for tech support, for customer service, etc.). Each communication application may be associated with a corresponding vector database. Accordingly, the DMS may generate multiple sets of vectors for multiple vector databases from the same snapshot. In some examples, files or portions of files containing sensitive data (e.g., PII) may be filtered out from the embedding process for some vector databases (e.g., based on the purpose of the corresponding communication application), which may be referred to as negative filtering. For example, some sensitive data may be filtered out for the vector database associated with the tech support communication application but may not be filtered out for the vector database associated with the human resources communication application. Additionally or alternatively, filtering techniques may be used to identify (e.g., select) files or portions of files to which to apply the embedding process, which may be referred to as positive filtering. In some examples, different chunking mechanisms (e.g., mechanisms to extract portions of text from files, such as the size of the portions in characters, sentences, or paragraphs) and/or embedding models may be selected for the different vector databases. In some examples, the chunking mechanisms and/or embedding models for a given vector database may be updated or reconfigured (e.g., by an administrator or user of the DMS 110). For example, chunks may be extracted from files at a paragraph level of granularity (e.g., with paragraphs in a file being extracted or not extracted on a whole-paragraph basis). In some examples, chunks may have a fixed size (e.g., a fixed quantity of characters). And in some examples, chunking mechanisms may use semantic parsing, which may include converting natural language content within files into machine-readable meaning representations (MRs) and intelligently (e.g., dynamically) sizing chunks based on the semantic meaning of the content (e.g., to avoid including semantically unrelated content and avoid excluding semantically related content). Thus, for example, an initially identified chunk (e.g., at a paragraph or other level of granularity) may be broken into several smaller chunks based on semantic parsing, before embedding, if a larger chunk size would include several different semantic topics. Right-sizing chunks may improve RAG performance by avoiding unrelated context being provided to the LLM, by helping to ensure that related context is provided to the LLM, or both, among other possible benefits.

Figure 2:
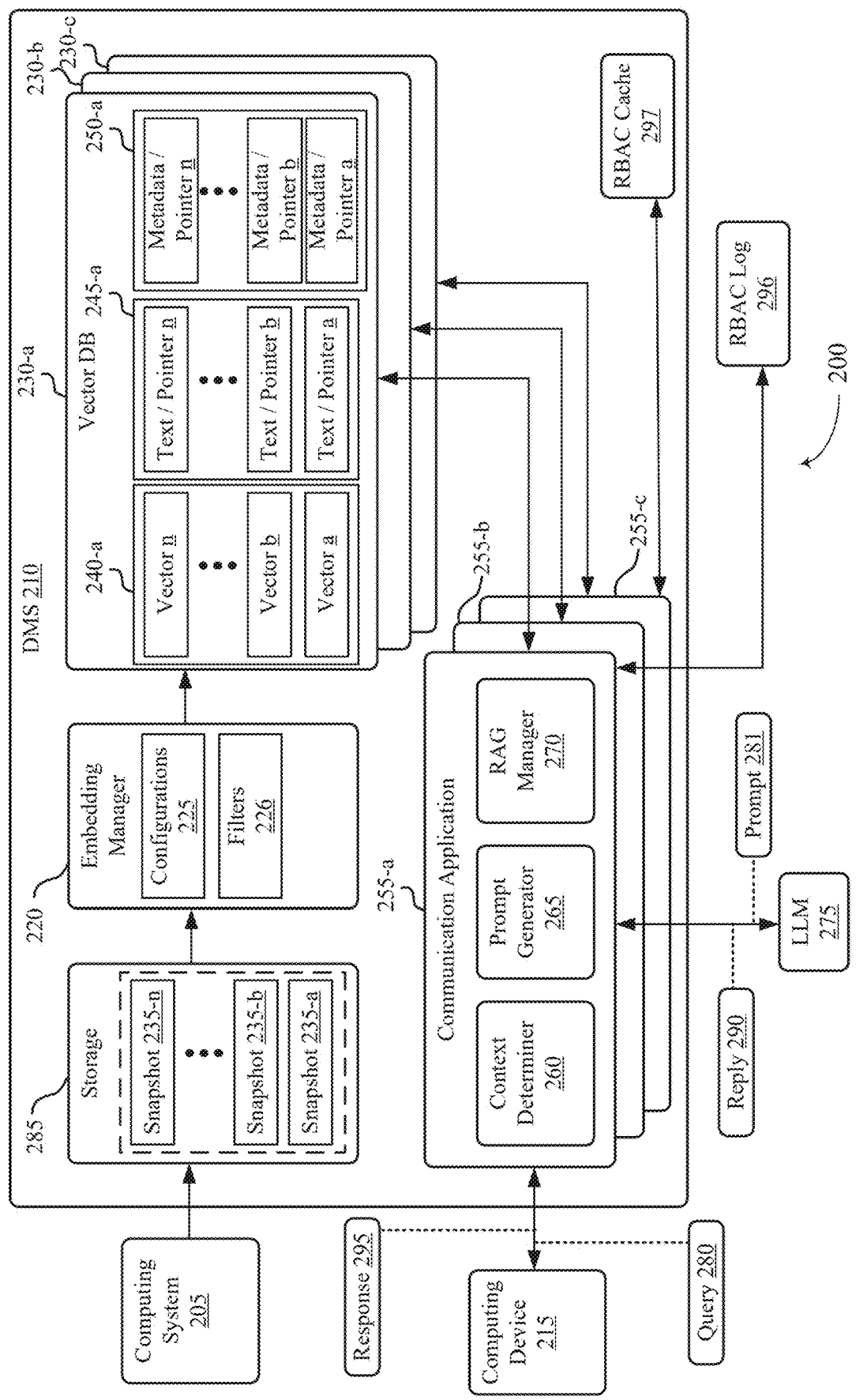
FIG. 2 shows an example of a computing environment that supports RAG using backup data in accordance with aspects of the present disclosure.

FIG. 2 shows an example of a computing environment 200 that supports RAG using backup data in accordance with aspects of the present disclosure. The computing environment 200 may implement one or more aspects of the computing environment 100. For example, the computing environment 200 includes a DMS 210, which may be an example of a DMS 110 as described with reference to FIG. 1. The computing environment 200 also includes a computing system 205, which may be an example of a computing system 105 as described with reference to FIG. 1. The computing environment 200 also includes a computing device 215, which may be an example of a computing device 115 as described with reference to FIG. 1.

The DMS 210 may provide backup and recovery services for customer computing systems. For example, the DMS 210 may capture snapshots 235 of the computing system 205 (e.g., a snapshot 235-a, a snapshot 235-b, . . . , a snapshot 235-n). The computing system 205 may be associated with a customer of the DMS 210. In some examples, the DMS 210 may capture snapshots 235 of multiple computing systems 205 associated with the same customer. The DMS 210 may store the snapshots 235 in a storage node 285, which may be stored locally at the DMS 210 (e.g., may be storage nodes 185 as described with reference to FIG. 1) or may be stored remotely (e.g., may be at one or more node clusters 196 in the cloud environment 195 as described with reference to FIG. 1).

The DMS 210 may implement one or more communication applications 255 that operate with an LLM 275. In some examples, the one or more communication applications 255 may communicate with the LLM 275 using Microsoft Copilot or other LLM-based services. For example, a user of the DMS 210 (e.g., an administrative user of the DMS 210 or a customer of the DMS 210) may communicate with the communication applications 255 in the form of queries 280 and responses 295. For example, the communication application 255-a may be a chatbot or an interactive user platform that may enable a user at a computing device 215 to ask questions, troubleshoot problems, or initiate workflows. For example, the user may input a query 280 via the computing device 215 (e.g., via a UI at the computing device 215). The communication application 255-a may receive the query 280 and generate a prompt 281 based on the query 280. For example, the communication application 255-a may include a prompt generator 265 which generates the prompt 281 based on the query 280.

In some examples, the communication application 255-a may implement query expansion techniques (e.g., prior to generation of the prompt 281 or along with the prompt 281). For example, the communication application 255-a may be configured to transmit the query 280 to the LLM 275 and to request that the LLM expand the query 280 using context specific to the communication application 255-a (e.g., based on the purpose of the communication application, such as HR, accounting, tech support, engineering, etc.). For example, query expansion may involve addition of terms to a query such as synonyms, related (e.g., semantically related) words, or other terms likely to appear in relevant documents. For example, the context of the communication application 255-a may be configurable by an administrator of the DMS 210. In response to the request that the LLM expand the query 280, the LLM 275 may return an expanded query based on the context of the communication application 255-a or query 280, and the RAG manager 270 may then use the expanded query for a RAG process as described herein. For example, the communication application 255-a may use the expanded query to generate the prompt 281. In some examples, the RAG manager 270 may perform RAG based on the query 280 from the computing device, and the communication application 255-a may request that the LLM 275 perform query expansion in the prompt 281 (e.g., request that the LLM 275 add additional context terms to the prompt 281).

The communication application 255-a may transmit the prompt 281 to the LLM 275. The LLM 275 may transmit a reply 290 to the prompt 281 to the communication application 255-a. The communication application 255-a may provide a response 295 to the query 280 to the user (e.g., may display the response 295 on a UI of the computing device 215) based on the reply 290. LLMs 275 may be stateless. In other words, to get the LLMs 275 to retain/consider all relevant information/context, the communication applications 255 may include all previous states and context as part of the prompt 281. Accordingly, the communication application 255-a may maintain a record of previous queries 280, prompts 281, replies 290, and/or responses 295, which may be used by the prompt generator 265 to generate the prompt 281.

To improve the accuracy and/or relevance of replies 290 generated by the LLM 275, the one or more communication applications 255 supported or implemented by the DMS 210 may implement RAG. The DMS 210 may implement RAG for a given customer of the DMS 210 using back up data (e.g., the snapshots 235) of the customer's computing system(s) 205.

For example, for a given customer, the DMS 210 may include or may have access to one or more vector databases 230 which may be used for RAG for the communication applications 255 associated with that customer. For example, the vector database(s) 230 may be hosted locally at the DMS 210 or may be implemented in a remote storage environment (e.g., may be hosted in the cloud environment 195 as described with reference to FIG. 1). Each communication application 255 implemented or supported by the DMS 210 may have an associated vector database 230 (e.g., the communication application 255-a may be associated with the vector database 230-a for RAG, the communication application 255-b may be associated with the vector database 230-b for RAG, and the communication application 255-c may be associated with the vector database 230-c for RAG). Each vector database 230 may include vectors 240 and corresponding portions of text 245 or pointers to the corresponding portions of text 245 and metadata 250 or pointers to corresponding metadata. In some examples, for example, as described with reference to FIG. 3, the portions of text 245 and/or the metadata may be stored in a secondary storage environment (e.g., in a database separate from the vector database 230). In some such examples, the vector database 230 may include pointers to the locations where the portions of text 245 and/or the metadata 250 for each vector 240 are stored (e.g., to retrieve the portions of text 244 for RAG purposes). In some other examples, for example, as described with reference to FIG. 3, the DMS 210 may update a mapping log which may associate each vector 240 with locations where the corresponding portions of text 245 and/or metadata 250 are stored. The DMS 210 may generate the vectors 240 using data from the snapshots 235. For example, the DMS 210 may include an embedding manager 220 (e.g., which may alternatively be referred to as an embedding factory) which may retrieve a snapshot 235 from the storage node 285 and may generate one or more vectors 240 using the data from the snapshot 235 in accordance with configurations 225 and/or one or more filters 226 (e.g., positive or negative filters). For example, the embedding manager 220 may generate vectors from snapshot data (e.g., text from files of a snapshot 235) using a vector embedding model as described herein. In some examples, the portions of text 245 may have a fixed or a maximum size, which may be configurable at the embedding manager 220 or may be based on the configuration of the vector database 230.

In some examples, where the DMS 210 may implement multiple communication applications 255, each communication application 255 may be associated with a corresponding vector database 230 for RAG, and the DMS 210 may implement multiple embedding managers 220. For example, each vector database 230 may be associated with a different embedding manager 220 which may generate vectors for that database. For example, each embedding manager 220 may have separate configurations 225 (e.g., which types of files to embed, chunking mechanisms, and/or embedding models) and separate filters 226.

The DMS 210 (e.g., the embedding manager 220) may store the one or more vectors 240 generated for a given snapshot in accordance with the configurations 225 and/or the filters 226 in the corresponding vector database 230 along with metadata 250 or a pointer to the metadata that is associated with the vectors. The metadata 250 may indicate which snapshot 235 (e.g., the time of the snapshot, the identifier of the snapshot, and/or the computing system of the snapshot) and/or which file in a snapshot 235 a given vector was generated from. In some examples, the metadata may be stored in a remote storage environment (e.g., other than the vector database 230), and the vector database 230 may include a pointer for each vector 240 to the associated metadata. Each vector 240 may be semantically representative of an extracted portion of text 245 from a given snapshot 235. The portions of text 245 that correspond to each vector 240 may be stored along with the vectors 240 in the vector databases 230. In some examples, the portions of text 245 that correspond to each vector 240 may be stored in a remote storage environment (e.g., other than the vector database 230), and the vector database 230 may include a pointer for each vector 240 to the associated portion of text 245. In some examples, as described with reference to FIG. 3, the DMS 210 may implement or use a mapping log, which may associate each vector 240 with locations (e.g., the remote storage location) where the corresponding portions of text 245 and/or metadata 250 are stored.

For example, the DMS 210 may capture a snapshot 235-a of the computing system 205 at a first time and the DMS 210 may store the snapshot 235-a in the storage node 285. The DMS 210 may be configured to generate vectors 240-a for addition to the vector database 230-a using snapshots 235 of the computing system 205. For example, an administrator of the DMS 210 may add a configuration 225 to the embedding manager 220 that indicates to generate vectors 240-a for addition to the vector database 230-a using snapshots 235 of the computing system 205. In some examples, the DMS 210 may be configured to generate vectors 240-a from snapshots 235 of a given computing system 205, periodically or on some other scheduled or triggered basis. In some examples, the embedding manager 220 may be configured to generate vectors 240 as the snapshots 235 are acquired. For example, the embedding manager 220 may tail the storage node(s) 285 and/or may be provided the schedule at which snapshots 235 of the computing system are acquired.

The embedding manager 220 may generate one or more vectors 240-a for addition to the vector database 230-a from the data of the snapshot 235-a in accordance with the configurations 225 and/or the filters 226. Each vector 240-a of the one or more vectors 240-a may be semantically representative of an extracted portion of text 245-a from the snapshot 235-a. The embedding manager 220 may add the generated vectors 240-a along with the associated extracted portion of text 245-a from the snapshot 235-a and associated metadata 250. In some examples, the embedding manager 220 may store the extracted portion of text 245-a from the snapshot 235-a and/or associated metadata 250 in a remote storage environment and may store pointers for the extracted portion of text 245-a and associated metadata 250 in the vector database 230. The associated metadata may indicate the snapshot 235-a (e.g., a snapshot ID or a time of the snapshot), the computing system 205, and/or the file within the snapshot 235-a from which the extracted portion of text 245-a was extracted. In some examples, the configurations 225 may include a configuration 225 that indicates which types of files (e.g., by file name, file type, or tag in metadata of the file) to generate the vectors 240 for addition to the vector database 230-a. The embedding manager 220 may identify files within the snapshot 235-a that match the configuration 225 and may add vectors 240 for those files to the vector database 230-a (e.g., and may not add vectors 240-a to the vector database 230-a for files that do not match the configuration 225).

In some examples, the filters 226 may include one or more rules for determining whether to input (e.g., subject) a file or a portion of a file to the embedding process, such as by determining whether a file or a portion of a file includes sensitive information. For example, the one or more rules may be based on a file type, inclusion of one or more keywords in a file name, inclusion of one or more keywords in text of a file, inclusion of one or more types of data in a file structures (e.g., the text structure of a social security number or credit card number), or a semantic similarity to known sensitive information (e.g., text of sensitive information flagged as sensitive). In some examples, the embedding manager 220 may filter out files or portions of files that are identified as including sensitive information from vector generation for addition of vectors 240-a to the vector database 230-a, which may be referred to as negative filtering. For example, the embedding manager 220 may not generate vectors for addition to the vector database 230-a for files or portions of files (e.g., paragraphs or other chunks of text) in the snapshot 235-a that are identified based on the filter(s) 226 as including sensitive data. Filtering out sensitive data at a sub-file level of granularity (e.g., filtering out portions of files) may in some cases alternatively be referred to as masking the sensitive data. Accordingly, the corresponding communication application 255-a for the vector database 230-a may not have access to the sensitive information and may not include the sensitive information in the prompt 281 and/or may not provide the sensitive information to the user of the computing device 215 in a response 295. Additionally or alternative, filtering techniques may be used to identify (e.g., select) files or portions of files to which to apply the embedding process, which may be referred to as positive filtering.

As described herein, the DMS 210 may implement multiple communication applications 255 which may each be associated with a corresponding vector database 230 for RAG. The communication applications 255 may be used for different purposes (e.g., HR, engineering, technical support, accounting, troubleshooting) and/or for different customer roles (e.g., HR personnel, management/supervisor roles, information technology). Accordingly, filters 226 may be configured differently for the different vector databases 230. For example, the communication application 255-b may be used by or for HR personnel of the customer, and accordingly may have fewer filters for sensitive information (e.g., for PII) than a communication application 255 (e.g., the communication application 255-c) used for technical support as responses to queries 280 for HR purposes may demand such access to sensitive information (e.g., PII).

Similarly, different files or portions of data may be used for RAG purposes for the different communication applications 255. Accordingly, the configurations 225 may configure the embedding manager 220 to generate vectors 240 for different types of files for the various vector databases 230. For example, the configurations 225 may indicate for the embedding manager 220 to generate and add vectors 240 for a first set of file types for the vector database 230-a, to generate and add vectors 240 for a second set of file types for the vector database 230-b, and to generate and add vectors for a third set of file types for the vector database 230-c. For example, a communication application 255 used for HR purposes may use different types of files (e.g., employment records, employee handbooks, employment rules and codes, etc.) for RAG purposes than the types of files used for communication application used for RAG purposes for technical support (technical frequently asked questions (FAQs) and responses, data sheets, product manuals, etc.). Accordingly, the configurations 225 may indicate which types of files for which to generate and add vectors for the various vector databases 230. For example, based on the configurations 225 and filters 226, the embedding manager 220 may generate and add a first set of vectors 240-a to the vector database 230-a from a first set of files of the snapshot 235-a, generate and add a second set of vectors 240-b (not shown) to the vector database 230-b from a second set of files of the snapshot 235-a, and generate and add a third set of vectors 240-c (not shown) to the vector database 230-c from a third set of files of the snapshot 235-a. The first, second, and/or third set of files may be overlapping (e.g., in whole or in part) depending on the configurations 225 and filters 226.

As described herein, the vector databases 230 may be used for RAG purposes for the communication applications 255. For example, the communication application 255-*a* may use the vectors 240-*a* to search for information (e.g., the corresponding portions of text 245-*a*) to include in a prompt 281 based on context associated with a query 280. For example, for a given query 280, the communication application 255-*a* may determine contextual information associated with the given query. For example, contextual information may be semantic meaning of the query 280 (e.g., based on a vector representation of the query 280 generated using an embedding model), a purpose of the query 280, past queries and/or responses, or keywords in the query. In some examples, the communication application 255-*a* may include a context determination manager 260 which may determine contextual information for the query 280. Based on the contextual information associated with the query 280, the communication application 255-*a* (e.g., a RAG manager 270 of the communication application 255-*a*) may retrieve information from the vector database 230-*a* using the vectors 240-*a* which have been added to the vector database 230-*a*. For example, the RAG manager 270 may identify a set of vectors 240-*a* stored in the vector database 230-*a* that satisfy a semantic similarity threshold with the contextual information, and the RAG manager 270 may retrieve the portions of text 245-*a* that correspond to the identified set of vectors 240-*a* from the vector database 230-*a* or from a remote storage location based on a pointer stored in the vector database 230-*a*.

The prompt generator 265 may include those retrieved portions of text in the prompt 281 which is provided to the LLM 275. Accordingly, the LLM 275 may consider the retrieved portions of text 245-*a* when generating the reply 290. In some examples, prior to generating the prompt 281, the communication application 255-*a* (e.g., the RAG manager 270) may perform one or more types of post-filtering on the retrieved portions of text 245-*a* or vectors 240-*a*. For example, the DMS 210 may implement role-based-access-control (RBAC) as described elsewhere herein to filter out files, filter out portions of text 245-*a*, or any combination thereof such that portions of text 245-*a* from more recently modified or added files are weighted more heavily (e.g., so that the LLM 275 considers more recent information when generating the reply 290).

The communication application 255-*a* may provide a response 295 to the query 280 based on the reply 290 received from the LLM 275. In some examples, the reply 290, the response 295, or both may include an indication of the source files or documents (e.g., corresponding to the portions of text 245-*a*) that were used to generate the reply 290 (and hence also the response 295). For example, the reply 290, the response 295, or both may include links or other identifiers for documents or files used by the LLM 275 to generate the reply 290, which may enable a user of the computing device that is interacting with the communication application 255-*a* to verify the information provided by the communication application 255-*a* in the response 295.

In some examples, the DMS 210 may implement RBAC based on access to the various communication applications 255 to allowed users (e.g., based on user credentials of a user at the computing device 215). For example, a given communication application 255 may only be available (e.g., may be displayed at a UI of a computing device 215) to a user having access to the given communication application. In some examples, an RBAC log 296 accessible to the DMS 210 (e.g., stored at the DMS 210 or stored at a location which the DMS 210 can access, such as via an application programming interface (API) call) may store a log of which user accounts have access to which communication applications 255.

In some examples, the RAG manager 270 may implement RBAC on a document or file basis, such that retrieval of the portions of text 245 or use of portions of text 245 in generation of a prompt 281 may be based on the permissions of the source files from which the portions of text 245 are extracted. For example, in the case that the vector database 230-*a* stores pointers for the portions of text 245-*a* that correspond to vectors 240-*a*, for a query 280, the RAG manager 270 may return a set of pointers to the portions of text 245-*a* that correspond to a set of vectors 240-*a* based on the query 280. In some examples, the RAG manager 270 may filter out files which are not readable or accessible to the user who provided the search query prior to retrieval of the portions of text based on the pointer (e.g., for generation of the prompt 281). For example, RBAC may be implemented to avoid providing portions of a file to a user in a response 295 where the user is not allowed to access that file. For example, the RAG manager 270 may use a query authorizedDocuments (user, documents) which may provide a subset of the "documents" in the authorizedDocuments query which the user in the authorizedDocuments query is allowed to access. For example, the documents in the set of documents in the authorizedDocuments query may be the set of files from which the portions of text 245-*a* corresponding to the set of vectors 240-*a* returned for a given query 280 are extracted. For example, the files corresponding to given vectors 240-*a* and/or portions of text 245-*b* may be identified based on the corresponding metadata 250-*a* or pointers to the corresponding metadata in the vector database 230-*a*. The authorizedDocuments may internally resolve, for each document in the authorizedDocuments query, a query isAuthorized (principal, document), which may output a Boolean (e.g., yes or no). The principal in the isAuthorized query may be the user who submitted the query 280 or a group to which the user belongs. In some examples, the RBAC log 296 may include an indication of which documents or files are accessible to which principal.

In some examples, the user may log into the DMS 210 (e.g., may access the communication application 255-*a*) via a single sign on (SSO), and the SSO log in may provide the DMS 210 with information about which groups the user belongs to and/or which files the user is allowed to access.

In some examples, to reduce latency associated with RBAC, the quantity of returned documents or files for a given query 280 may be limited. For example, RAG may be limited to 100 portions of text 245-*a* or to retrieving portions of text 245-*a* from 100 different source files. In some examples, relevance scores for RAG retrieval may be raised (e.g., the semantic similarity threshold may be raised) to reduce the quantity of returned documents and/or to avoid retrieving potentially irrelevant documents.

In some examples, the RBAC log 296 may be implemented at a remote location (e.g., in the cloud environment 195), and the DMS 210 (e.g., the RAG manager 270) may perform an API call to retrieve a list of permissions for RBAC filtering for responding to a query 280 for a given user. For example, the RBAC log 296 may store a list of which files particular users or groups of users are allowed to access. Permissions for source files or data can be accessed through associated APIs. For example, permissions for OneDrive files can be accessed through a OneDrive API, permissions for Jira data can be accessed through a Jira API (Atlassian API), and the like. In some examples, the DMS 210 may cache retrieved permissions, for example, in an RBAC cache 297. For example, the DMS 210 may periodically query the RBAC log 296 (e.g., every 15 minutes) and may cache retrieved permissions in the RBAC cache 297 such that the DMS 210 may not query the permissions from the RBAC log 296 in response to a query 280 (e.g., at production time) and instead may use cached permissions for RBAC for RAG for a particular query 280.

In some examples, the snapshots 235 may include permission information for files within the snapshots 235. In some examples, the RAG manager 270 may use the permission information within the snapshots 235 to filter out portions of text 245-*a* from prompt generation. For example, if the user who submitted a query 280 does not have permission as indicated in a most recent snapshot to access a particular file, and a portion of text 245-*a* that was extracted from that particular file was indicated for retrieval via RAG for the query 280, the RAG manager 270 may filter out that portion of text 245-*a* from generation of the prompt 281. In some such examples, the RAG manager may subsequently check permissions for the remainder of the portions of text 245-*a* indicated for retrieval for the query 280 based on cached permissions and/or retrieval of permissions from the RBAC log 296. Use of such permission information indicated by snapshots 235 for files may reduce the quantity of RBAC queries and accordingly may reduce RAG latency.

Some applications (e.g., SaaS applications) may support subscription APIs that may be used to notify the DMS 210 of permissions changes for particular files. For example, the computing system 105 may be a SaaS application, and the DMS 210 may subscribe to an API for the SaaS application which may inform the DMS 210 of permissions for different users. The DMS 210 may store such permission information, for example, in the RBAC cache 297. The RAG manager may use the permission information stored in the RBAC cache 297 to filter portions of text 245-*a* indicated for retrieval prior to generation of a prompt 281 as described herein.

In some embodiments, applications separate from or independent of the DMS 210 can utilize RAG as implemented in relevant part by the DMS 210 to acquire accurate and contextually relevant responses to queries in any applicable knowledge domain or organizational endeavor. Examples of applicable knowledge domains or organizational endeavors can include HR, engineering, project collaboration and management, technical support, accounting, troubleshooting, and the like. The applications can be supported or implemented by an entity different from the entity in control of the DMS 210. For example, the applications can be supported or implemented by the computing system 205 or the computing device 215, which can be controlled by, for example, a customer of the DMS 210. The applications can be additional or alternative to the communication applications 255, as discussed herein.

For example, an application controlled by a customer of the DMS 210 can initiate communications with the DMS 210 through a suitable technique (e.g., OAuth). The customer application can interact with an API (e.g., retriever) supported or implemented by the DMS 210. A user can provide a query through the customer application. The customer application can provide the query of the user through the API to conduct a search of a vector database, such as the vector database 230-*a*. The vector database 230-*a* can be associated with a knowledge repository related to the customer. The search of the vector database 230-*a* can result in information that is relevant or semantically similar to the query, as discussed herein. The search of the vector database 230-*a* can be subject to various security mechanisms, such as sensitive data filtering and role-based-access-control (RBAC) protections, as discussed herein. The relevant information resulting from the search of the vector database 230-*a* can be returned to the customer application. The customer application then can generate a prompt based on the query 280 and the returned relevant information. The prompt can include or reflect expertise or proprietary information of the customer. The prompt can be provided to an LLM selected by the customer to generate a reply from which a response to the query is generated. For example, the LLM can be trained or fine tuned by the customer or another organization. The LLM can be different from the LLM 275.

As described herein, snapshots 235 may be base (e.g., full) snapshots or incremental snapshots. For example, the snapshot 235-*a* may be a base snapshot and the snapshot 235-*b* may be an incremental snapshot. When the DMS 210 captures an incremental snapshot of the computing system 205 or a subsequent base snapshot of the computing system 205, the DMS 210 may generate a file (e.g., a filesystem metadata differential file (diffFMD file)) which indicates the files of the computing system 205 that have been modified, added, or deleted since the prior snapshot (e.g., for the snapshot 235-*b*, the prior snapshot is the snapshot 235-*a*). For an incremental snapshot (e.g., the snapshot 235-*b*), the embedding manager 220 may generate one or more vectors based on the files that have been added or modified with respect to the prior snapshot (e.g., as those are the files that are included in the incremental snapshot). In some examples, for a subsequent base snapshot, the embedding manager 220 also may generate one or more vectors based on the files that have been added or modified with respect to the prior snapshot (e.g., regardless of whether the prior snapshot is a base snapshot or an incremental snapshot).

In some examples, based on the diffFMD file, and the metadata 250-*a*, the DMS 210 may identify which vectors 240-*a* generated from a prior snapshot correspond to files which have been modified or deleted (e.g., have been superseded by the subsequent snapshot 235). In some examples, to remove stale data, the DMS 210 may be configured to remove vectors 240-*a* (and corresponding portions of text 245-*a* or pointers to the corresponding portions of text 245-*a* and/or corresponding metadata 250-*a* or pointers to the corresponding metadata 250-*a*) from the vector database 230-*a* that are superseded by a subsequent snapshot 235 (e.g., as indicated by the diffFMD file and the corresponding metadata). For example, the diffFMD file may indicate which files are modified or deleted in a snapshot 235, and the metadata 250-*a* may indicate from which snapshot 235 and from which file in the snapshot 235 a given vector was generated. Accordingly, the DMS 210 may identify which vectors were generated from files that have been modified or deleted, and the DMS 210 may delete or remove such vectors 240-*a* from the vector database 230-*a*. The DMS 210 may apply similar removal of superseded vectors from the multiple vector databases 230 managed by the DMS 210. In some examples, the DMS 210 may not be configured to remove some or all types of superseded files from the vector database 230-*a* (e.g., in order to track changes to files over time and/or to use such change history for RAG purposes).

In some examples, the DMS 210 may perform deduplication procedures or processes when adding vectors 240-*a* to the vector database 230-*a*. For example, if the DMS 210 determines that two or more generated vectors 240-*a* for the same snapshot 235 satisfy a semantic similarity threshold (e.g., correspond to text portions that are sufficiently similar), the DMS 210 may add a single vector 240-*a* of the two or more generated vectors 240-*a* to the vector database 230-*a*. In some such examples, the DMS 210 may add the portion of text 245-*a* that corresponds to the single vector 240-*a* to the vector database 230-*a*. In other such examples, the DMS 210 may store the portion of text 245-*a* that corresponds to the single vector 240-*a* in a remote storage environment and may add a pointer to the vector database 230-*a* that indicates the location at which the portion of text 245-*a* that corresponds to the single vector 240-*a* is stored. As another example, if the DMS 210 determines that a vector 240-*a* generated from a snapshot 235 (e.g., the snapshot 235-*b*) satisfies a semantic similarity threshold to a vector 240-*a* already stored in the vector database 230-*a* which was generated from a prior snapshot 235 (e.g., the snapshot 235-*a*), the DMS 210 may refrain from adding the vector generated from the subsequent snapshot 235 to the vector database 230-*a*.

Figure 3:
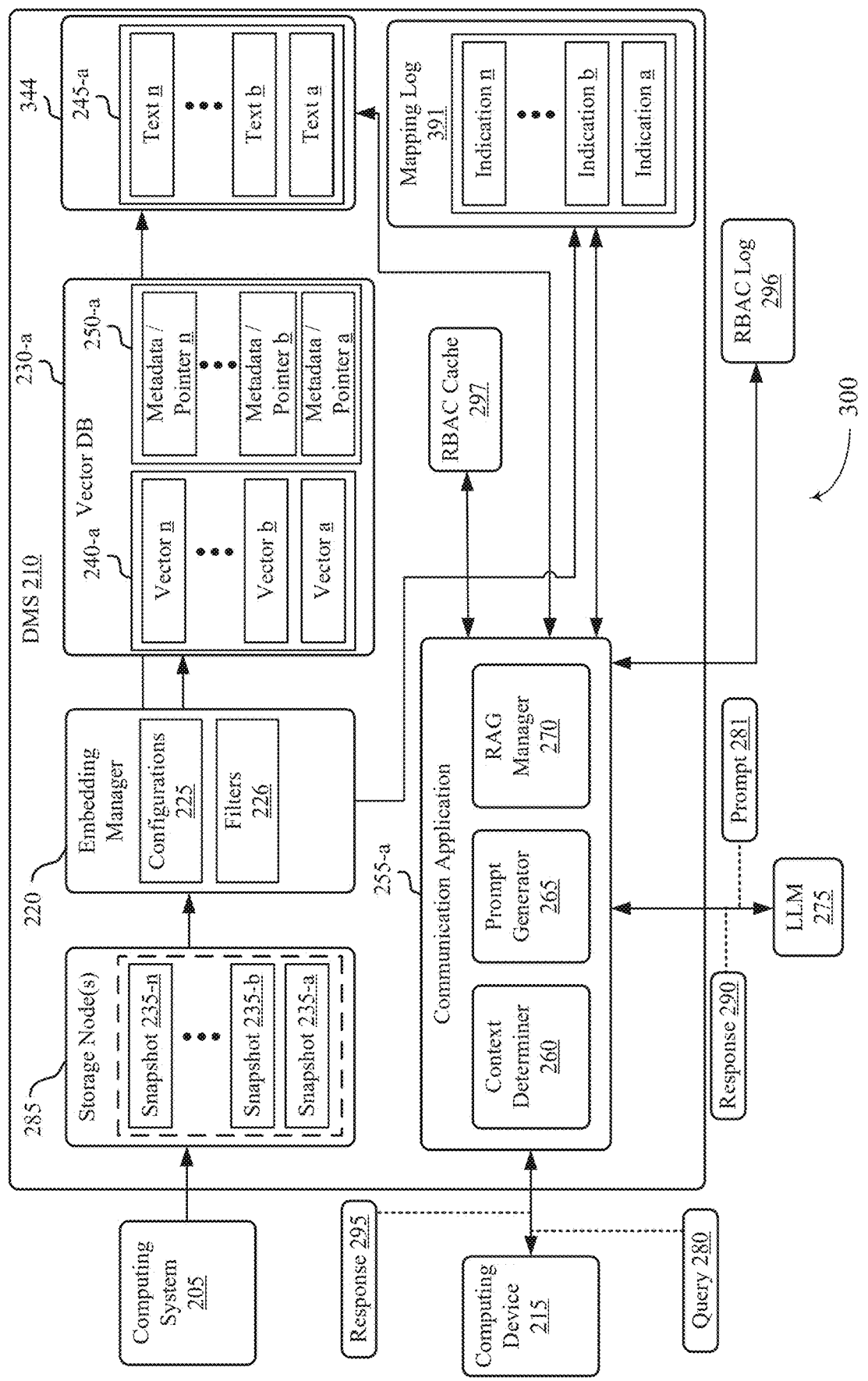
FIG. 3 shows an example of a computing environment that supports RAG using backup data in accordance with aspects of the present disclosure.

FIG. 3 shows an example of a computing environment 300 that supports RAG using backup data in accordance with aspects of the present disclosure. The computing environment 300 may implement one or more aspects of the computing environment 100 or the computing environment 200. For example, the computing environment 300 may include the same components as the computing environment 200 except that the corresponding portions of text 245 for the vectors 240-*a* may be stored in a secondary storage environment 344 that is separate from the vector database 230-*a*. For example, storing the corresponding portions of text 245 separately from the vectors 240-*a* may allow for smaller vector databases 230 which may be more quickly searched. Additionally or alternatively, the corresponding text portions may be stored at a local storage environment for security purposes (e.g., to avoid exposing textual data of the customer to a third party cloud database).

For example, when the embedding manager 220 of the computing environment 300 generates one or more vectors 240-*a* from a snapshot 235 (e.g., the snapshot 235-*a*), the DMS 210 may store the portions of text 245-*a* that correspond to the one or more vectors 240-*a* in the secondary storage environment 344. The secondary storage environment 344 may be hosted locally at the DMS 210 or may be implemented in a remote storage environment (e.g., may be hosted in the cloud environment 195 as described with reference to FIG. 1).

To maintain a record of the association between the vectors 240-*a* and the corresponding portions of text 245-*a*, the DMS 210 may maintain or implement a mapping log 391. For example, the mapping log may include mapping indications for each vector 240-*a* and each corresponding portion of text 245-*a* (e.g., the mapping indication a in the mapping log 391 may map the association between the vector a in the vector database 230-*a* and the portion of text a in the secondary storage environment 344, the mapping indication b in the mapping log 391 may map the association between the vector b in the vector database 230-*a* and the portion of text b in the secondary storage environment 344, and the mapping indication n in the mapping log 391 may map the association between the vector n in the vector database 230-*a* and the portion of text n in the secondary storage environment 344). For example, the mapping indications may be based on logical addresses within the vector database 230-*a* and the secondary storage environment 344. The mapping log 391 may be stored locally at the DMS 210 or may be implemented in a remote storage environment (e.g., may be hosted in the cloud environment 195 as described with reference to FIG. 1). The DMS 210 may add the mapping indications to the mapping log 391 as the vectors 240-*a* are added to the vector database 230-*a*. In some examples, the portions of text 245 may have a fixed or a maximum size, which may be configurable or may be based on the configuration of the secondary storage environment 344.

The communication application 255-*a* may use the mapping log 391 for data retrieval for RAG purposes. For example, the communication application 255-*a* may use the vectors 240-*a* to search for information (e.g., corresponding portions of text 245-*a*) to include in a prompt 281 based on context associated with a query 280. For example, for a given query 280, the communication application 255-*a* may determine contextual information associated with the given query. Based on the contextual information associated with the query 280, the communication application 255-*a* (e.g., a RAG manager 270 of the communication application 255-*a*) may identify a set of vectors 240-*a* stored in the vector database 230-*a* that satisfy a semantic similarity threshold with the contextual information. The RAG manager may identify, based on the mapping log 391, which portions of text 245 correspond to the identified vectors 240-*a*. The RAG manager 270 may retrieve the portions of text 245-*a* that correspond to the identified set of vectors 240-*a* from the secondary storage environment 344. The prompt generator 265 may include those retrieved portions of text 245-*a* in the prompt 281 which is provided to the LLM 275. Accordingly, the LLM 275 may consider the retrieved portions of text 245-*a* when generating the reply 290. The communication application 255-*a* may provide a response 295 to the query 280 based on the reply 290 received from the LLM 275.

In some examples, the DMS 210 may use the mapping log 391 to identify portions of text 245 to delete or remove from the secondary storage environment 344 based on the portions of text 245 being superseded (e.g., modified or deleted). For example, as described herein, when the DMS 210 captures a subsequent snapshot of the computing system 205 (e.g., an incremental snapshot or a subsequent base snapshot), the DMS 210 may generate a diffFMD file which indicates the files of the computing system 205 that have been modified, added, or deleted since the prior snapshot. In some examples, based on the diffFMD file, and the metadata 250-*a*, the DMS 210 may identify which vectors 240-*a* generated from a prior snapshot correspond to files which have been modified or deleted (e.g., have been superseded by the subsequent snapshot 235). In some examples, to remove stale data, the DMS 210 may be configured to remove such vectors 240-*a* which have been superseded from the vector database. In some examples, the DMS 210 may use the mapping log 391 to determine which portions of text 245-*a* correspond to the vectors 240-*a* which are superseded, and the DMS 210 may remove or delete those portions of text 245-*a* from the secondary storage environment 344.

In some examples, the DMS 210 may perform deduplication procedures or processes when adding vectors 240-*a* to the vector database 230-*a*. For example, if the DMS 210 determines that two or more generated vectors 240-*a* for the same snapshot satisfy a semantic similarity threshold (e.g., correspond to text portions that are sufficiently similar), the DMS 210 may add a single vector 240-*a* of the two or more generated vectors 240-*a* to the vector database 230-*a*. In such examples, the DMS 210 may add the portion of text 245-*a* that corresponds to the single vector 240-*a* to the secondary storage environment 344, and the DMS 210 may add a mapping indication to the mapping log 391 that indicates the association of the single vector 240-*a* to the corresponding portion of text 245-*a*. As another example, if the DMS 210 determines that a vector 240-*a* generated from a snapshot 235 (e.g., the snapshot 235-*b*) satisfies a semantic similarity threshold to a vector 240-*a* already stored in the vector database 230 which was generated from a prior snapshot 235 (e.g., the snapshot 235-*a*), the DMS 210 may refrain from adding the vector generated from the subsequent snapshot 235 to the vector database 230-*a*. As another example, if the DMS 210 determines that a vector 240-*a* generated from a snapshot 235 (e.g., the snapshot 235-*b*) satisfies a semantic similarity threshold to a vector 240-*a* already stored in the vector database 230 which was generated from a prior snapshot 235 (e.g., the snapshot 235-*a*), the DMS 210 may add the vector generated from the subsequent snapshot 235 to the vector database 230-*a* and may delete the vector 240-*a* already stored in the vector database 230 from the vector database 230-*a*. The DMS 210 may also delete the portion of text 245-*a* from the secondary storage environment 344 based on the mapping log.

In some examples, where the DMS 210 manages multiple vector databases 230 and corresponding communication applications (as described with reference to FIG. 2), the DMS 210 may maintain a separate mapping log 391 and separate secondary storage environments 344 storing corresponding portions of text for each vector database 230. In some examples, where the DMS 210 manages multiple vector databases 230 and corresponding communication applications, the DMS 210 may maintain a single mapping log 391 that maps the vectors in each vector database to corresponding portions of text 245 (e.g., either in separate secondary storage environments or the same separate secondary storage environment 344). Similarly, each given communication application 255 implemented by the DMS 210 may use the mapping log(s) 391 to identify which portions of text to retrieve from a secondary storage environment for RAG purposes based on identified vectors from the vector database 230 that corresponds to the given communication application 255.

In some examples, the DMS 210 may implement RBAC for RAG as described with reference to FIG. 2. For example, the RAG manager 270 may retrieve permissions for access to the communication application 255-*a* from a RBAC of 296 as described herein. As another example, the RAG manager 270 may filter portions of text 245 from documents indicated for retrieval for a query 280 based on the permissions associated with the user who submitted the query prior to generation of the prompt 281. For example, the permissions may be stored in an RBAC log 296 and or a RBAC cache 297 as described herein.

Figure 4:
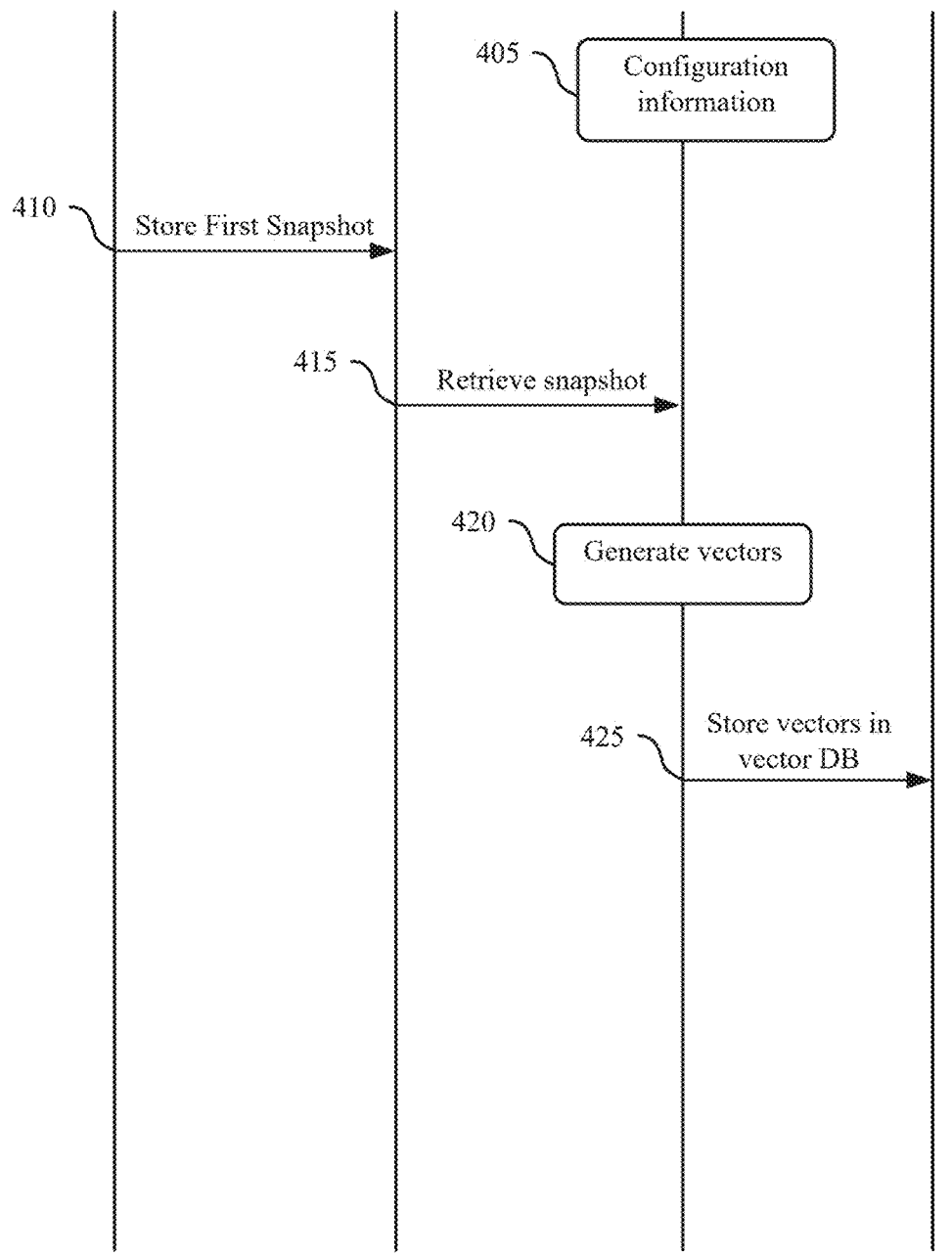
FIG. 4 shows an example of a process flow that supports RAG using backup data in accordance with aspects of the present disclosure.

FIG. 4 shows an example of a process flow 400 that supports RAG using backup data in accordance with aspects of the present disclosure. The process flow 400 may be implemented by one or more aspects of the computing environment 100, the computing environment 200, or the computing environment 300. For example, the process flow 400 may be implemented at least in part by a DMS 210-*a*, which may be an example of a DMS 210 as described herein. The process flow 400 may be implemented at least in part by a computing system 205-*a*, which may be an example of a computing system 205 as described herein. The process flow 400 may be implemented at least in part by an embedding manager 220-*a*, which may be an example of an embedding manager 220 as described herein. The process flow 400 may be implemented at least in part by a storage node 285-*a*, which may be an example of a storage node 285 as described herein. The process flow 400 may be implemented at least in part by a vector database 230-*d*, which may be an example of a vector database 230 as described herein. It is to be understood that, relative to the following description of the example of process flow 400, operations between the computing system 205-*a*, the DMS 210-*a*, the storage node 285-*a*, the embedding manager 220-*a*, and the vector database 230-*d* may be added, omitted, or performed in a different order (with respect to the exemplary order shown).

At 410, the DMS 210-*a* may obtain a first snapshot of the computing system 205-*a*. In some examples, the DMS 210-*a* may store the snapshot in the storage node 285-*a*. In some examples, at 415, the DMS 210-*a* may retrieve the first snapshot from the storage node 285-*a* and may mount the snapshot at a location accessible to the embedding manager 220-*a*.

At 420, the embedding manager 220-*a* may generate one or more vectors (e.g., vectors 240 as described with reference to FIG. 2) based on data from the first snapshot.

At 425, the DMS 210-*a* may add the one or more vectors along with metadata or a pointer to the metadata to the vector database 230-*d*. The metadata may be associated with the data from the first snapshot. For example, the metadata may be indicative of an identifier for the first snapshot, an identifier of the computing system 205-*a*, or any combination thereof. The metadata may also indicate, for each vector, the file in the first snapshot from which the vector was generated. The vector database 230-*d* may be a knowledge repository that is accessible to a communication application (e.g., a communication application 255 of FIG. 2) associated with the customer of the DMS 210-*a*. The communication application may be associated with communication with an LLM (e.g., the LLM 275 of FIG. 2). Each vector of the one or more vectors may correspond to a respective portion of text within a file represented by the first snapshot, and the DMS 210-*a* may store the respective portion of text for each of the one or more vectors in the vector database 230-*d*.

In some examples, at 405, the DMS 210-*a* may receive configuration information that schedules the DMS 210-*a* (e.g., the embedding manager 220-*a*) to generate vectors for addition to the vector database 230-*d* in association with obtention of snapshots of the computing system 205-*a*. In such examples, generating the one or more vectors at 420 may be based on the configuration information. In some examples, the DMS 210-*a* may receive, within the configuration information, an indication of one or more types of files for which to generate vectors for addition to the vector database 230-*d*. In such examples, the DMS 210-*a* may (e.g., the embedding manager 220-*a* may) determine a set of files within the first snapshot that match the one or more types of files, and the embedding manager 220-*a* may generate the one or more vectors based on the set of files. In some examples, the configuration information may indicate for which computing systems or snappable for the DMS 210-*a* to generate vectors for addition to the vector database 230-*d* (e.g., which data sources of the customer to use as data sources for RAG for a particular communication application).

In some examples, the vector database 230-*d* may be used to respond to queries received at the communication application (e.g., from a user associated with the customer). For example, the DMS 210-*a* may receive a query for the LLM via the communication application. The DMS 210-*a* may provide, via the communication application, a response to the query that is based on the LLM and the one or more vectors that were previously added to the vector database 230-*d*. For example, the DMS 210-*a* may retrieve, based on contextual information associated with the query, information from the vector database 230-d. The DMS 210-a may generate, based on the query and the information, a prompt for the LLM. The response to the query provided via the communication application may be based on the prompt. For example, the DMS 210-a may transmit the prompt to the LLM and the DMS 210-a may receive, from the LLM, a reply to the prompt, where the response to the query is based on the reply from the LLM. As described herein, the one or more vectors may be representative of one or more respective portions of text within one or more files represented by the first snapshot, and the one or more respective portions of text may be stored in the vector database 230-d in association with the one or more vectors. The information retrieved from the vector database 230-d based on the one or more vectors may be a subset of the one or more respective portions of text that correspond to a subset of the one or more vectors identified based on the contextual information. For example, the subset of the one or more vectors may be identified based on the subset of the one or more vectors satisfying a semantic similarity threshold with the contextual information of the query.

In some examples, as described herein, the DMS 210-a may support or implement multiple communication applications 255. For example, the communication application may be associated with a first communication topic and a second communication application may be associated with a second communication topic (e.g., the different communication applications may be used for different topics or for different subsets of users associated with the customer). Each communication application may be associated with a respective vector database (e.g., the communication application may be associated with the vector database 230-d and a second communication application may be associated with a second vector database). For example, the DMS 210-a (e.g., the embedding manager 220-a) may generate one or more second vectors based on the data from the first snapshot, and the DMS 210-a may add the one or more second vectors to a second vector database along with second metadata or a second pointer to the second metadata. The second metadata may be associated with the data from the first snapshot. The second vector database may be a second knowledge repository that is accessible to a second communication application associated with the customer of the DMS 210-a. In some examples, at 405, the DMS 210-a may receive configuration information that schedules the DMS 210-a to generate first vectors for addition to the vector database 230-d and second vectors for addition to the second vector database in association with obtention of snapshots of the computing system 205-a. In such examples generation of the one or more vectors may be based on the configuration information, and generation of the one or more second vectors may be based on the configuration information. In some examples, the second vector database may be used for RAG for the second communication application. For example, the DMS 210-a may receive a second query for the LLM via the second communication application. The DMS 210-a may provide, via the second communication application, a second response to the second query that is based on the LLM and the one or more second vectors that were previously added to the second vector database.

In some examples, the DMS 210-a may obtain, subsequent to obtaining the first snapshot, a second snapshot of the computing system 205-a, where the second snapshot includes one or more files that are modified with respect to the first snapshot. The subsequent snapshot may be an incremental snapshot or a subsequent base snapshot. In some such examples, the DMS 210-a (e.g., the embedding manager 220-a) may generate one or more second vectors based on second data from the one or more files that are modified with respect to the first snapshot, and the DMS 210-a may add the one or more second vectors to the vector database 230-d along with second metadata or a second pointer to the second metadata. The second metadata may be associated with the second data from the second snapshot. In some examples, the DMS 210-a may delete superseded data from the vector database 230-d. For example, the DMS 210-a may determine, based on the second snapshot, one or more files that are deleted with respect to the first snapshot; determine, based on the metadata, a subset of the one or more vectors corresponding to the one or more files that are deleted; and delete the subset of the one or more vectors from the vector database 230-d. As another example, the DMS 210-a may determine, based on the metadata, a subset of the one or more vectors corresponding to the one or more files that are modified; and delete the subset of the one or more vectors from the vector database 230-d.

In some examples, the DMS 210-a may generate vectors for the vector database 230-d from multiple computing systems associated with the customer. For example, the DMS 210-a may obtain a second snapshot of a second computing system associated with the customer of the DMS 210-a. The DMS 210-a may store the second snapshot in the storage node 285-a. The DMS 210-a may generate one or more second vectors based on second data from the second snapshot. The DMS 210-a may add the one or more second vectors to the vector database 230-d along with second metadata or a second pointer to the second metadata. The second metadata may be associated with the second data from the second snapshot.

Figure 5:
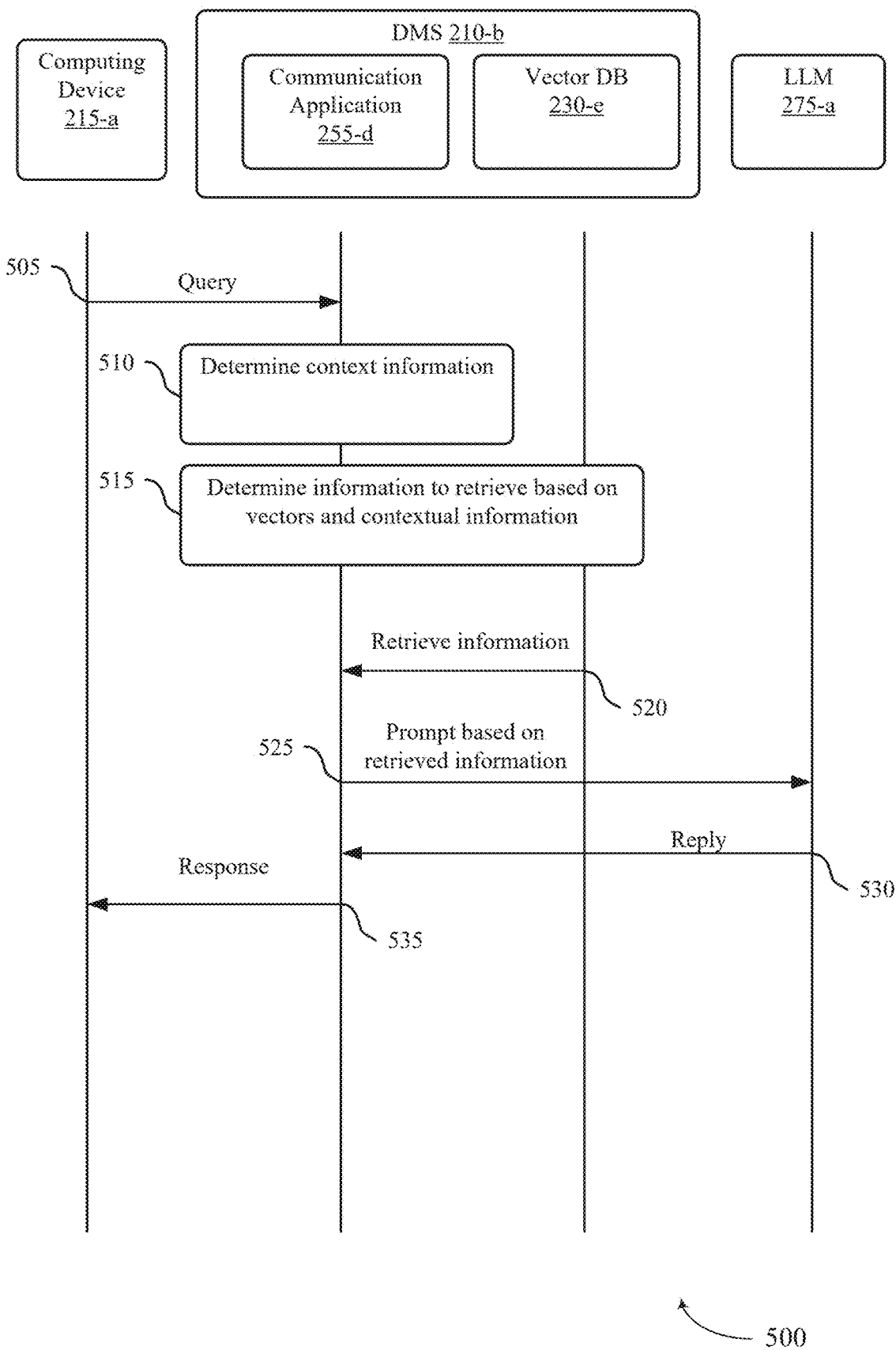
FIG. 5 shows an example of a process flow that supports RAG using backup data in accordance with aspects of the present disclosure.

FIG. 5 shows an example of a process flow 500 that supports RAG using backup data in accordance with aspects of the present disclosure. The process flow 500 may be implemented by one or more aspects of the computing environment 100, the computing environment 200, or the computing environment 300. For example, the process flow 500 may be implemented at least in part by a DMS 210-b, which may be an example of a DMS 210 as described herein. The process flow 500 may be implemented at least in part by a computing device 215-a, which may be an example of a computing device 215 as described herein. The process flow 500 may be implemented at least in part by an LLM 275-a, which may be an example of an LLM 275 as described herein. The process flow 500 may be implemented at least in part by a vector database 230-e, which may be an example of a vector database 230 as described herein. It is to be understood that, relative to the following description of the example of process flow 500, operations between the computing device 215-a, the DMS 210-b, the LLM 275-a, and the vector database 230-e may be added, omitted, or performed in a different order (with respect to the exemplary order shown).

At 505, the DMS 210-b may receive a query for the LLM 275-a via the communication application 255-d. The communication application 255-d may be associated with a customer of the DMS 210-b. The query may be transmitted from the computing device 215-a.

At 520, the DMS 210-b may retrieve, based on contextual information associated with the query, information from the vector database 230-e, where the vector database 230-c is accessible to the DMS 210-b. The vector database 230-e may store one or more vectors that include data associated with one or more snapshots obtained by the DMS 210-b of a computing system associated with the customer.

For example, retrieving the information may involve, at 510, determining contextual information associated with the query. At 515, the DMS 210-*b* (e.g., the communication application 255-*d*) may determine the information to retrieve based on the one or more vectors stored in the vector database 230-*e* and the determined contextual information. For example, the DMS 210-*b* may identify a subset of the one or more vectors stored in the vector database 230-*e* that satisfy a semantic similarity threshold with the contextual information (e.g., the contextual information may be represented as a vector), and the information may be data associated with the subset of the vectors. For example, the one or more vectors may be representative of one or more respective portions of text within one or more files represented by the one or more snapshots, and the one or more respective portions of text may be stored in the vector database 230-*c* in association with the one or more vectors. The information retrieved from the vector database 230-*c* at 520 may accordingly be a subset of the one or more respective portions of text that correspond to the subset of the one or more vectors. In some examples, the DMS 210-*b* may implement RBAC for retrieval of information from or in association with the vector database 230-*e* for prompt generation. For example, the DMS 210-*b* may identify, based on a set of access permissions associated with a user account associated with the query (e.g., stored in a RBAC cache 297 as described herein, retrieved from an RBAC log 296 as described herein or indicated in a given snapshot), a second subset of the one or more respective portions of text from the subset of the one or more respective portions of text. The set of access permissions may be indicative of a subset of the one or more files the user account is allowed to access. For example, the query at 505 may be received via a UE associated with the user account (e.g., the user account may be logged into the computing device 215-*a*). The prompt may be generated using the second subset of the one or more respective portions of text (e.g., and not using portions of text from files which the user account is not allowed to access as indicated by the set of access permissions).

In some examples, the query at 505 may be received via a UI associated with a user account associated with the customer (e.g., the user account may be logged into the computing device 215-*a*), and the contextual information may be determined at 510 based on the user account (e.g., which files the user account has access to, or which type of employee or account is associated with the user account). In some examples, the contextual information may be determined at 510 based on one or more keywords in the query. In some examples, the contextual information may be a vector representation (e.g., generated by an embedding model as described herein) of the query received from the computing device 215-*a* at 505. In some examples, the DMS 210-*b* may receive, via a UI (e.g., via a UI of the computing device 215-*a*), request for a communication session via the communication application 255-*d*. In some such examples, the DMS 210-*b* may cause, at the UI in response to the request for the communication session, presentation of a set of multiple topics. The DMS 210-*b* may receive, via the UI, an indication of a selected topic of the plurality of topics, and the contextual information may be determined at 510 based on the selected topic.

In some examples, the vector database 230-*e* may include metadata or pointers to metadata associated with the one or more vectors. The metadata may be indicative of an identifier for the respective snapshot associated with each vector, an identifier of the computing system associated with each vector, or any combination thereof. The metadata may also indicate, for each vector, the file in the snapshot from which the vector was generated. In some examples, retrieval of the information may be based on weights assigned to dates of the one or more snapshots, where the metadata is indicative of the dates of the one or more snapshots. For example, information from more recent snapshots may be given more weight for RAG.

At 525, the DMS 210-*b* (e.g., the communication application 255-*d*) may generate and transmit a prompt to the LLM 275-*a* based on the query and the information retrieved at 520. At 530, the DMS 210-*b* (e.g., the communication application 255-*d*) may receive a reply to the prompt. At 535, the DMS 210-*b* may provide, via the communication application 255-*d* to the computing device 215-*a*, a response to the query that is based on the reply from the LLM at 530.

In some examples, as described with reference to FIGS. 2, 3, and 4, the DMS 210-*b* may obtain the one or more snapshots, generate the one or more vectors based on the one or more snapshots, and add the one or more vectors to the vector database 230-*c*. For example, the DMS 210-*b* may receive configuration information that schedules the DMS 210-*b* to generate vectors for addition to the vector database 230-*e* in association with obtention of snapshots of the computing system, and generating the one or more vectors may be based on the configuration information. In some examples, the DMS 210-*b* may receive, within the configuration information, an indication of one or more types of files for which to generate vectors for addition to the vector database 230-*c*, and the one or more vectors may be generated based at least in part on (e.g., using information from) one or more files in the one or more snapshots that match the one or more types of files.

As described herein, in some examples, the DMS 210-*b* may support or implement multiple communication applications 255. For example, the DMS 210-*b* may receive, via a second communication application associated with the customer of the DMS 210-*b*, a second query for the LLM 275-*a*. For example, the communication application 255-*a* may be associated with a first communication topic and the second communication application may be associated with a second communication topic (e.g., the different communication applications may be used for different topics or for different subsets of users associated with the customer). In such examples, the DMS 210-*b* may retrieve, based on second contextual information associated with the second query, second information from a second vector database accessible to the DMS 210-*b*, where the second vector database stores one or more second vectors that include second data associated with the one or more snapshots. In such examples, the DMS 210-*b* may generate and transmit a second prompt to the LLM 275-*a* based on the second query and the second information. The DMS 210-*b* (e.g., the second communication application) may receive a second reply to the second prompt. The DMS 210-*b* may provide, via the second communication application to the computing device 215-*a*, a response to the query that is based on the second reply from the LLM at 530. In some examples, the DMS 210-*b* may receive configuration information that schedules the DMS 210-*b* to generate first vectors for addition to the vector database 230-*e* and second vectors for addition to the second vector database in association with obtention of snapshots of the computing system of the customer. In such examples generation of the one or more vectors may be based on the configuration information, and generation of the one or more second vectors may be based on the configuration information.

The communication application 255-*d* may be used for a chat session with a user at the computing device 215-*a*. For example, the user may transmit multiple queries, and subsequent queries may be based on prior responses. For example, the DMS 210-*b* may receive a second query for the LLM 275-*a* via the communication application 255-*d*. The DMS 210-*b* may retrieve, based on second contextual information associated with the second query, second information from the vector database 230-*c*. The DMS 210-*b* (e.g., the communication application 255-*d*) may generate and transmit a second prompt to the LLM 275-*a* based on the second query and the information retrieved at 520. The DMS 210-*b* (e.g., the communication application 255-*d*) may receive a second reply to the second prompt from the LLM 275-*a*. The DMS 210-*b* may provide, via the communication application 255-*d* and to the computing device 215-*a*, a second response to the second query that is based on the second reply from the LLM at 530.

Figure 6:
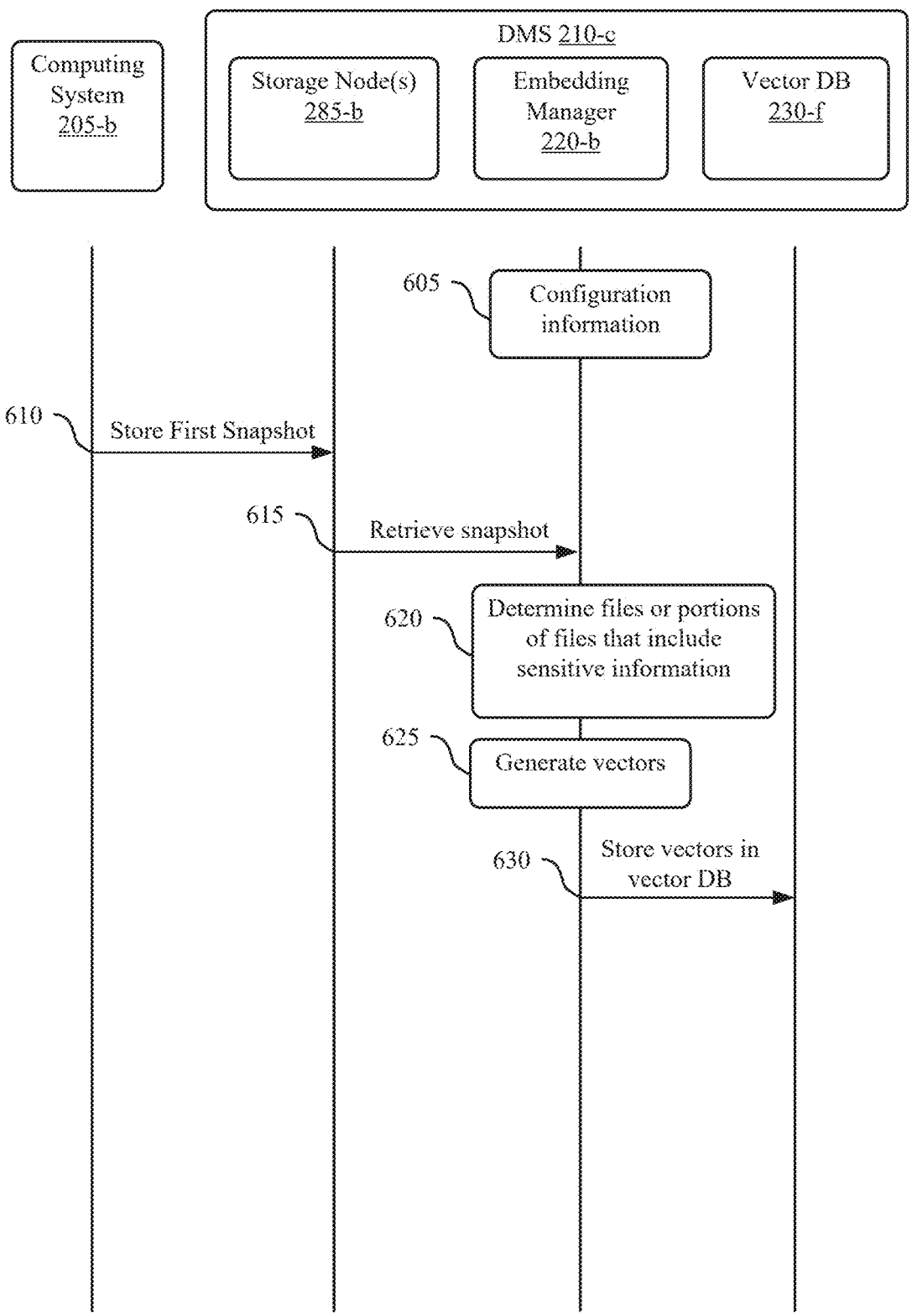
FIG. 6 shows an example of a process flow that supports RAG using backup data in accordance with aspects of the present disclosure.

FIG. 6 shows an example of a process flow 600 that supports RAG using backup data in accordance with aspects of the present disclosure. The process flow 600 may be implemented by one or more aspects of the computing environment 100, the computing environment 200, or the computing environment 300. For example, the process flow 600 may be implemented at least in part by a DMS 210-*c*, which may be an example of a DMS 210 as described herein. The process flow 600 may be implemented at least in part by a computing system 205-*b*, which may be an example of a computing system 205 as described herein. The process flow 600 may be implemented at least in part by an embedding manager 220-*b*, which may be an example of an embedding manager 220 as described herein. The process flow 600 may be implemented at least in part by a storage node 285-*b*, which may be an example of a storage node 285 as described herein. The process flow 600 may be implemented at least in part by a vector database 230-*f*, which may be an example of a vector database 230 as described herein. It is to be understood that, relative to the following description of the example of process flow 600, operations between the computing system 205-*b*, the DMS 210-*c*, the storage node 285-*b*, the embedding manager 220-*b*, and the vector database 230-*f* may be added, omitted, or performed in a different order (with respect to the exemplary order shown).

At 610, the DMS 210-*c* may obtain a first snapshot of the computing system 205-*b*. The snapshot may include data associated with a set of files. In some examples, the DMS 210-*c* may store snapshots in the storage node 285-*b*. In some examples, at 615, the DMS 210-*c* may retrieve the first snapshot from the storage node 285-*b* and may mount the snapshot at a location accessible to the embedding manager 220-*b*.

At 620, the DMS 210-*c* (e.g., the embedding manager 220-*b*) may determine, from among the set of files, a first subset of files or portions of files that include sensitive information.

At 625, the embedding manager 220-*b* may generate one or more vectors (e.g., vectors 240 as described with reference to FIG. 2) based on data associated with a second subset of files or portions of files from among the set of files, the second subset of files or portions of files exclusive of files from the first subset of files or portions of files. For example, the second subset of files or portions of files may be files or portions of files that are not determined to include sensitive information.

At 630, the DMS 210-*c* may add the one or more vectors along with metadata or a pointer to the metadata to the vector database 230-*f*. For example, the DMS 210-*c* may not add vectors to the vector database for the first subset of files or portions of files that include sensitive information. For example, based on the first subset of files or portions of files including sensitive information, no vectors may be added to the vector database 230-*f* based on data associated with the first subset of files or portions of files that include sensitive information. The metadata may be associated with the data from the first snapshot. For example, the metadata may be indicative of an identifier for the first snapshot, an identifier of the computing system 205-*b*, or any combination thereof. The metadata may also indicate, for each vector, the file in the snapshot from which the vector was generated. The vector database 230-*f* may be a knowledge repository that is accessible to a communication application (e.g., a communication application 255 of FIG. 2) associated with the customer of the DMS 210-*c*. The communication application may be associated with communication with an LLM (e.g., the LLM 275 of FIG. 2). Each vector of the one or more vectors may correspond to a respective portion of text within a file represented by the first snapshot, and the DMS 210-*c* may store the respective portion of text for each of the one or more vectors in the vector database 230-*f*.

In some examples, at 605, the DMS 210-*c* may receive configuration information. In some examples, the configuration may schedule the DMS 210-*c* (e.g., the embedding manager 220-*b*) to generate vectors for addition to the vector database 230-*f* in association with obtention of snapshots of the computing system 205-*b*. In such examples, generating the one or more vectors at 420 may be based on the configuration information. In some examples, the DMS 210-*c* may receive, within the configuration information, an indication of one or more types of files for which to generate vectors for addition to the vector database 230-*f*. In such examples, the DMS 210-*c* may (e.g., the embedding manager 220-*b* may) determine a set of files within the first snapshot that match the one or more types of files, and the embedding manager 220-*b* may generate the one or more vectors based on the set of files.

In some examples, the configuration information at 605 may indicate one or more rules for determining that a file includes sensitive information, and determining the first subset of files or portions of files at 620 may be based on the one or more rules. For example, the one or more rules may be based on a file type, inclusion of one or more keywords in a file name, inclusion of one or more keywords in text of a file, inclusion of one or more types of data structures in a file, or any combination thereof.

As described herein, in some examples, the DMS 210-*c* may support or implement multiple communication applications. For example, the communication application associated with the vector database 230-*f* may be associated with a first communication topic and a second communication application may be associated with a second communication topic (e.g., the different communication applications may be used for different topics or for different subsets of users associated with the customer). Each communication application may be associated with a respective vector database (e.g., the communication application may be associated with the vector database 230-*f* and the second communication application may be associated with a second vector database). Different vector databases may have different sensitive information filtering rules (e.g., based on the associated communication topic). For example, the DMS 210-*c* (e.g., the embedding manager 220-*b*) may generate one or more second vectors based on second data from the first snapshot, where the second data is from at least some of the first subset of files or portions of files (that were determined to include sensitive information for the vector database 230-*f*). The DMS 210-*c* may add the one or more second vectors to the second vector database along with second metadata or a second pointer to the second metadata, where the second metadata is associated with the data from the first snapshot, where the second vector database is a second knowledge repository that is accessible to the second communication application associated with the customer of the DMS 210-*c*, and where the second communication application is associated with communication with the LLM. In some examples, the configuration information at 605 may schedule the DMS 210-*c* to generate first vectors for addition to the vector database 230-*f* and second vectors for addition to the second vector database in association with obtention of snapshots of the computing system 205-*b*. In such examples generating the one or more vectors may be based on the configuration information, and generating the one or more second vectors may be based on the configuration information. In some examples, the configuration information may indicate one or more first rules for determining that a file includes sensitive information in association with generating the one or more vectors, and the configuration information may indicate one or more second rules for determining that a file includes sensitive information in association with generating the one or more second vectors.

In some examples, the vector database 230-*f* may be used to respond to queries received at the communication application (e.g., from a user associated with the customer). For example, the DMS 210-*c* may receive a query for the LLM via the communication application. The DMS 210-*c* may provide, via the communication application, a response to the query that is based on the LLM and the one or more vectors that were previously added to the vector database 230-*f*. For example, the DMS 210-*c* may retrieve, based on contextual information associated with the query, information from the vector database 230-*f*. The DMS 210-*c* may generate, based on the query and the information, a prompt for the LLM. The response to the query provided via the communication application may be based on the prompt. For example, the DMS 210-*c* may transmit the prompt to the LLM, and the DMS 210-*c* may receive, from the LLM, a reply to the prompt, where the response to the query is based on the reply from the LLM. As described herein, the one or more vectors may be representative of one or more respective portions of text within one or more files represented by the first snapshot, and the one or more respective portions of text may be stored in the vector database 230-*f* in association with the one or more vectors. The information retrieved from the vector database 230-*f* based on the one or more vectors may be a subset of the one or more respective portions of text that correspond to a subset of the one or more vectors identified based on the contextual information. For example, the subset of the one or more vectors may be identified based on the subset of the one or more vectors satisfying a semantic similarity threshold with the contextual information of the query.

In some examples, the DMS 210-*c* may obtain, subsequent to obtaining the first snapshot, a second snapshot of the computing system, where the second snapshot includes a second set of files that are modified with respect to the first snapshot. The DMS 210-*c* may determine, from among the second set of files, a third subset of files or portions of files that include sensitive information. In some such examples, the DMS 210-*c* (e.g., the embedding manager 220-*b*) may generate one or more second vectors based data associated with a fourth subset of files or portions of files from among the second set of files, the fourth subset of files or portions of files exclusive of files from the third subset of files or portions of files. The DMS 210-*c* may add the one or more second vectors to the vector database 230-*f* along with second metadata or a second pointer to the second metadata. The second metadata may be associated with the second data from the second snapshot. In some examples, the DMS 210-*c* may delete superseded data from the vector database 230-*f*. For example, the DMS 210-*c* may determine, based on the second snapshot, one or more files that are deleted with respect to the first snapshot; determine, based on the metadata, a subset of the one or more vectors corresponding to the one or more files that are deleted; and delete the subset of the one or more vectors from the vector database 230-*f*. As another example, the DMS 210-*c* may determine, based on the metadata, a subset of the one or more vectors corresponding to the one or more files that are modified; and delete the subset of the one or more vectors from the vector database 230-*f*.

Figure 7:
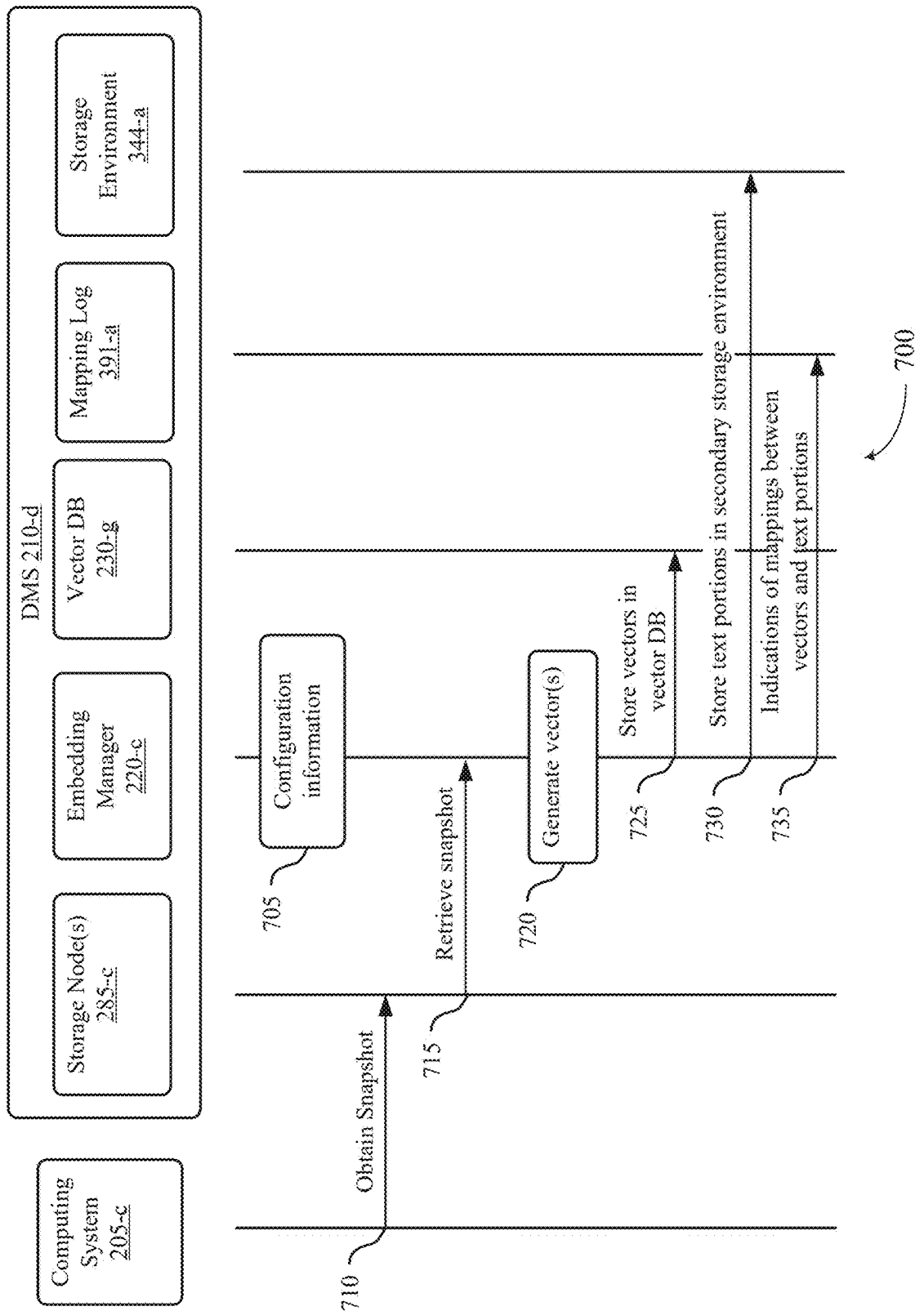
FIG. 7 shows an example of a process flow that supports RAG using backup data in accordance with aspects of the present disclosure.

FIG. 7 shows an example of a process flow 700 that supports RAG using backup data in accordance with aspects of the present disclosure. The process flow 700 may be implemented by one or more aspects of the computing environment 100, the computing environment 200, or the computing environment 300. For example, the process flow 700 may include a DMS 210-*d*, which may be an example of a DMS 210 as described herein. The process flow 700 may be implemented at least in part by a computing system 205-*c*, which may be an example of a computing system 205 as described herein. The process flow 700 may be implemented at least in part by an embedding manager 220-*c*, which may be an example of an embedding manager 220 as described herein. The process flow 700 may be implemented at least in part by a storage node 285-*c*, which may be an example of a storage node 285 as described herein. The process flow 700 may be implemented at least in part by a vector database 230-*g*, which may be an example of a vector database 230 as described herein. The process flow 700 may include a mapping log 391-*a*, which may be an example of a mapping log 391 as described herein. The process flow 700 may be implemented at least in part by a secondary storage environment 344-*a*, which may be an example of a secondary storage environment 344 as described herein. It is to be understood that, relative to the following description of the example of process flow 700, operations between the computing system 205-*c*, the DMS 210-*d*, the storage node 285-*c*, the embedding manager 220-*c*, the vector database 230-*g*, the mapping log 391-*a*, and the secondary storage environment 344-*a* may be added, omitted, or performed in a different order (with respect to the exemplary order shown).

At 710, the DMS 210-*d* may obtain a first snapshot of the computing system 205-*c*. In some examples, the DMS 210-*d* may store snapshots in the storage node 285-*c*. In some examples, at 715, the DMS 210-*d* may retrieve the first snapshot from the storage node 285-*c* and may mount the snapshot at a location accessible to the embedding manager 220-*c*.

At 720, the embedding manager 220-*c* may generate one or more vectors (e.g., vectors 240 as described with reference to FIG. 2) based on data from the first snapshot. The one or more vectors may be representative of one or more respective portions of text within one or more files represented by the first snapshot.

At 725, the DMS 210-*d* may add the one or more vectors along with metadata or a pointer to the metadata to the vector database 230-*g*. The metadata may be associated with the data from the first snapshot. For example, the metadata may be indicative of an identifier for the first snapshot, an identifier of the computing system 205-c, or any combination thereof. The metadata may also indicate, for each vector, the file in the snapshot from which the vector was generated.

At 730 the DMS 210-d may store the one or more respective portions of text in the secondary storage environment 344-a. The vector database 230-g in conjunction with the secondary storage environment 344-a may be a knowledge repository that is accessible to a communication application associated with the customer of the DMS 210-d. The communication application may be associated with communication with an LLM (e.g., the LLM 275 of FIGS. 2 and 3).

At 735, the DMS 210-d may add, to the mapping log 391-a, respective indications of mappings between the one or more vectors and the one or more respective portions of text.

In some examples, at 705, the DMS 210-d may receive configuration information that schedules the DMS 210-d to generate vectors for addition to the vector database 230-g in association with obtention of snapshots of the computing system 205-c, and generating the one or more vectors may be based on the configuration information. In some examples, the DMS 210-d may receive, within the configuration information, an indication to store the one or more respective portions of text in the secondary storage environment 344-a. In some examples, the DMS 210-d may receive, within the configuration information, an indication of one or more types of files for which to generate vectors for addition to the vector database 230-g. In such examples, the DMS 210-d may (e.g., the embedding manager 220-c may) determine a set of files within the first snapshot that match the one or more types of files, and the embedding manager 220-c may generate the one or more vectors based on the set of files.

In some examples, the vector database 230-g may be used to respond to queries received at the communication application (e.g., from a user associated with the customer). For example, the DMS 210-d may receive a query for the LLM via the communication application. The DMS 210-d may provide, via the communication application, a response to the query that is based on the LLM, the one or more vectors that were previously added to the vector database 230-g, the one or more respective portions of text stored in the secondary storage environment 344-a, and the respective indications of mappings between the one or more vectors and the one or more respective portions of text stored at the mapping log 391-a. For example, the DMS 210-d may identify, based on contextual information associated with the query, a subset of the one or more vectors; identify, based on the mapping log 391-a, a subset of the one or more respective portions of text that corresponds to the subset of the one or more vectors; retrieve, based on identifying the subset of the one or more respective portions of text, the subset of the one or more respective portions of text from the secondary storage environment 344-a; and generate, based on the query and the subset of the one or more respective portions of text, a prompt for the LLM. The response to the query may be based on the prompt. For example, the DMS 210-d may transmit the prompt to the LLM and the DMS 210-d may receive, from the LLM, a reply to the prompt, where the response to the query is based on the reply from the LLM. In some examples, the subset of the one or more vectors may be identified based on the subset of the one or more vectors satisfying a semantic similarity threshold with the contextual information of the query.

In some examples, the DMS 210-d may perform deduplication procedures or processes when adding vectors to the vector database 230-g. For example, the DMS 210-d may determine that two or more respective portions of text within the one or more files represented by the first snapshot satisfy a semantic similarity threshold (e.g., based on respective vectors associated with the two or more respective portions of text), and storing the one or more respective portions of text at 730 may involve storing a single portion of text in the secondary storage environment 344-a based on the two or more respective portions of text satisfying the semantic similarity threshold, the single portion of text being one of the two or more respective portions of text. As another example, the DMS 210-d may determine a satisfaction of a semantic similarity threshold between a respective portion of text of the one or more respective portions of text and a prior respective portion of text within one or more second files represented by a second snapshot of the computing system 205-c (e.g., based on respective vectors with the respective portions of text), the second snapshot corresponding to an earlier time than the first snapshot, and where the prior respective portion of text is stored at the secondary storage environment 344-a; delete, based on determining of the satisfaction of the semantic similarity threshold, the prior respective portion of text from the secondary storage environment 344-a; and delete, based on determining of the satisfaction of the semantic similarity threshold and based on the mapping log 391-a, a vector from the vector database 230-g that corresponds to the prior respective portion of text. As another example, the DMS 210-d may determine a satisfaction of a semantic similarity threshold between a respective portion of text of the one or more respective portions of text and a prior respective portion of text within one or more second files represented by a second snapshot of the computing system 205-c (e.g., based on respective vectors with the respective portions of text), the second snapshot corresponding to an earlier time than the first snapshot, where the prior respective portion of text is stored at the secondary storage environment 344-a; refrain, based on determining of the satisfaction of the semantic similarity threshold, from storing the respective portion of text in the secondary storage environment 344-a; and refrain, based on determining of the satisfaction of the semantic similarity threshold, from adding a vector that corresponds to the respective portion of text to the vector database 230-g.

In some examples, as described herein, the DMS 210-d may support or implement multiple communication applications 255. For example, the communication application may be associated with a first communication topic and a second communication application may be associated with a second communication topic (e.g., the different communication applications may be used for different topics or for different subsets of users associated with the customer). Each communication application may be associated with a respective vector database (e.g., the communication application may be associated with the vector database 230-g and a second communication application may be associated with a second vector database). For example, the DMS 210-d (e.g., the embedding manager 220-c) may generate one or more second vectors based on the data from the first snapshot, and the DMS 210-d may add the one or more second vectors to a second vector database along with second metadata or a second pointer to the second metadata. The one or more second vectors may be representative of one or more second respective portions of text within one or more second files represented by the first snapshot. The second metadata may be associated with the data from the first snapshot. The DMS 210-d may store the one or more second respective portions of text in the secondary storage environment 344-a (or a different storage environment). The second vector database in conjunction with the secondary storage environment 344-a (or the different storage environment) may be a second knowledge repository that is accessible to a second communication application associated with the customer of the DMS 210-d, the second communication application associated with communication with the LLM. The DMS 210-d may add, to the mapping log 391-a (or a different mapping log), second respective indications of mappings between the one or more second vectors and the one or more second respective portions of text. For example, the DMS 210-d may receive a second query for the LLM via the second application. The DMS 210-d may provide, via the second application, a second response to the second query that is based on the LLM, the one or more second vectors that were previously added to the second vector database, the one or more second respective portions of text stored in the secondary storage environment 344-a, and the second respective indications of mappings between the one or more second vectors and the one or more second respective portions of text stored in the mapping log 391-a.

In some examples, the DMS 210-d may obtain, subsequent to obtaining the first snapshot, a second snapshot of the computing system 205-c, where the second snapshot includes one or more files that are modified with respect to the first snapshot. In some such examples, the DMS 210-d (e.g., the embedding manager 220-c) may generate one or more second vectors based on second data from the one or more files that are modified with respect to the first snapshot, and the DMS 210-d may add the one or more second vectors to the vector database 230-g along with second metadata or a second pointer to the second metadata. The one or more second vectors may be representative of one or more second respective portions of text within the one or more second files that are modified with respect to the first snapshot. The second metadata may be associated with the second data from the second snapshot. The DMS 210-d may store the one or more second respective portions of text in the secondary storage environment 344-a. The DMS 210-d may add, to the mapping log 391-a, second respective indications of mappings between the one or more second vectors and the one or more second respective portions of text. In some examples, the DMS 210-d may delete superseded data from the vector database 230-g and the secondary storage environment 344-a. For example, the DMS 210-d may determine, based on the second snapshot, one or more files that are deleted with respect to the first snapshot; determine, based on the metadata, a subset of the one or more vectors corresponding to the one or more files that are deleted; delete the subset of the one or more vectors from the vector database 230-g; and delete, based on the mapping log 391-a, a subset of the one or more respective portions of text that correspond to the subset of the one or more vectors. In some examples, when vectors are deleted from the vector database 230-g or portions of text are deleted from the storage environment 344-a, the entries in the mapping log 391-a that correspond to the deleted vectors or portions of text may be deleted from the mapping log 391-a. As another example, the DMS 210-d may determine, based on the metadata, a subset of the one or more vectors corresponding to the one or more files that are modified; delete the subset of the one or more vectors from the vector database 230-g; and delete, based on the mapping log 391-a, a subset of the one or more respective portions of text that correspond to the subset of the one or more vectors.

Figure 8:
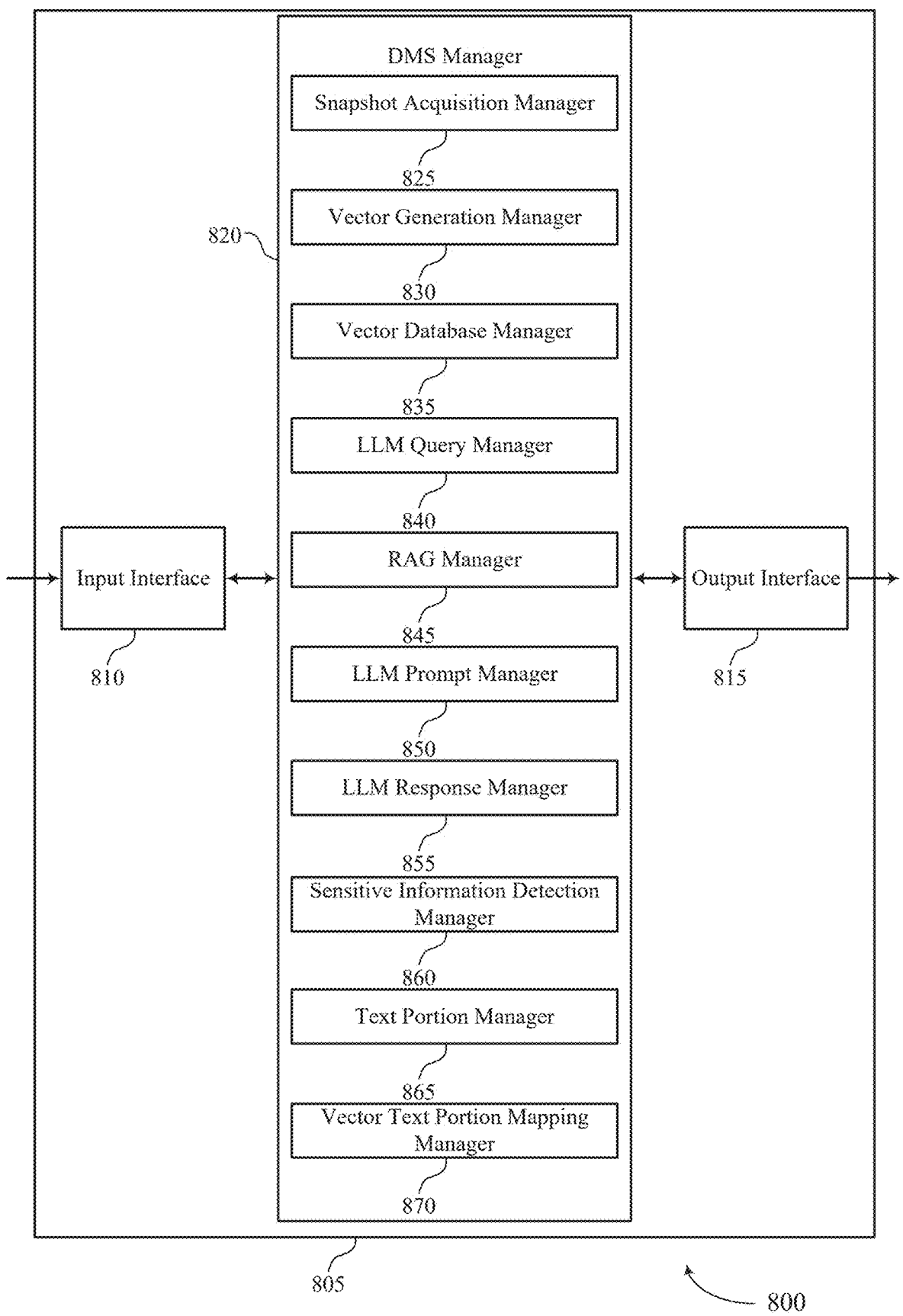
FIG. 8 shows a block diagram of an apparatus that supports RAG using backup data in accordance with aspects of the present disclosure.

FIG. 8 shows a block diagram 800 of a system 805 that supports RAG using backup data in accordance with aspects of the present disclosure. In some examples, the system 805 may be an example of aspects of one or more components described with reference to FIG. 1, such as a DMS 110. The system 805 may include an input interface 810, an output interface 815, and a DMS Manager 820. The system 805 may also include one or more processors. Each of these components may be in communication with one another (e.g., via one or more buses, communications links, communications interfaces, or any combination thereof).

The input interface 810 may manage input signaling for the system 805. For example, the input interface 810 may receive input signaling (e.g., messages, packets, data, instructions, commands, or any other form of encoded information) from other systems or devices. The input interface 810 may send signaling corresponding to (e.g., representative of or otherwise based on) such input signaling to other components of the system 805 for processing. For example, the input interface 810 may transmit such corresponding signaling to the DMS Manager 820 to support RAG using backup data. In some cases, the input interface 810 may be a component of a network interface 1025 as described with reference to FIG. 10.

The output interface 815 may manage output signaling for the system 805. For example, the output interface 815 may receive signaling from other components of the system 805, such as the DMS Manager 820 and may transmit such output signaling corresponding to (e.g., representative of or otherwise based on) such signaling to other systems or devices. In some cases, the output interface 815 may be a component of a network interface 1025 as described with reference to FIG. 10.

For example, the DMS Manager 820 may include a snapshot acquisition manager 825, a vector generation manager 830, a vector database manager 835, an LLM query manager 840, a RAG manager 845, an LLM prompt manager 850, an LLM response manager 855, a sensitive information detection manager 860, a text portion manager 865, a vector text portion mapping manager 870, or any combination thereof. In some examples, the DMS Manager 820, or various components thereof, may be configured to perform various operations (e.g., receiving, monitoring, transmitting) using or otherwise in cooperation with the input interface 810, the output interface 815, or both. For example, the DMS Manager 820 may receive information from the input interface 810, send information to the output interface 815, or be integrated in combination with the input interface 810, the output interface 815, or both to receive information, transmit information, or perform various other operations as described herein.

The snapshot acquisition manager 825 may be configured as or otherwise support a means for obtaining, by a DMS, a first snapshot of a computing system (e.g., associated with a customer of the DMS). The vector generation manager 830 may be configured as or otherwise support a means for generating, by the DMS, one or more vectors based on data from the first snapshot. The vector database manager 835 may be configured as or otherwise support a means for adding, by the DMS, the one or more vectors to a vector database along with metadata or a pointer to the metadata, where the metadata is associated with the data from the first snapshot, and where the vector database includes a knowledge repository that is accessible to an application associated with the DMS (e.g., associated with the customer of the DMS), the application further associated with communication with an LLM.

Additionally, or alternatively, the LLM query manager 840 may be configured as or otherwise support a means for receiving, by a DMS, a query for an LLM via an application associated with the DMS (e.g., associated with the customer of the DMS). The RAG manager 845 may be configured as or otherwise support a means for retrieving, by the DMS and based on contextual information associated with the query, information from a vector database accessible to the DMS, where the vector database includes one or more vectors including data associated with one or more snapshots obtained by the DMS of a computing system (e.g., associated with the customer of the DMS). The LLM prompt manager 850 may be configured as or otherwise support a means for generating, by the DMS and based on the query and the information, a prompt for the LLM. The LLM response manager 855 may be configured as or otherwise support a means for providing, by the DMS via the application, a response to the query that is based on the prompt and the LLM.

Additionally, or alternatively, the snapshot acquisition manager 825 may be configured as or otherwise support a means for obtaining, by a DMS, a first snapshot of a computing system (e.g., associated with a customer of the DMS), where the first snapshot includes data associated with a set of files. The sensitive information detection manager 860 may be configured as or otherwise support a means for determining, by the DMS, from among the set of files, a first subset of files or portions of files that include sensitive information. The vector generation manager 830 may be configured as or otherwise support a means for generating, by the DMS, one or more vectors based on data associated with a second subset of files or portions of files from among the set of files, the second subset of files or portions of files exclusive of files from the first subset of files or portions of files. The vector database manager 835 may be configured as or otherwise support a means for adding, by the DMS, the one or more vectors to a vector database along with metadata or a pointer to the metadata, where the metadata is associated with the data from the first snapshot, and where the vector database includes a knowledge repository that is accessible to an application associated with the DMS (e.g., associated with the customer of the DMS), the application further associated with communication with an LLM.

Additionally, or alternatively, the snapshot acquisition manager 825 may be configured as or otherwise support a means for obtaining, by a DMS, a first snapshot of a computing system (e.g., associated with a customer of the DMS). The vector generation manager 830 may be configured as or otherwise support a means for generating, by the DMS, one or more vectors based on data from the first snapshot, the one or more vectors representative of one or more respective portions of text within one or more files represented by the first snapshot. The vector database manager 835 may be configured as or otherwise support a means for adding, by the DMS, the one or more vectors to a vector database along with metadata or a pointer to the metadata, where the metadata is associated with the data from the first snapshot. The text portion manager 865 may be configured as or otherwise support a means for storing, by the DMS, the one or more respective portions of text in a secondary storage environment, where the vector database in conjunction with the secondary storage environment includes a knowledge repository that is accessible to an application associated with the DMS (e.g., associated with the customer of the DMS), the application further associated with communication with an LLM. The vector text portion mapping manager 870 may be configured as or otherwise support a means for adding, by the DMS to a mapping log, respective indications of mappings between the one or more vectors and the one or more respective portions of text.

Figure 9:
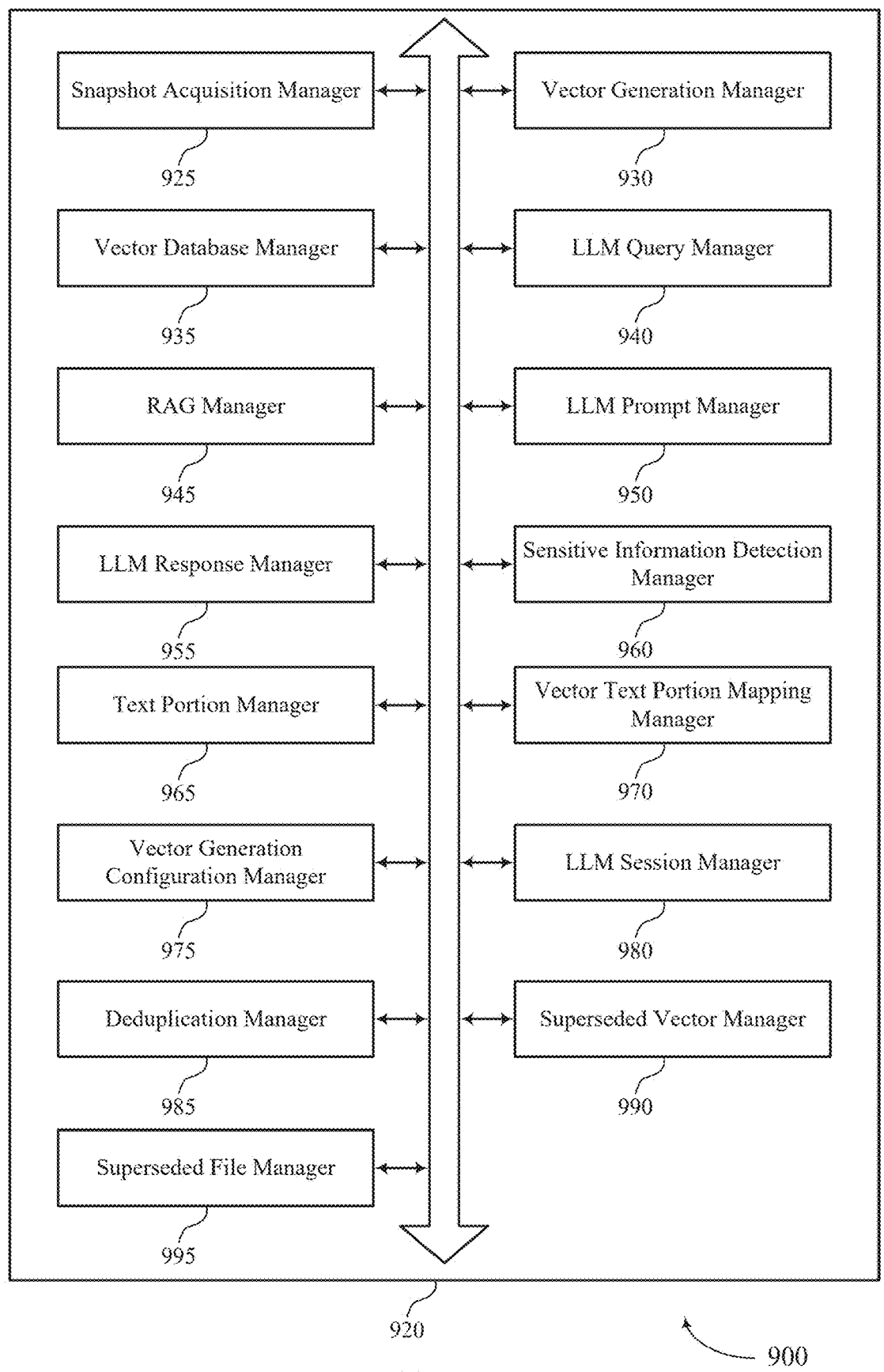
FIG. 9 shows a block diagram of a DMS Manager that supports RAG using backup data in accordance with aspects of the present disclosure.

FIG. 9 shows a block diagram 900 of a DMS Manager 920 that supports RAG using backup data in accordance with aspects of the present disclosure. The DMS Manager 920 may be an example of aspects of a DMS Manager or a DMS Manager 820, or both, as described herein. The DMS Manager 920, or various components thereof, may be an example of means for performing various aspects of RAG using backup data as described herein. For example, the DMS Manager 920 may include a snapshot acquisition manager 925, a vector generation manager 930, a vector database manager 935, an LLM query manager 940, a RAG manager 945, an LLM prompt manager 950, an LLM response manager 955, a sensitive information detection manager 960, a text portion manager 965, a vector text portion mapping manager 970, a vector generation configuration manager 975, an LLM session manager 980, a deduplication manager 985, a superseded vector manager 990, a superseded file manager 995, or any combination thereof. Each of these components, or components of subcomponents thereof (e.g., one or more processors, one or more memories), may communicate, directly or indirectly, with one another (e.g., via one or more buses, communications links, communications interfaces, or any combination thereof).

In some examples, the snapshot acquisition manager 925 may be configured as or otherwise support a means for obtaining, by a DMS, a first snapshot of a computing system (e.g., associated with a customer of the DMS). The vector generation manager 930 may be configured as or otherwise support a means for generating, by the DMS, one or more vectors based on data from the first snapshot. The vector database manager 935 may be configured as or otherwise support a means for adding, by the DMS, the one or more vectors to a vector database along with metadata or a pointer to the metadata, where the metadata is associated with the data from the first snapshot, and where the vector database includes a knowledge repository that is accessible to an application associated with the DMS (e.g., associated with the customer of the DMS), the application further associated with communication with an LLM.

In some examples, the vector generation configuration manager 975 may be configured as or otherwise support a means for receiving, by the DMS, configuration information that schedules the DMS to generate vectors for addition to the vector database in association with obtention of snapshots of the computing system, where generating the one or more vectors is based on the configuration information.

In some examples, the vector generation configuration manager 975 may be configured as or otherwise support a means for receiving, by the DMS within the configuration information, an indication of one or more types of files for which to generate vectors for addition to the vector database. In some examples, the vector generation manager 930 may be configured as or otherwise support a means for determining, by the DMS, a set of files within the first snapshot that match the one or more types of files, where the one or more vectors are generated based on the set of files.

In some examples, the LLM query manager 940 may be configured as or otherwise support a means for receiving, by the DMS, a query for the LLM via the application. In some examples, the LLM response manager 955 may be configured as or otherwise support a means for providing, by the DMS via the application, a response to the query that is based on the LLM and the one or more vectors that were previously added to the vector database.

In some examples, the RAG manager 945 may be configured as or otherwise support a means for retrieving, by the DMS and based on contextual information associated with the query, information from the vector database. In some examples, the LLM prompt manager 950 may be configured as or otherwise support a means for generating, by the DMS and based on the query and the information, a prompt for the LLM, where the response to the query is based on the prompt.

In some examples, the LLM prompt manager 950 may be configured as or otherwise support a means for transmitting the prompt to the LLM. In some examples, the LLM response manager 955 may be configured as or otherwise support a means for receiving, from the LLM, a reply to the prompt, where the response to the query is based on the reply to the prompt.

In some examples, the one or more vectors are representative of one or more respective portions of text within one or more files represented by the first snapshot, the one or more respective portions of text stored in the vector database or in a secondary storage environment accessible to the DMS and in association with the one or more vectors. In some examples, the information from the vector database includes a subset of the one or more respective portions of text that correspond to a subset of the one or more vectors identified based on the contextual information.

In some examples, the metadata is indicative of an identifier for the first snapshot, an identifier of the computing system, or any combination thereof.

In some examples, the vector generation manager 930 may be configured as or otherwise support a means for generating, by the DMS, one or more second vectors based on the data from the first snapshot. In some examples, the vector database manager 935 may be configured as or otherwise support a means for adding, by the DMS, the one or more second vectors to a second vector database along with second metadata or a second pointer to the second metadata, where the second metadata is associated with the data from the first snapshot, where the second vector database includes a second knowledge repository that is accessible to a second application associated with the DMS (e.g., associated with the customer of the DMS), the second application further associated with communication with the LLM.

In some examples, the application is associated with a first communication topic. In some examples, the second application is associated with a second communication topic.

In some examples, the vector generation configuration manager 975 may be configured as or otherwise support a means for receiving, by the DMS, configuration information that schedules the DMS to generate first vectors for addition to the vector database and second vectors for addition to the second vector database in association with obtention of snapshots of the computing system, where generation of the one or more vectors is based on the configuration information, and where generation of the one or more second vectors is based on the configuration information.

In some examples, the LLM query manager 940 may be configured as or otherwise support a means for receiving, by the DMS, a second query for the LLM via the second application. In some examples, the LLM response manager 955 may be configured as or otherwise support a means for providing, by the DMS via the second application, a second response to the second query that is based on the LLM and the one or more second vectors that were previously added to the second vector database.

In some examples, the snapshot acquisition manager 925 may be configured as or otherwise support a means for storing, by the DMS, the first snapshot in one or more storage nodes accessible to the DMS. In some examples, the vector generation manager 930 may be configured as or otherwise support a means for retrieving, by the DMS, the first snapshot from the one or more storage nodes to generate the one or more vectors.

In some examples, the snapshot acquisition manager 925 may be configured as or otherwise support a means for obtaining, by the DMS and subsequent to obtaining the first snapshot, a second snapshot of the computing system, where the second snapshot includes one or more files that are modified with respect to the first snapshot. In some examples, the vector generation manager 930 may be configured as or otherwise support a means for generating, by the DMS, one or more second vectors based on second data from the one or more files that are modified with respect to the first snapshot. In some examples, the vector database manager 935 may be configured as or otherwise support a means for adding, by the DMS, the one or more second vectors to the vector database along with second metadata or a second pointer to the second metadata, where the second metadata is associated with the second data from the second snapshot.

In some examples, the superseded vector manager 990 may be configured as or otherwise support a means for determining, by the DMS and based on the metadata, a subset of the one or more vectors corresponding to the one or more files that are modified. In some examples, the vector database manager 935 may be configured as or otherwise support a means for deleting the subset of the one or more vectors from the vector database.

In some examples, the superseded file manager 995 may be configured as or otherwise support a means for determining, by the DMS and based on the second snapshot, one or more files that are deleted with respect to the first snapshot. In some examples, the superseded vector manager 990 may be configured as or otherwise support a means for determining, by the DMS and based on the metadata, a subset of the one or more vectors corresponding to the one or more files that are deleted. In some examples, the vector database manager 935 may be configured as or otherwise support a means for deleting the subset of the one or more vectors from the vector database.

In some examples, each vector of the one or more vectors corresponds to a respective portion of text within a file represented by the first snapshot.

In some examples, the snapshot acquisition manager 925 may be configured as or otherwise support a means for obtaining, by the DMS, a second snapshot of a second computing system (e.g., associated with the customer of the DMS). In some examples, the vector generation manager 930 may be configured as or otherwise support a means for generating, by the DMS, one or more second vectors based on second data from the second snapshot. In some examples, the vector database manager 935 may be configured as or otherwise support a means for adding, by the DMS, the one or more second vectors to the vector database along with second metadata or a second pointer to the second metadata, where the second metadata is associated with the second data from the second snapshot.

In some examples, the LLM query manager 940 may be configured as or otherwise support a means for receiving, by a DMS, a query for an LLM via an application associated with the DMS (e.g., associated with a customer of the DMS). The RAG manager 945 may be configured as or otherwise support a means for retrieving, by the DMS and based on contextual information associated with the query, information from a vector database accessible to the DMS, where the vector database includes one or more vectors including data associated with one or more snapshots obtained by the DMS of a computing system (e.g., associated with the customer of the DMS). The LLM prompt manager 950 may be configured as or otherwise support a means for generating, by the DMS and based on the query and the information, a prompt for the LLM. The LLM response manager 955 may be configured as or otherwise support a means for providing, by the DMS via the application, a response to the query that is based on the prompt and the LLM.

In some examples, to support retrieving the information from the vector database, the RAG manager 945 may be configured as or otherwise support a means for identifying a subset of the one or more vectors that satisfy a semantic similarity threshold with the contextual information, where the information includes data associated with the subset of the one or more vectors.

In some examples, the one or more vectors are representative of one or more respective portions of text within one or more files represented by the one or more snapshots, the one or more respective portions of text stored in the vector database in association with the one or more vectors. In some examples, the information from the vector database includes a subset of the one or more respective portions of text that correspond to the subset of the one or more vectors.

In some examples, the snapshot acquisition manager 925 may be configured as or otherwise support a means for obtaining, by the DMS, the one or more snapshots. In some examples, the vector generation manager 930 may be configured as or otherwise support a means for generating, by the DMS and based on obtaining the one or more snapshots, the one or more vectors. In some examples, the vector database manager 935 may be configured as or otherwise support a means for adding, by the DMS, the one or more vectors to the vector database.

In some examples, the vector generation configuration manager 975 may be configured as or otherwise support a means for receiving, by the DMS, configuration information that schedules the DMS to generate vectors for addition to the vector database in association with obtention of snapshots of the computing system, where generating the one or more vectors is based on the configuration information.

In some examples, the vector generation configuration manager 975 may be configured as or otherwise support a means for receiving, by the DMS within the configuration information, an indication of one or more types of files for which to generate vectors for addition to the vector database, where the one or more vectors are generated based at least in part on one or more files in the one or more snapshots that match the one or more types of files.

In some examples, the LLM query manager 940 may be configured as or otherwise support a means for receiving, by the DMS, a second query for the LLM via a second application associated with the DMS (e.g., associated with the customer of the DMS). In some examples, the RAG manager 945 may be configured as or otherwise support a means for retrieving, by the DMS and based on second contextual information associated with the second query, second information from a second vector database accessible to the DMS, where the second vector database includes one or more second vectors including second data associated with the one or more snapshots. In some examples, the LLM prompt manager 950 may be configured as or otherwise support a means for generating, by the DMS and based on the second query and the second information, a second prompt for the LLM. In some examples, the LLM response manager 955 may be configured as or otherwise support a means for providing, by the DMS via the second application, a second response to the second query that is based on the second prompt and the LLM.

In some examples, the application is associated with a first communication topic. In some examples, the second application is associated with a second communication topic.

In some examples, the vector generation configuration manager 975 may be configured as or otherwise support a means for receiving, by the DMS, configuration information that schedules the DMS to generate first vectors for addition to the vector database and second vectors for addition to the second vector database in association with obtention of snapshots of the computing system, where generation of the one or more vectors is based on the configuration information, and where generation of the one or more second vectors is based on the configuration information.

In some examples, the LLM query manager 940 may be configured as or otherwise support a means for receiving, by the DMS, a second query for the LLM via the application. In some examples, the RAG manager 945 may be configured as or otherwise support a means for retrieving, by the DMS and based on second contextual information associated with the second query, second information from the vector database. In some examples, the LLM prompt manager 950 may be configured as or otherwise support a means for generating, by the DMS and based on the second query and the second information, a second prompt for the LLM. In some examples, the LLM response manager 955 may be configured as or otherwise support a means for providing, by the DMS via the application, a second response to the second query that is based on the second prompt and the LLM.

In some examples, the vector database includes metadata associated with the one or more vectors or a pointer to the metadata, the metadata indicating a respective snapshot of the one or more snapshots associated with each of the one or more vectors. In some examples, retrieving the information is further based on the metadata.

In some examples, retrieving the information is further based on weights assigned to dates of the one or more snapshots. In some examples, the metadata is indicative of the dates of the one or more snapshots.

In some examples, the LLM prompt manager 950 may be configured as or otherwise support a means for transmitting the prompt to the LLM. In some examples, the LLM response manager 955 may be configured as or otherwise support a means for receiving, from the LLM, a reply to the prompt, where the response to the query is based on the reply to the prompt.

In some examples, to support receiving the query, the LLM query manager 940 may be configured as or otherwise support a means for receiving the query via a UI associated with a user account (e.g., associated with the customer of the DMS), where the contextual information is based on the user account.

In some examples, the LLM query manager 940 may be configured as or otherwise support a means for identifying, by the DMS, one or more keywords in the query, where the contextual information is based on the one or more keywords.

In some examples, the LLM session manager 980 may be configured as or otherwise support a means for receiving, by the DMS and via a UI, a request for a communication session via the application. In some examples, the LLM session manager 980 may be configured as or otherwise support a means for causing, by the DMS and at the UI in response to the request for the communication session, presentation of a set of multiple topics. In some examples, the LLM session manager 980 may be configured as or otherwise support a means for receiving, by the DMS and via the UI, an indication of a selected topic of the set of multiple topics, where the contextual information is based on the selected topic.

In some examples, the snapshot acquisition manager 925 may be configured as or otherwise support a means for obtaining, by a DMS, a first snapshot of a computing system (e.g., associated with a customer of the DMS), where the first snapshot includes data associated with a set of files. The sensitive information detection manager 960 may be configured as or otherwise support a means for determining, by the DMS, from among the set of files, a first subset of files or portions of files that include sensitive information. In some examples, the vector generation manager 930 may be configured as or otherwise support a means for generating, by the DMS, one or more vectors based on data associated with a second subset of files or portions of files from among the set of files, the second subset of files or portions of files exclusive of files from the first subset of files or portions of files. In some examples, the vector database manager 935 may be configured as or otherwise support a means for adding, by the DMS, the one or more vectors to a vector database along with metadata or a pointer to the metadata, where the metadata is associated with the data from the first snapshot, and where the vector database includes a knowledge repository that is accessible to an application associated with the DMS (e.g., associated with the customer of the DMS), the application further associated with communication with an LLM.

In some examples, the vector generation configuration manager 975 may be configured as or otherwise support a means for receiving, by the DMS, configuration information including one or more rules for determining that a file includes sensitive information, where determining the first subset of files or portions of files is based on the one or more rules.

In some examples, the one or more rules are based at least in part on a file type, inclusion of one or more keywords in a file name, inclusion of one or more keywords in text of a file, inclusion of one or more types of data structures in a file, or any combination thereof.

In some examples, the configuration information further schedules the DMS to generate vectors for addition to the vector database in association with obtention of snapshots of the computing system. In some examples, generating the one or more vectors is based on the configuration information.

In some examples, the vector generation configuration manager 975 may be configured as or otherwise support a means for receiving, by the DMS with the configuration information, an indication of one or more types of files for which to generate vectors for addition to the vector database. In some examples, the vector generation manager 930 may be configured as or otherwise support a means for determining, by the DMS, the set of files within the first snapshot that match the one or more types of files.

In some examples, based on the first subset of files or portions of files including sensitive information, no vectors are added to the vector database based on data associated with the first subset of files or portions of files that include sensitive information.

In some examples, the vector generation manager 930 may be configured as or otherwise support a means for generating, by the DMS, one or more second vectors based on second data from the first snapshot, where the second data is from at least some of the first subset of files or portions of files. In some examples, the vector database manager 935 may be configured as or otherwise support a means for adding, by the DMS, the one or more second vectors to a second vector database along with second metadata or a second pointer to the second metadata, where the second metadata is associated with the data from the first snapshot, and where the second vector database includes a second knowledge repository that is accessible to a second application associated with the DMS (e.g., with the customer of the DMS), the second application further associated with communication with the LLM.

In some examples, the vector generation configuration manager 975 may be configured as or otherwise support a means for receiving, by the DMS, configuration information that schedules the DMS to generate first vectors for addition to the vector database and second vectors for addition to the second vector database in association with obtention of snapshots of the computing system, where generating the one or more vectors is based on the configuration information, and where generating the one or more second vectors is based on the configuration information.

In some examples, the configuration information indicates one or more first rules for determining that a file includes sensitive information in association with generating the one or more vectors. In some examples, the configuration information indicates one or more second rules for determining that a file includes sensitive information in association with generating the one or more second vectors.

In some examples, the application is associated with a first communication topic. In some examples, the second application is associated with a second communication topic.

In some examples, the LLM query manager 940 may be configured as or otherwise support a means for receiving, by the DMS, a query for the LLM via the application. In some examples, the LLM response manager 955 may be configured as or otherwise support a means for providing, by the DMS via the application, a response to the query that is based on the LLM and the one or more vectors that were previously added to the vector database.

In some examples, the RAG manager 945 may be configured as or otherwise support a means for retrieving, by the DMS and based on contextual information associated with the query, information from the vector database. In some examples, the LLM prompt manager 950 may be configured as or otherwise support a means for generating, by the DMS and based on the query and the information, a prompt for the LLM, where the response to the query is based on the prompt.

In some examples, the LLM prompt manager 950 may be configured as or otherwise support a means for transmitting the prompt to the LLM. In some examples, the LLM response manager 955 may be configured as or otherwise support a means for receiving, from the LLM, a reply to the prompt, where the response to the query is based on the reply to the prompt.

In some examples, the one or more vectors are representative of one or more respective portions of text within one or more files of the second subset of files or portions of files, the one or more respective portions of text stored in the vector database in association with the one or more vectors. In some examples, the information from the vector database includes a subset of the one or more respective portions of text that correspond to a subset of the one or more vectors identified based on the contextual information.

In some examples, the metadata is indicative of an identifier for the first snapshot, an identifier of the computing system, or any combination thereof.

In some examples, the snapshot acquisition manager 925 may be configured as or otherwise support a means for storing, by the DMS, the first snapshot in one or more storage nodes accessible to the DMS. In some examples, the vector generation manager 930 may be configured as or otherwise support a means for retrieving, by the DMS, the first snapshot from the one or more storage nodes to generate the one or more vectors.

In some examples, the snapshot acquisition manager 925 may be configured as or otherwise support a means for obtaining, by the DMS and subsequent to obtaining the first snapshot, a second snapshot of the computing system, where the second snapshot includes a second set of files that are modified with respect to the first snapshot. In some examples, the sensitive information detection manager 960 may be configured as or otherwise support a means for determining, by the DMS, from among the second set of files, a third subset of files or portions of files that include sensitive information. In some examples, the vector generation manager 930 may be configured as or otherwise support a means for generating, by the DMS, one or more second vectors based on data associated with a fourth subset of files or portions of files from among the second set of files, the fourth subset of files or portions of files exclusive of files from the third subset of files or portions of files. In some examples, the vector database manager 935 may be configured as or otherwise support a means for adding, by the DMS, the one or more second vectors to the vector database along with second metadata or a second pointer to the second metadata, where the second metadata is associated with the second snapshot.

In some examples, the superseded vector manager 990 may be configured as or otherwise support a means for determining, by the DMS and based on the metadata, a subset of the one or more vectors corresponding to the second set of files that are modified. In some examples, the vector database manager 935 may be configured as or otherwise support a means for deleting the subset of the one or more vectors from the vector database.

In some examples, the superseded file manager 995 may be configured as or otherwise support a means for determining, by the DMS and based on the second snapshot, one or more files that are deleted with respect to the first snapshot. In some examples, the superseded vector manager 990 may be configured as or otherwise support a means for determining, by the DMS and based on the metadata, a subset of the one or more vectors corresponding to the one or more files that are deleted. In some examples, the vector database manager 935 may be configured as or otherwise support a means for deleting the subset of the one or more vectors from the vector database.

In some examples, each vector of the one or more vectors corresponds to a respective portion of text within a file represented by the first snapshot.

In some examples, the snapshot acquisition manager 925 may be configured as or otherwise support a means for obtaining, by a DMS, a first snapshot of a computing system (e.g., associated with a customer of the DMS). In some examples, the vector generation manager 930 may be configured as or otherwise support a means for generating, by the DMS, one or more vectors based on data from the first snapshot, the one or more vectors representative of one or more respective portions of text within one or more files represented by the first snapshot. In some examples, the vector database manager 935 may be configured as or otherwise support a means for adding, by the DMS, the one or more vectors to a vector database along with metadata or a pointer to the metadata, where the metadata is associated with the data from the first snapshot. The text portion manager 965 may be configured as or otherwise support a means for storing, by the DMS, the one or more respective portions of text in a secondary storage environment, where the vector database in conjunction with the secondary storage environment includes a knowledge repository that is accessible to an application associated with the DMS (e.g., associated with the customer of the DMS), the application further associated with communication with an LLM. The vector text portion mapping manager 970 may be configured as or otherwise support a means for adding, by the DMS to a mapping log, respective indications of mappings between the one or more vectors and the one or more respective portions of text.

In some examples, the vector generation configuration manager 975 may be configured as or otherwise support a means for receiving, by the DMS, configuration information that schedules the DMS to generate vectors for addition to the vector database in association with obtention of snapshots of the computing system, where generating the one or more vectors is based on the configuration information.

In some examples, the vector generation configuration manager 975 may be configured as or otherwise support a means for receiving, by the DMS within the configuration information, an indication to store the one or more respective portions of text in the secondary storage environment.

In some examples, the vector generation configuration manager 975 may be configured as or otherwise support a means for receiving, by the DMS within the configuration information, an indication of one or more types of files for which to generate vectors for addition to the vector database. In some examples, the vector generation manager 930 may be configured as or otherwise support a means for identifying, by the DMS, a set of files within the first snapshot including the one or more types of files, where the one or more vectors are generated based on the set of files.

In some examples, the LLM query manager 940 may be configured as or otherwise support a means for receiving, by the DMS, a query for the LLM via the application. In some examples, the LLM response manager 955 may be configured as or otherwise support a means for providing, by the DMS via the application, a response to the query that is based on the LLM and the one or more vectors that were previously added to the vector database, the one or more respective portions of text stored in the secondary storage environment, and the respective indications of mappings between the one or more vectors and the one or more respective portions of text.

In some examples, the RAG manager 945 may be configured as or otherwise support a means for identifying, by the DMS and based on contextual information associated with the query, a subset of the one or more vectors. In some examples, the vector text portion mapping manager 970 may be configured as or otherwise support a means for identifying, by the DMS and based on the mapping log, a subset of the one or more respective portions of text that corresponds to the subset of the one or more vectors. In some examples, the RAG manager 945 may be configured as or otherwise support a means for retrieving, based on identifying the subset of the one or more respective portions of text, the subset of the one or more respective portions of text from the secondary storage environment. In some examples, the LLM prompt manager 950 may be configured as or otherwise support a means for generating, by the DMS and based on the query and the subset of the one or more respective portions of text, a prompt for the LLM, where the response to the query is based on the prompt.

In some examples, the LLM prompt manager 950 may be configured as or otherwise support a means for transmitting the prompt to the LLM. In some examples, the LLM response manager 955 may be configured as or otherwise support a means for receiving, from the LLM, a reply to the prompt, where the response to the query is based on the reply to the prompt.

In some examples, to support identifying the subset of the one or more vectors, the RAG manager 945 may be configured as or otherwise support a means for determining that each vector within the subset of the one or more vectors satisfies a semantic similarity threshold with the contextual information.

In some examples, the deduplication manager 985 may be configured as or otherwise support a means for determining, by the DMS, that two or more respective portions of text within the one or more files represented by the first snapshot satisfy a semantic similarity threshold, where storing the one or more respective portions of text includes storing a single portion of text in the secondary storage environment based on the two or more respective portions of text satisfying the semantic similarity threshold, the single portion of text being one of the two or more respective portions of text.

In some examples, the deduplication manager 985 may be configured as or otherwise support a means for determining, by the DMS, a satisfaction of a semantic similarity threshold between a respective portion of text of the one or more respective portions of text and a prior respective portion of text within one or more second files represented by a second snapshot of the computing system, the second snapshot corresponding to an earlier time than the first snapshot, where the prior respective portion of text is stored at the secondary storage environment. In some examples, the deduplication manager 985 may be configured as or otherwise support a means for deleting, based on determining of the satisfaction of the semantic similarity threshold, the prior respective portion of text from the secondary storage environment. In some examples, the deduplication manager 985 may be configured as or otherwise support a means for deleting, based on determining of the satisfaction of the semantic similarity threshold and based on the mapping log, a vector from the vector database that corresponds to the prior respective portion of text.

In some examples, the deduplication manager 985 may be configured as or otherwise support a means for determining, by the DMS, a satisfaction of a semantic similarity threshold between a respective portion of text of the one or more respective portions of text and a prior respective portion of text within one or more second files represented by a second snapshot of the computing system, the second snapshot corresponding to an earlier time than the first snapshot, where the prior respective portion of text is stored at the secondary storage environment. In some examples, the deduplication manager 985 may be configured as or otherwise support a means for refraining, based on determining of the satisfaction of the semantic similarity threshold, from storing the respective portion of text in the secondary storage environment. In some examples, the deduplication manager 985 may be configured as or otherwise support a means for refraining, based on determining of the satisfaction of the semantic similarity threshold, from adding a vector that corresponds to the respective portion of text to the vector database.

In some examples, the metadata is indicative of an identifier for the first snapshot, an identifier of the computing system, or any combination thereof.

In some examples, the vector generation manager 930 may be configured as or otherwise support a means for generating, by the DMS, one or more second vectors based on data from the first snapshot, the one or more second vectors representative of one or more second respective portions of text within one or more second files represented by the first snapshot. In some examples, the vector database manager 935 may be configured as or otherwise support a means for adding, by the DMS, the one or more second vectors to a second vector database along with second metadata or a second pointer to the second metadata, where the second metadata is associated with the data from the first snapshot. In some examples, the text portion manager 965 may be configured as or otherwise support a means for storing, by the DMS, the one or more second respective portions of text in the secondary storage environment, where the second vector database in conjunction with the secondary storage environment includes a second knowledge repository that is accessible to a second application associated with the DMS (e.g., associated with the customer of the DMS), the second application associated with communication with the LLM. In some examples, the vector text portion mapping manager 970 may be configured as or otherwise support a means for adding, by the DMS to the mapping log or a second mapping log, second respective indications of mappings between the one or more second vectors and the one or more second respective portions of text.

In some examples, the application is associated with a first communication topic, and the second application is associated with a second communication topic.

In some examples, the LLM query manager 940 may be configured as or otherwise support a means for receiving, by the DMS, a second query for the LLM via the second application. In some examples, the LLM response manager 955 may be configured as or otherwise support a means for providing, by the DMS via the second application, a second response to the second query that is based on the LLM and the one or more second vectors that were previously added to the second vector database, the one or more second respective portions of text stored in the secondary storage environment, and the second respective indications of mappings between the one or more second vectors and the one or more second respective portions of text.

In some examples, the snapshot acquisition manager 925 may be configured as or otherwise support a means for storing, by the DMS, the first snapshot in one or more storage nodes accessible to the DMS. In some examples, the vector generation manager 930 may be configured as or otherwise support a means for retrieving, by the DMS, the first snapshot from the one or more storage nodes to generate the one or more vectors and to store the one or more respective portions of text in the secondary storage environment.

In some examples, the snapshot acquisition manager 925 may be configured as or otherwise support a means for obtaining, by the DMS and subsequent to obtaining the first snapshot, a second snapshot of the computing system, where the second snapshot includes one or more second files that are modified with respect to the first snapshot. In some examples, the vector generation manager 930 may be configured as or otherwise support a means for generating, by the DMS, one or more second vectors based on second data from the second snapshot, the one or more second vectors representative of one or more second respective portions of text within the one or more second files that are modified with respect to the first snapshot. In some examples, the vector database manager 935 may be configured as or otherwise support a means for adding, by the DMS, the one or more second vectors to the vector database along with second metadata or a second pointer to the second metadata, where the second metadata is associated with the second data from the second snapshot. In some examples, the text portion manager 965 may be configured as or otherwise support a means for storing, by the DMS, the one or more second respective portions of text in the secondary storage environment. In some examples, the vector text portion mapping manager 970 may be configured as or otherwise support a means for adding, by the DMS to the mapping log, second respective indications of mappings between the one or more second vectors and the one or more second respective portions of text.

In some examples, the superseded vector manager 990 may be configured as or otherwise support a means for identifying, by the DMS and based on the metadata, a subset of the one or more vectors corresponding to the one or more second files that are modified. In some examples, the vector database manager 935 may be configured as or otherwise support a means for deleting the subset of the one or more vectors from the vector database. In some examples, the text portion manager 965 may be configured as or otherwise support a means for deleting, based on the mapping log, a subset of the one or more respective portions of text that correspond to the subset of the one or more vectors.

In some examples, the superseded file manager 995 may be configured as or otherwise support a means for identifying, by the DMS and based on the second snapshot, one or more third files that are deleted with respect to the first snapshot. In some examples, the superseded vector manager 990 may be configured as or otherwise support a means for identifying, by the DMS and based on the metadata, a subset of the one or more vectors corresponding to the one or more third files that are deleted. In some examples, the vector database manager 935 may be configured as or otherwise support a means for deleting the subset of the one or more vectors from the vector database. In some examples, the text portion manager 965 may be configured as or otherwise support a means for deleting, based on the mapping log, a subset of the one or more respective portions of text that correspond to the subset of the one or more vectors.

Figure 10:
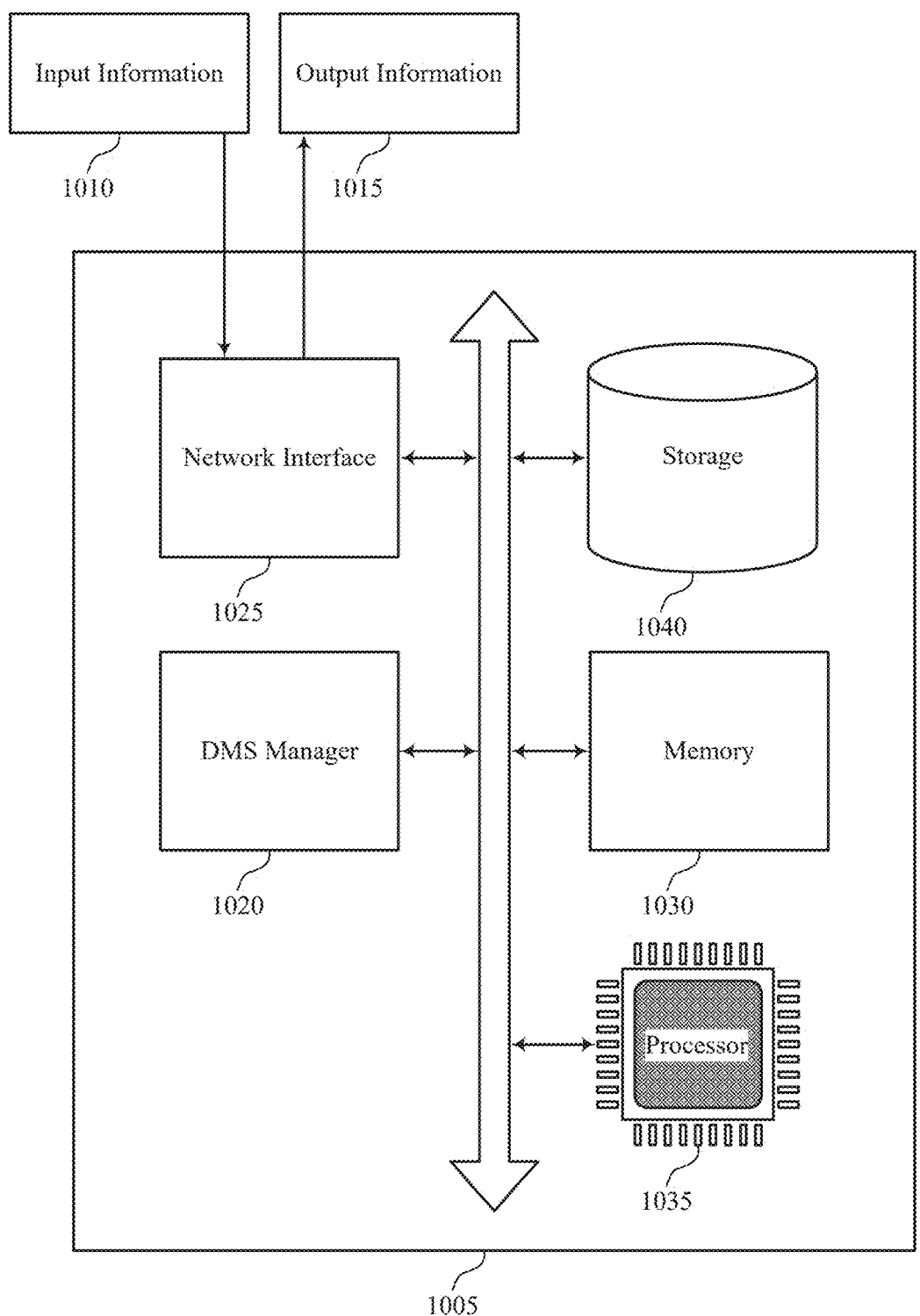
FIG. 10 shows a diagram of a system including a device that supports RAG using backup data in accordance with aspects of the present disclosure.

FIG. 10 shows a block diagram 1000 of a system 1005 that supports RAG using backup data in accordance with aspects of the present disclosure. The system 1005 may be an example of or include components of a system 805 as described herein. The system 1005 may include components for data management, including components such as a DMS Manager 1020, an input information 1010, an output information 1015, a network interface 1025, at least one memory 1030, at least one processor 1035, and a storage 1040. These components may be in electronic communication or otherwise coupled with each other (e.g., operatively, communicatively, functionally, electronically, electrically; via one or more buses, communications links, communications interfaces, or any combination thereof). Additionally, the components of the system 1005 may include corresponding physical components or may be implemented as corresponding virtual components (e.g., components of one or more virtual machines). In some examples, the system 1005 may be an example of aspects of one or more components described with reference to FIG. 1, such as a DMS 110.

The network interface 1025 may enable the system 1005 to exchange information (e.g., input information 1010, output information 1015, or both) with other systems or devices (not shown). For example, the network interface 1025 may enable the system 1005 to connect to a network (e.g., a network 120 as described herein). The network interface 1025 may include one or more wireless network interfaces, one or more wired network interfaces, or any combination thereof. In some examples, the network interface 1025 may be an example of may be an example of aspects of one or more components described with reference to FIG. 1, such as one or more network interfaces 165.

Memory 1030 may include RAM, ROM, or both. The memory 1030 may store computer-readable, computer-executable software including instructions that, when executed, cause the processor 1035 to perform various functions described herein. In some cases, the memory 1030 may contain, among other things, a basic input/output system (BIOS), which may control basic hardware or software operation such as the interaction with peripheral components or devices. In some cases, the memory 1030 may be an example of aspects of one or more components described with reference to FIG. 1, such as one or more memories 175.

The processor 1035 may include an intelligent hardware device, (e.g., a general-purpose processor, a DSP, a CPU, a microcontroller, an ASIC, a field programmable gate array (FPGA), a programmable logic device, a discrete gate or transistor logic component, a discrete hardware component, or any combination thereof). The processor 1035 may be configured to execute computer-readable instructions stored in a memory 1030 to perform various functions (e.g., functions or tasks supporting RAG using backup data). Though a single processor 1035 is depicted in the example of FIG. 10, it is to be understood that the system 1005 may include any quantity of one or more of processors 1035 and that a group of processors 1035 may collectively perform one or more functions ascribed herein to a processor, such as the processor 1035. In some cases, the processor 1035 may be an example of aspects of one or more components described with reference to FIG. 1, such as one or more processors 170.

Storage 1040 may be configured to store data that is generated, processed, stored, or otherwise used by the system 1005. In some cases, the storage 1040 may include one or more HDDs, one or more SDDs, or both. In some examples, the storage 1040 may be an example of a single database, a distributed database, multiple distributed databases, a data store, a data lake, or an emergency backup database. In some examples, the storage 1040 may be an example of one or more components described with reference to FIG. 1, such as one or more network disks 180.

The DMS Manager 1020 may be configured as or otherwise support a means for obtaining, by a DMS, a first snapshot of a computing system (e.g. associated with a customer of the DMS). The DMS Manager 1020 may be configured as or otherwise support a means for generating, by the DMS, one or more vectors based on data from the first snapshot. The DMS Manager 1020 may be configured as or otherwise support a means for adding, by the DMS, the one or more vectors to a vector database along with metadata or a pointer to the metadata, where the metadata is associated with the data from the first snapshot, and where the vector database includes a knowledge repository that is accessible to an application associated with the DMS (e.g., associated with the customer of the DMS), the application further associated with communication with an LLM.

Additionally, or alternatively, the DMS Manager 1020 may be configured as or otherwise support a means for receiving, by a DMS, a query for an LLM via an application associated with the DMS (e.g., associated with a customer of the DMS). The DMS Manager 1020 may be configured as or otherwise support a means for retrieving, by the DMS and based on contextual information associated with the query, information from a vector database accessible to the DMS, where the vector database includes one or more vectors including data associated with one or more snapshots obtained by the DMS of a computing system (e.g., associated with the customer of the DMS). The DMS Manager 1020 may be configured as or otherwise support a means for generating, by the DMS and based on the query and the information, a prompt for the LLM. The DMS Manager 1020 may be configured as or otherwise support a means for providing, by the DMS via the application, a response to the querying that is based on the prompt and the LLM.

Additionally, or alternatively, the DMS Manager 1020 may be configured as or otherwise support a means for obtaining, by a DMS, a first snapshot of a computing system (e.g., associated with a customer of the DMS), where the first snapshot includes data associated with a set of files. The DMS Manager 1020 may be configured as or otherwise support a means for determining, by the DMS, from among the set of files, a first subset of files or portions of files that include sensitive information. The DMS Manager 1020 may be configured as or otherwise support a means for generating, by the DMS, one or more vectors based on data associated with a second subset of files or portions of files from among the set of files, the second subset of files or portions of files exclusive of files from the first subset of files or portions of files. The DMS Manager 1020 may be configured as or otherwise support a means for adding, by the DMS, the one or more vectors to a vector database along with metadata or a pointer to the metadata, where the metadata is associated with the data from the first snapshot, and where the vector database includes a knowledge repository that is accessible to an application associated with the DMS (e.g., associated with the customer of the DMS), the application further associated with communication with an LLM.

Additionally, or alternatively, the DMS Manager 1020 may be configured as or otherwise support a means for obtaining, by a DMS, a first snapshot of a computing system associated with the DMS (e.g., associated with the customer of the DMS). The DMS Manager 1020 may be configured as or otherwise support a means for generating, by the DMS, one or more vectors based on data from the first snapshot, the one or more vectors representative of one or more respective portions of text within one or more files represented by the first snapshot. The DMS Manager 1020 may be configured as or otherwise support a means for adding, by the DMS, the one or more vectors to a vector database along with metadata or a pointer to the metadata, where the metadata is associated with the data from the first snapshot. The DMS Manager 1020 may be configured as or otherwise support a means for storing, by the DMS, the one or more respective portions of text in a secondary storage environment, where the vector database in conjunction with the secondary storage environment includes a knowledge repository that is accessible to an application associated with the DMS (e.g., associated with the customer of the DMS), the application further associated with communication with an LLM. The DMS Manager 1020 may be configured as or otherwise support a means for adding, by the DMS to a mapping log, respective indications of mappings between the one or more vectors and the one or more respective portions of text.

By including or configuring the DMS Manager 1020 in accordance with examples as described herein, the system 1005 may support techniques for RAG using backup data, which may provide one or more benefits such as, for example, improved user experience, more efficient utilization of computing resources, network resources or both, and improved scalability, among other possibilities.

Figure 11:
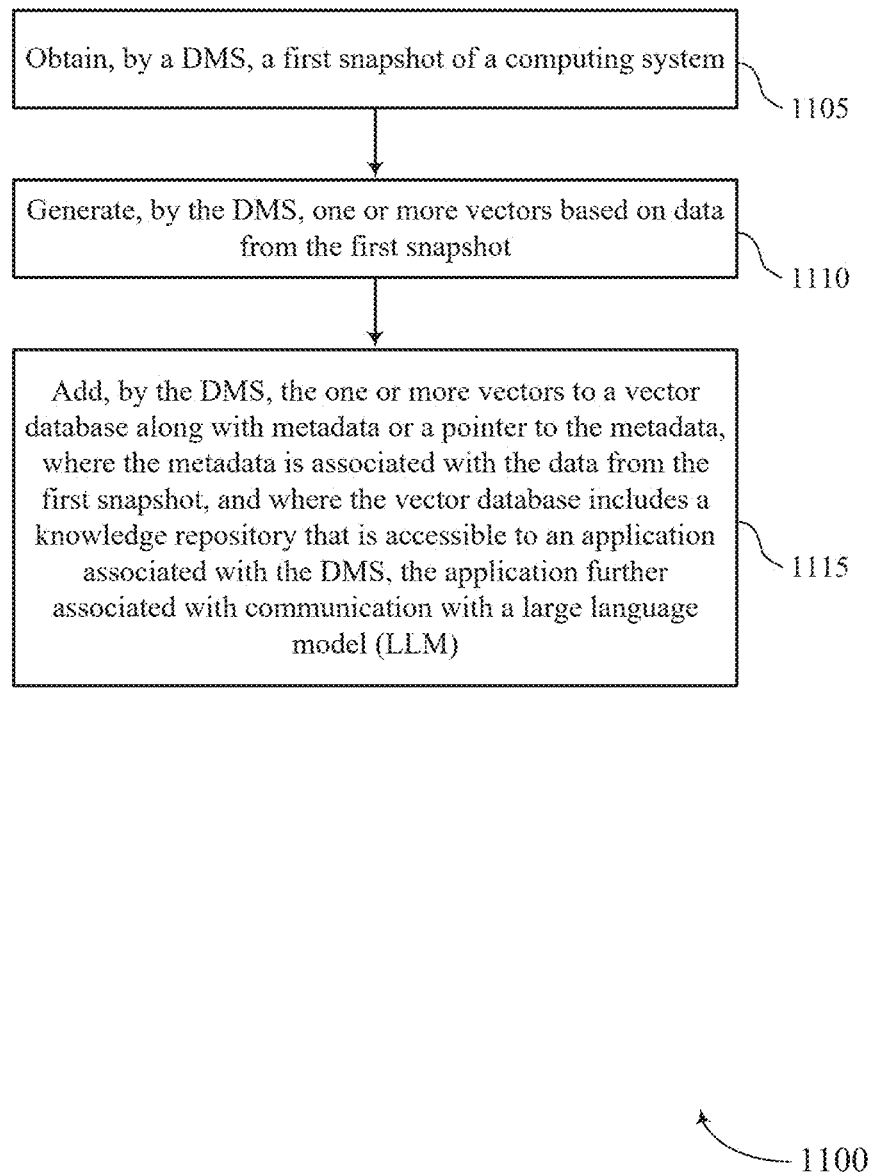
FIGS. 11 through 23 show flowcharts illustrating methods that support RAG using backup data in accordance with aspects of the present disclosure.

FIG. 11 shows a flowchart illustrating a method 1100 that supports RAG using backup data in accordance with aspects of the present disclosure. The operations of the method 1100 may be implemented by a DMS or its components as described herein. For example, the operations of the method 1100 may be performed by a DMS as described with reference to FIGS. 1 through 10. In some examples, a DMS may execute a set of instructions to control the functional elements of the DMS to perform the described functions. Additionally, or alternatively, the DMS may perform aspects of the described functions using special-purpose hardware.

At 1105, the method may include obtaining, by a DMS, a first snapshot of a computing system. The operations of 1105 may be performed in accordance with examples as disclosed herein. In some examples, aspects of the operations of 1105 may be performed by a snapshot acquisition manager 925 as described with reference to FIG. 9.

At 1110, the method may include generating, by the DMS, one or more vectors based on data from the first snapshot. The operations of 1110 may be performed in accordance with examples as disclosed herein. In some examples, aspects of the operations of 1110 may be performed by a vector generation manager 930 as described with reference to FIG. 9.

At 1115, the method may include adding, by the DMS, the one or more vectors to a vector database along with metadata or a pointer to the metadata, where the metadata is associated with the data from the first snapshot, and where the vector database includes a knowledge repository that is accessible to an application associated with the DMS, the application further associated with communication with an LLM. The operations of 1115 may be performed in accordance with examples as disclosed herein. In some examples, aspects of the operations of 1115 may be performed by a vector database manager 935 as described with reference to FIG. 9.

Figure 12:
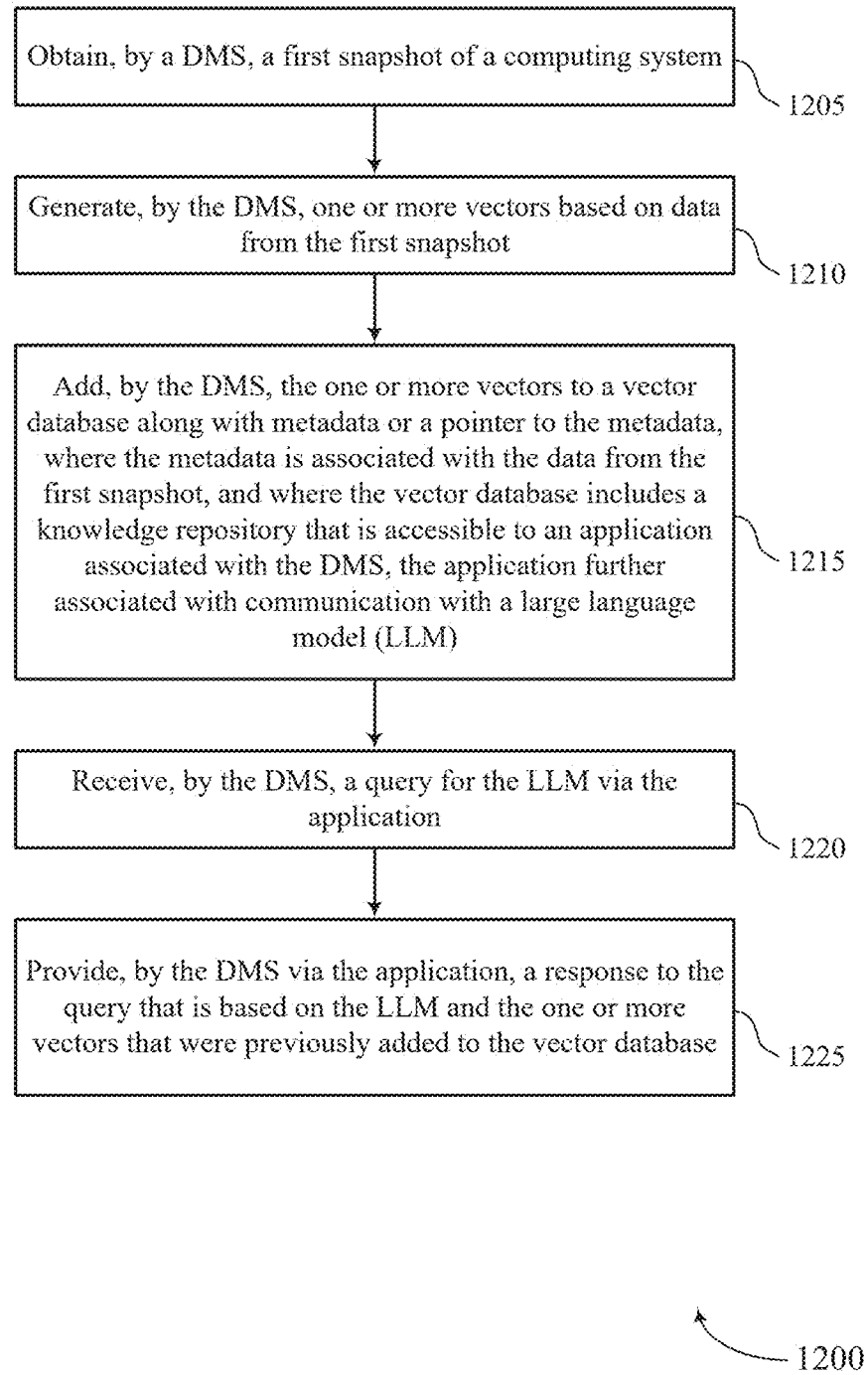

FIG. 12 shows a flowchart illustrating a method 1200 that supports RAG using backup data in accordance with aspects of the present disclosure. The operations of the method 1200 may be implemented by a DMS or its components as described herein. For example, the operations of the method 1200 may be performed by a DMS as described with reference to FIGS. 1 through 10. In some examples, a DMS may execute a set of instructions to control the functional elements of the DMS to perform the described functions. Additionally, or alternatively, the DMS may perform aspects of the described functions using special-purpose hardware.

At 1205, the method may include obtaining, by a DMS, a first snapshot of a computing system. The operations of 1205 may be performed in accordance with examples as disclosed herein. In some examples, aspects of the operations of 1205 may be performed by a snapshot acquisition manager 925 as described with reference to FIG. 9.

At 1210, the method may include generating, by the DMS, one or more vectors based on data from the first snapshot. The operations of 1210 may be performed in accordance with examples as disclosed herein. In some examples, aspects of the operations of 1210 may be performed by a vector generation manager 930 as described with reference to FIG. 9.

At 1215, the method may include adding, by the DMS, the one or more vectors to a vector database along with metadata or a pointer to the metadata, where the metadata is associated with the data from the first snapshot, and where the vector database includes a knowledge repository that is accessible to an application associated with the DMS, the application further associated with communication with an LLM. The operations of 1215 may be performed in accordance with examples as disclosed herein. In some examples, aspects of the operations of 1215 may be performed by a vector database manager 935 as described with reference to FIG. 9.

At 1220, the method may include receiving, by the DMS, a query for the LLM via the application. The operations of 1220 may be performed in accordance with examples as disclosed herein. In some examples, aspects of the operations of 1220 may be performed by an LLM query manager 940 as described with reference to FIG. 9.

At 1225, the method may include providing, by the DMS via the application, a response to the query that is based on the LLM and the one or more vectors that were previously added to the vector database. The operations of 1225 may be performed in accordance with examples as disclosed herein. In some examples, aspects of the operations of 1225 may be performed by an LLM response manager 955 as described with reference to FIG. 9.

Figure 13:
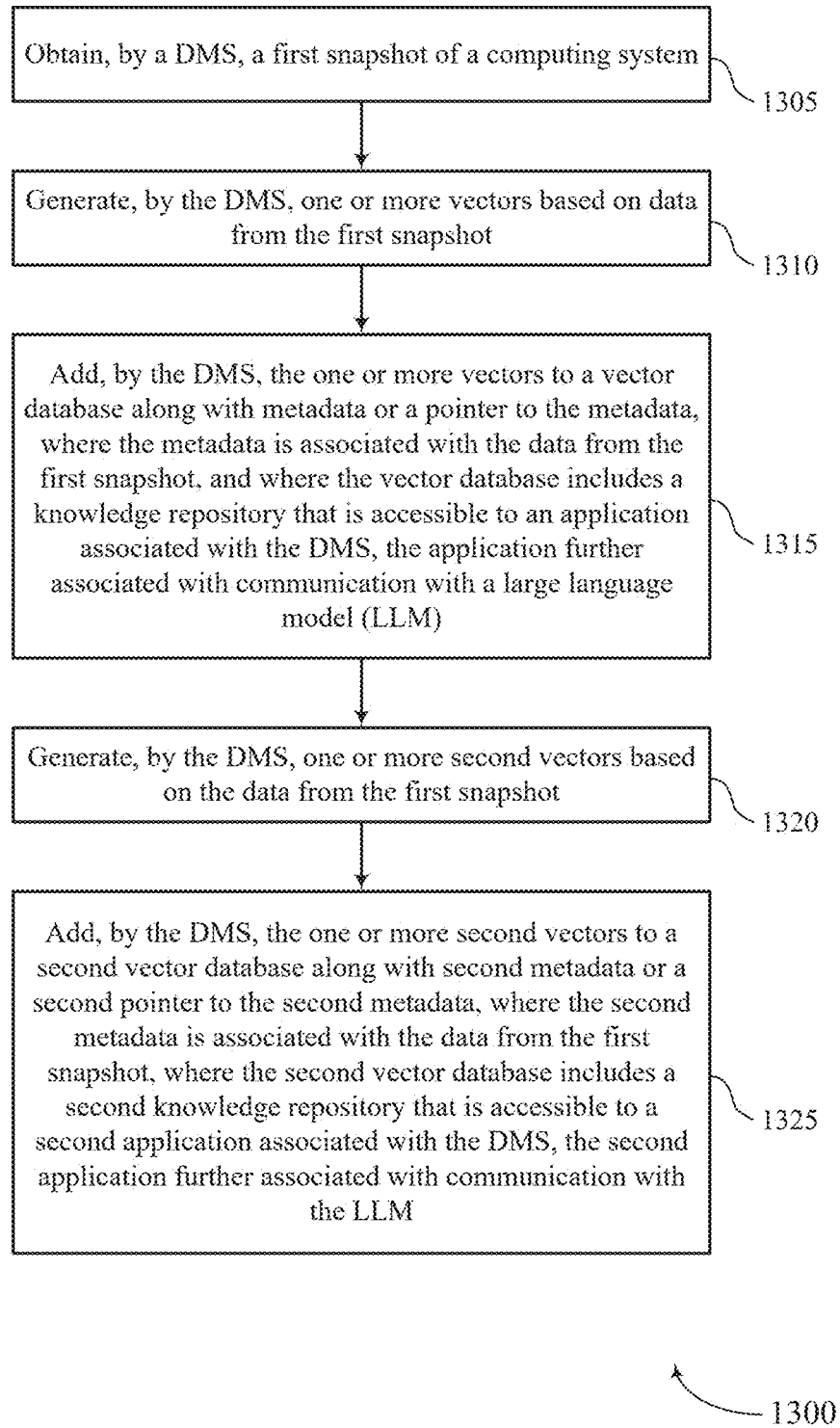

FIG. 13 shows a flowchart illustrating a method 1300 that supports RAG using backup data in accordance with aspects of the present disclosure. The operations of the method 1300 may be implemented by a DMS or its components as described herein. For example, the operations of the method 1300 may be performed by a DMS as described with reference to FIGS. 1 through 10. In some examples, a DMS may execute a set of instructions to control the functional elements of the DMS to perform the described functions. Additionally, or alternatively, the DMS may perform aspects of the described functions using special-purpose hardware.

At 1305, the method may include obtaining, by a DMS, a first snapshot of a computing system. The operations of 1305 may be performed in accordance with examples as disclosed herein. In some examples, aspects of the operations of 1305 may be performed by a snapshot acquisition manager 925 as described with reference to FIG. 9.

At 1310, the method may include generating, by the DMS, one or more vectors based on data from the first snapshot. The operations of 1310 may be performed in accordance with examples as disclosed herein. In some examples, aspects of the operations of 1310 may be performed by a vector generation manager 930 as described with reference to FIG. 9.

At 1315, the method may include adding, by the DMS, the one or more vectors to a vector database along with metadata or a pointer to the metadata, where the metadata is associated with the data from the first snapshot, and where the vector database includes a knowledge repository that is accessible to an application associated with the DMS, the application further associated with communication with an LLM. The operations of 1315 may be performed in accordance with examples as disclosed herein. In some examples, aspects of the operations of 1315 may be performed by a vector database manager 935 as described with reference to FIG. 9.

At 1320, the method may include generating, by the DMS, one or more second vectors based on the data from the first snapshot. The operations of 1320 may be performed in accordance with examples as disclosed herein. In some examples, aspects of the operations of 1320 may be performed by a vector generation manager 930 as described with reference to FIG. 9.

At 1325, the method may include adding, by the DMS, the one or more second vectors to a second vector database along with second metadata or a second pointer to the second metadata, where the second metadata is associated with the data from the first snapshot, and where the second vector database includes a second knowledge repository that is accessible to a second application associated with the customer of the DMS, the second application further associated with communication with the LLM. The operations of 1325 may be performed in accordance with examples as disclosed herein. In some examples, aspects of the operations of 1325 may be performed by a vector database manager 935 as described with reference to FIG. 9.

Figure 14:
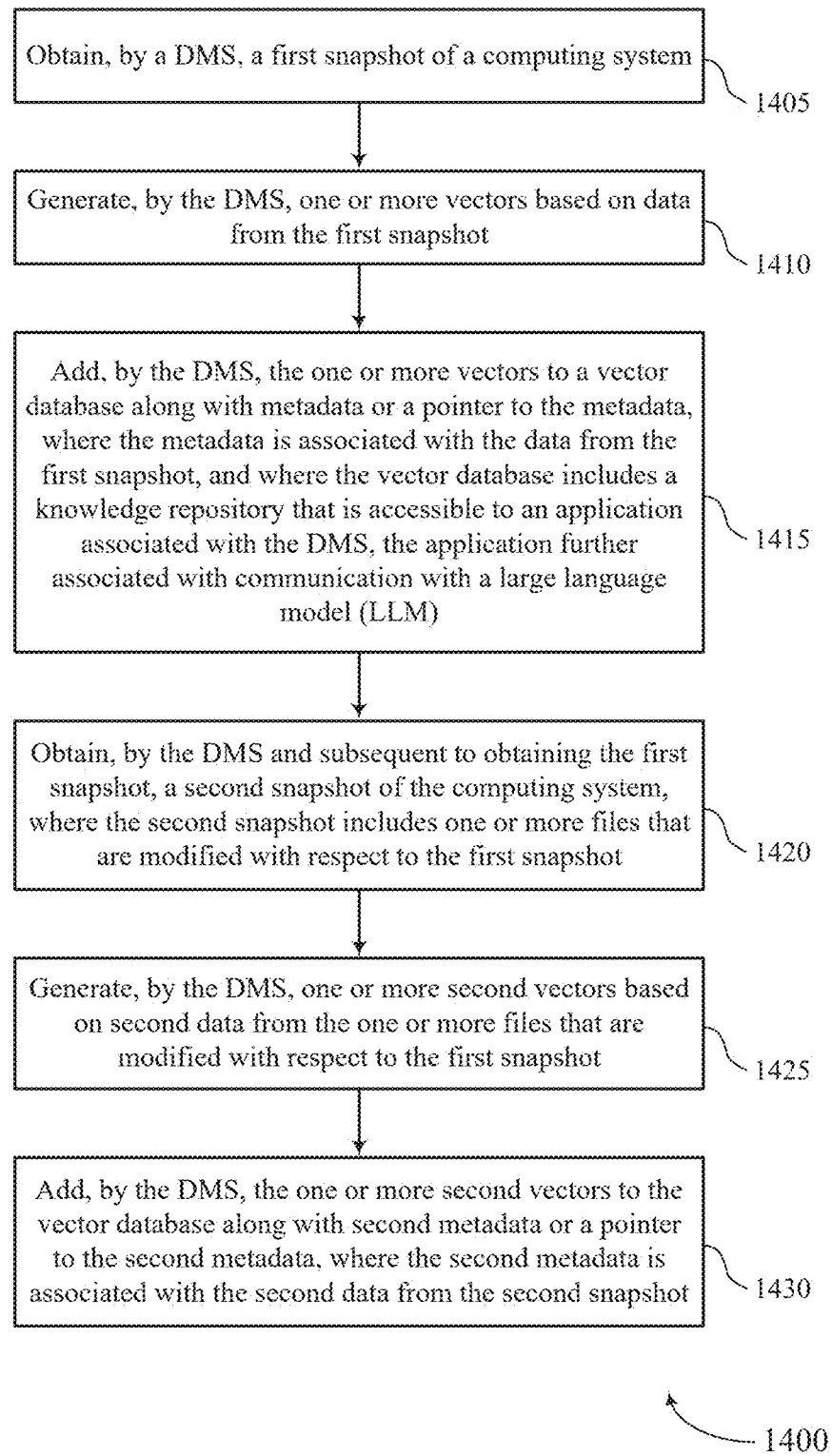

FIG. 14 shows a flowchart illustrating a method 1400 that supports RAG using backup data in accordance with aspects of the present disclosure. The operations of the method 1400 may be implemented by a DMS or its components as described herein. For example, the operations of the method 1400 may be performed by a DMS as described with reference to FIGS. 1 through 10. In some examples, a DMS may execute a set of instructions to control the functional elements of the DMS to perform the described functions. Additionally, or alternatively, the DMS may perform aspects of the described functions using special-purpose hardware.

At 1405, the method may include obtaining, by a DMS, a first snapshot of a computing system. The operations of 1405 may be performed in accordance with examples as disclosed herein. In some examples, aspects of the operations of 1405 may be performed by a snapshot acquisition manager 925 as described with reference to FIG. 9.

At 1410, the method may include generating, by the DMS, one or more vectors based on data from the first snapshot. The operations of 1410 may be performed in accordance with examples as disclosed herein. In some examples, aspects of the operations of 1410 may be performed by a vector generation manager 930 as described with reference to FIG. 9.

At 1415, the method may include adding, by the DMS, the one or more vectors to a vector database along with metadata or a pointer to the metadata, where the metadata is associated with the data from the first snapshot, and where the vector database includes a knowledge repository that is accessible to an application associated with the DMS, the application further associated with communication with an LLM. The operations of 1415 may be performed in accordance with examples as disclosed herein. In some examples, aspects of the operations of 1415 may be performed by a vector database manager 935 as described with reference to FIG. 9.

At 1420, the method may include obtaining, by the DMS and subsequent to obtaining the first snapshot, a second snapshot of the computing system, where the second snapshot includes one or more files that are modified with respect to the first snapshot. The operations of 1420 may be performed in accordance with examples as disclosed herein. In some examples, aspects of the operations of 1420 may be performed by a snapshot acquisition manager 925 as described with reference to FIG. 9.

At 1425, the method may include generating, by the DMS, one or more second vectors based on second data from the one or more files that are modified with respect to the first snapshot. The operations of 1425 may be performed in accordance with examples as disclosed herein. In some examples, aspects of the operations of 1425 may be performed by a vector generation manager 930 as described with reference to FIG. 9.

At 1430, the method may include adding, by the DMS, the one or more second vectors to the vector database along with second metadata or a second pointer to the second metadata, where the second metadata is associated with the second data from the second snapshot. The operations of 1430 may be performed in accordance with examples as disclosed herein. In some examples, aspects of the operations of 1430 may be performed by a vector database manager 935 as described with reference to FIG. 9.

Figure 15:
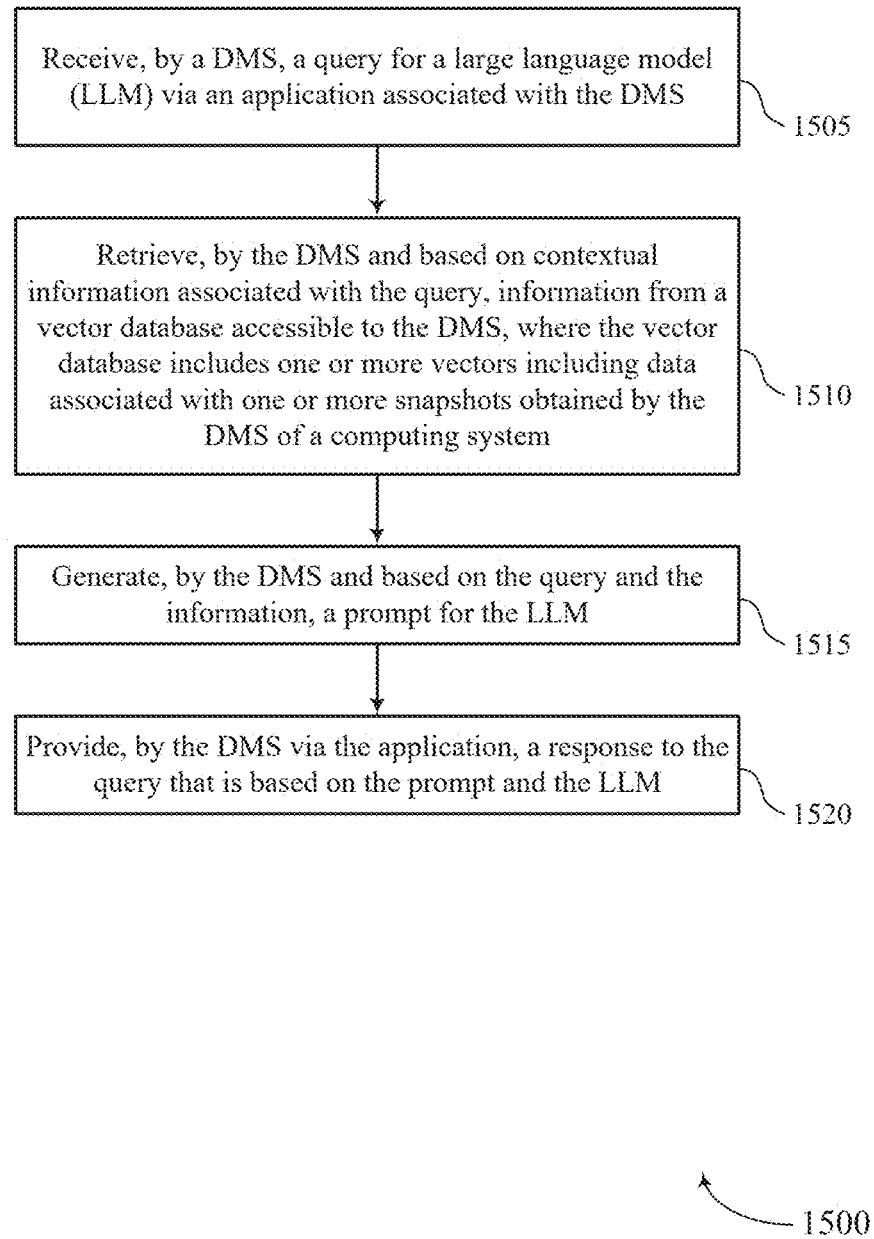

FIG. 15 shows a flowchart illustrating a method 1500 that supports RAG using backup data in accordance with aspects of the present disclosure. The operations of the method 1500 may be implemented by a DMS or its components as described herein. For example, the operations of the method 1500 may be performed by a DMS as described with reference to FIGS. 1 through 10. In some examples, a DMS may execute a set of instructions to control the functional elements of the DMS to perform the described functions. Additionally, or alternatively, the DMS may perform aspects of the described functions using special-purpose hardware.

At 1505, the method may include receiving, by a DMS, a query for an LLM via an application associated with the DMS. The operations of 1505 may be performed in accordance with examples as disclosed herein. In some examples, aspects of the operations of 1505 may be performed by an LLM query manager 940 as described with reference to FIG. 9.

At 1510, the method may include retrieving, by the DMS and based on contextual information associated with the query, information from a vector database accessible to the DMS, where the vector database includes one or more vectors including data associated with one or more snapshots obtained by the DMS of a computing system. The operations of 1510 may be performed in accordance with examples as disclosed herein. In some examples, aspects of the operations of 1510 may be performed by a RAG manager 945 as described with reference to FIG. 9.

At 1515, the method may include generating, by the DMS and based on the query and the information, a prompt for the LLM. The operations of 1515 may be performed in accordance with examples as disclosed herein. In some examples, aspects of the operations of 1515 may be performed by an LLM prompt manager 950 as described with reference to FIG. 9.

At 1520, the method may include providing, by the DMS via the application, a response to the query that is based on the prompt and the LLM. The operations of 1520 may be performed in accordance with examples as disclosed herein. In some examples, aspects of the operations of 1520 may be performed by an LLM response manager 955 as described with reference to FIG. 9.

Figure 16:
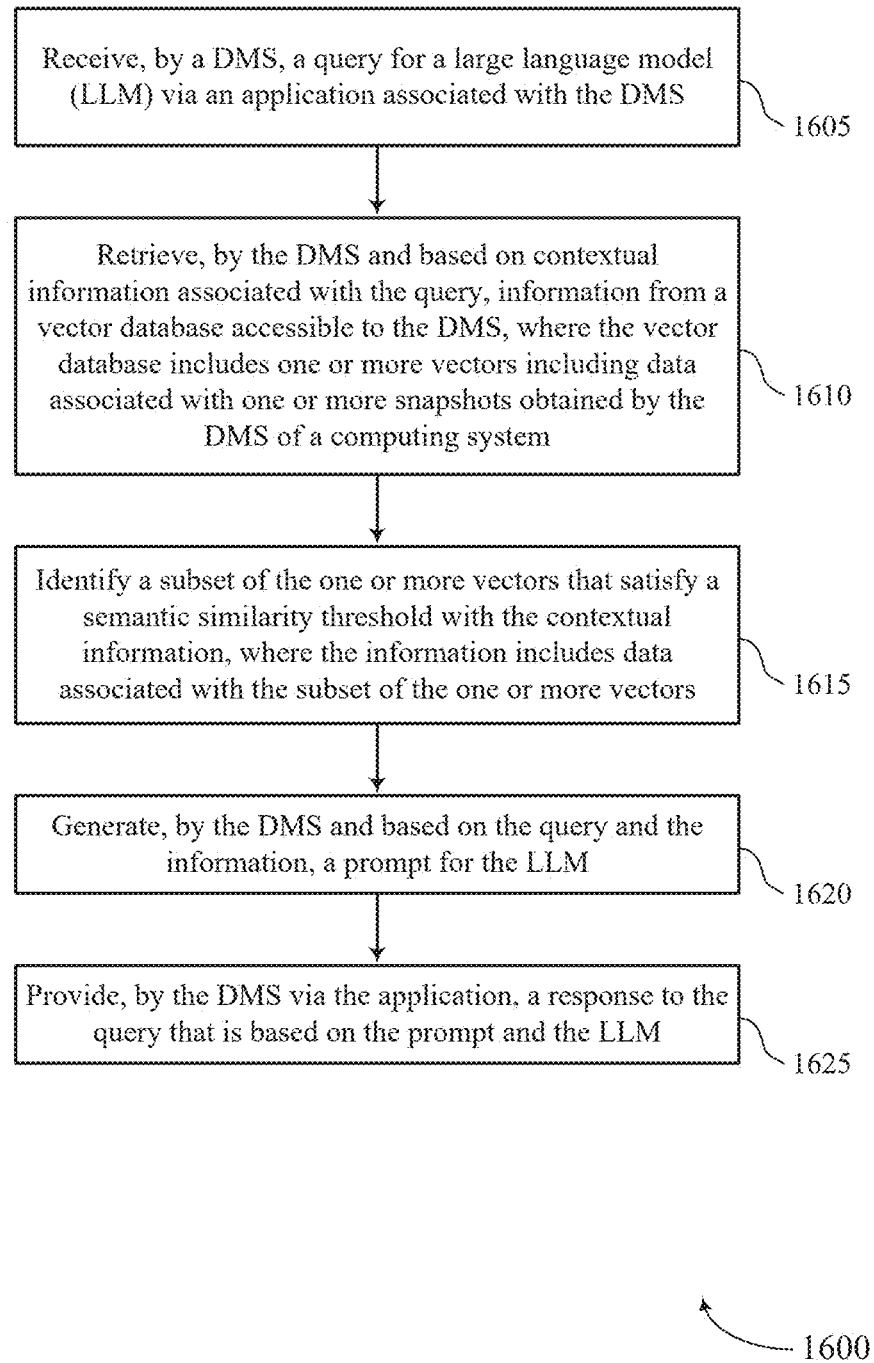

FIG. 16 shows a flowchart illustrating a method 1600 that supports RAG using backup data in accordance with aspects of the present disclosure. The operations of the method 1600 may be implemented by a DMS or its components as described herein. For example, the operations of the method 1600 may be performed by a DMS as described with reference to FIGS. 1 through 10. In some examples, a DMS may execute a set of instructions to control the functional elements of the DMS to perform the described functions. Additionally, or alternatively, the DMS may perform aspects of the described functions using special-purpose hardware.

At 1605, the method may include receiving, by a DMS, a query for an LLM via an application associated with the DMS. The operations of 1605 may be performed in accordance with examples as disclosed herein. In some examples, aspects of the operations of 1605 may be performed by an LLM query manager 940 as described with reference to FIG. 9.

At 1610, the method may include retrieving, by the DMS and based on contextual information associated with the query, information from a vector database accessible to the DMS, where the vector database includes one or more vectors including data associated with one or more snapshots obtained by the DMS of a computing system. The operations of 1610 may be performed in accordance with examples as disclosed herein. In some examples, aspects of the operations of 1610 may be performed by a RAG manager 945 as described with reference to FIG. 9.

At 1615, the method may include identifying a subset of the one or more vectors that satisfy a semantic similarity threshold with the contextual information, where the information includes data associated with the subset of the one or more vectors. The operations of 1615 may be performed in accordance with examples as disclosed herein. In some examples, aspects of the operations of 1615 may be performed by a RAG manager 945 as described with reference to FIG. 9.

At 1620, the method may include generating, by the DMS and based on the query and the information, a prompt for the LLM. The operations of 1620 may be performed in accordance with examples as disclosed herein. In some examples, aspects of the operations of 1620 may be performed by an LLM prompt manager 950 as described with reference to FIG. 9.

At 1625, the method may include providing, by the DMS via the application, a response to the query that is based on the prompt and the LLM. The operations of 1625 may be performed in accordance with examples as disclosed herein. In some examples, aspects of the operations of 1625 may be performed by an LLM response manager 955 as described with reference to FIG. 9.

Figure 17:
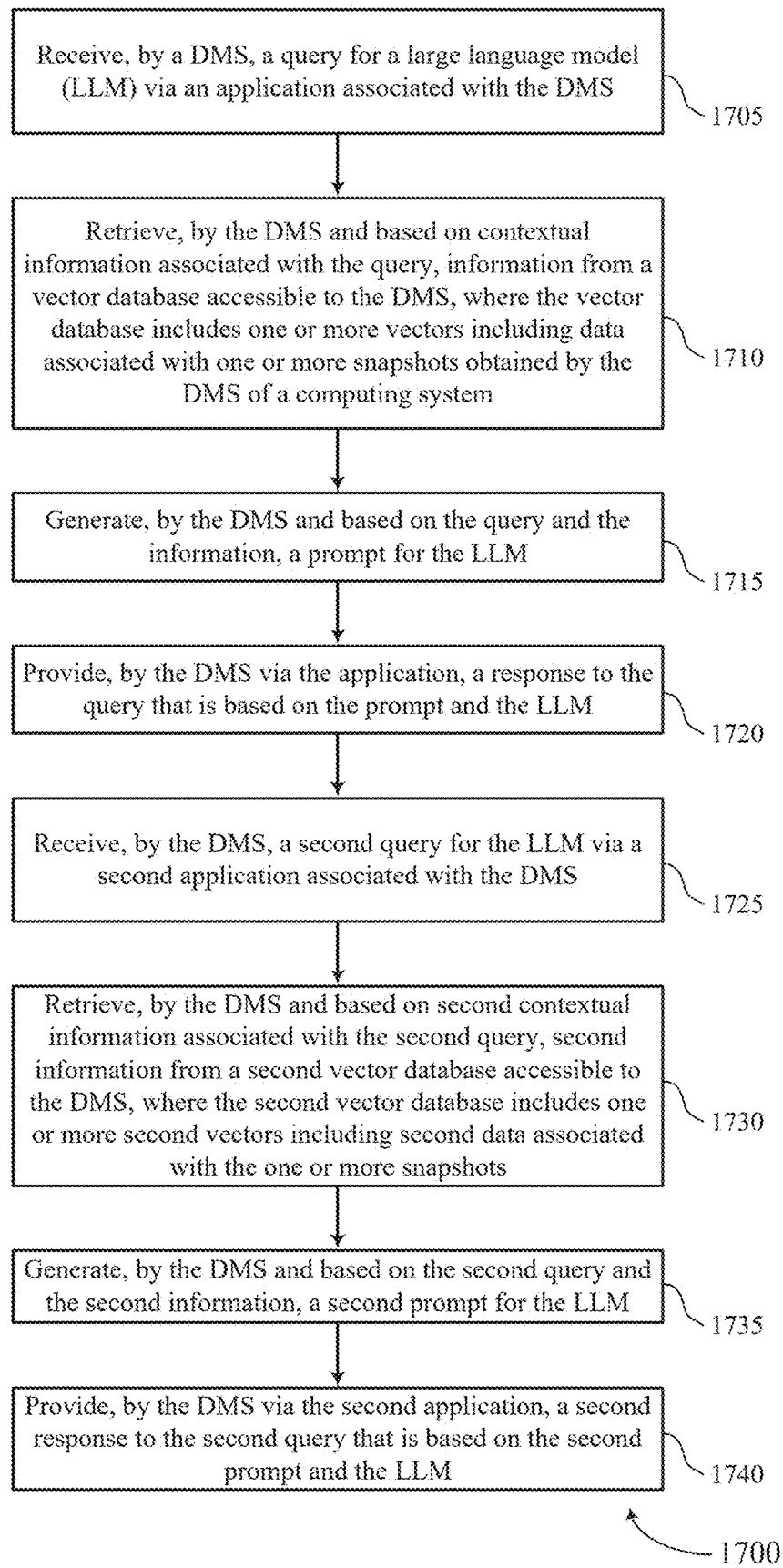

FIG. 17 shows a flowchart illustrating a method 1700 that supports RAG using backup data in accordance with aspects of the present disclosure. The operations of the method 1700 may be implemented by a DMS or its components as described herein. For example, the operations of the method 1700 may be performed by a DMS as described with reference to FIGS. 1 through 10. In some examples, a DMS may execute a set of instructions to control the functional elements of the DMS to perform the described functions. Additionally, or alternatively, the DMS may perform aspects of the described functions using special-purpose hardware.

At 1705, the method may include receiving, by a DMS, a query for an LLM via an application associated with the DMS. The operations of 1705 may be performed in accordance with examples as disclosed herein. In some examples, aspects of the operations of 1705 may be performed by an LLM query manager 940 as described with reference to FIG. 9.

At 1710, the method may include retrieving, by the DMS and based on contextual information associated with the query, information from a vector database accessible to the DMS, where the vector database includes one or more vectors including data associated with one or more snapshots obtained by the DMS of a computing system. The operations of 1710 may be performed in accordance with examples as disclosed herein. In some examples, aspects of the operations of 1710 may be performed by a RAG manager 945 as described with reference to FIG. 9.

At 1715, the method may include generating, by the DMS and based on the query and the information, a prompt for the LLM. The operations of 1715 may be performed in accordance with examples as disclosed herein. In some examples, aspects of the operations of 1715 may be performed by an LLM prompt manager 950 as described with reference to FIG. 9.

At 1720, the method may include providing, by the DMS via the application, a response to the query that is based on the prompt and the LLM. The operations of 1720 may be performed in accordance with examples as disclosed herein. In some examples, aspects of the operations of 1720 may be performed by an LLM response manager 955 as described with reference to FIG. 9.

At 1725, the method may include receiving, by the DMS, a second query for the LLM via a second application associated with the DMS. The operations of 1725 may be performed in accordance with examples as disclosed herein. In some examples, aspects of the operations of 1725 may be performed by an LLM query manager 940 as described with reference to FIG. 9.

At 1730, the method may include retrieving, by the DMS and based on second contextual information associated with the second query, second information from a second vector database accessible to the DMS, where the second vector database includes one or more second vectors including second data associated with the one or more snapshots. The operations of 1730 may be performed in accordance with examples as disclosed herein. In some examples, aspects of the operations of 1730 may be performed by a RAG manager 945 as described with reference to FIG. 9.

At 1735, the method may include generating, by the DMS and based on the second query and the second information, a second prompt for the LLM. The operations of 1735 may be performed in accordance with examples as disclosed herein. In some examples, aspects of the operations of 1735 may be performed by an LLM prompt manager 950 as described with reference to FIG. 9.

At 1740, the method may include providing, by the DMS via the second application, a second response to the second query that is based on the second prompt and the LLM. The operations of 1740 may be performed in accordance with examples as disclosed herein. In some examples, aspects of the operations of 1740 may be performed by an LLM response manager 955 as described with reference to FIG. 9.

Figure 18:
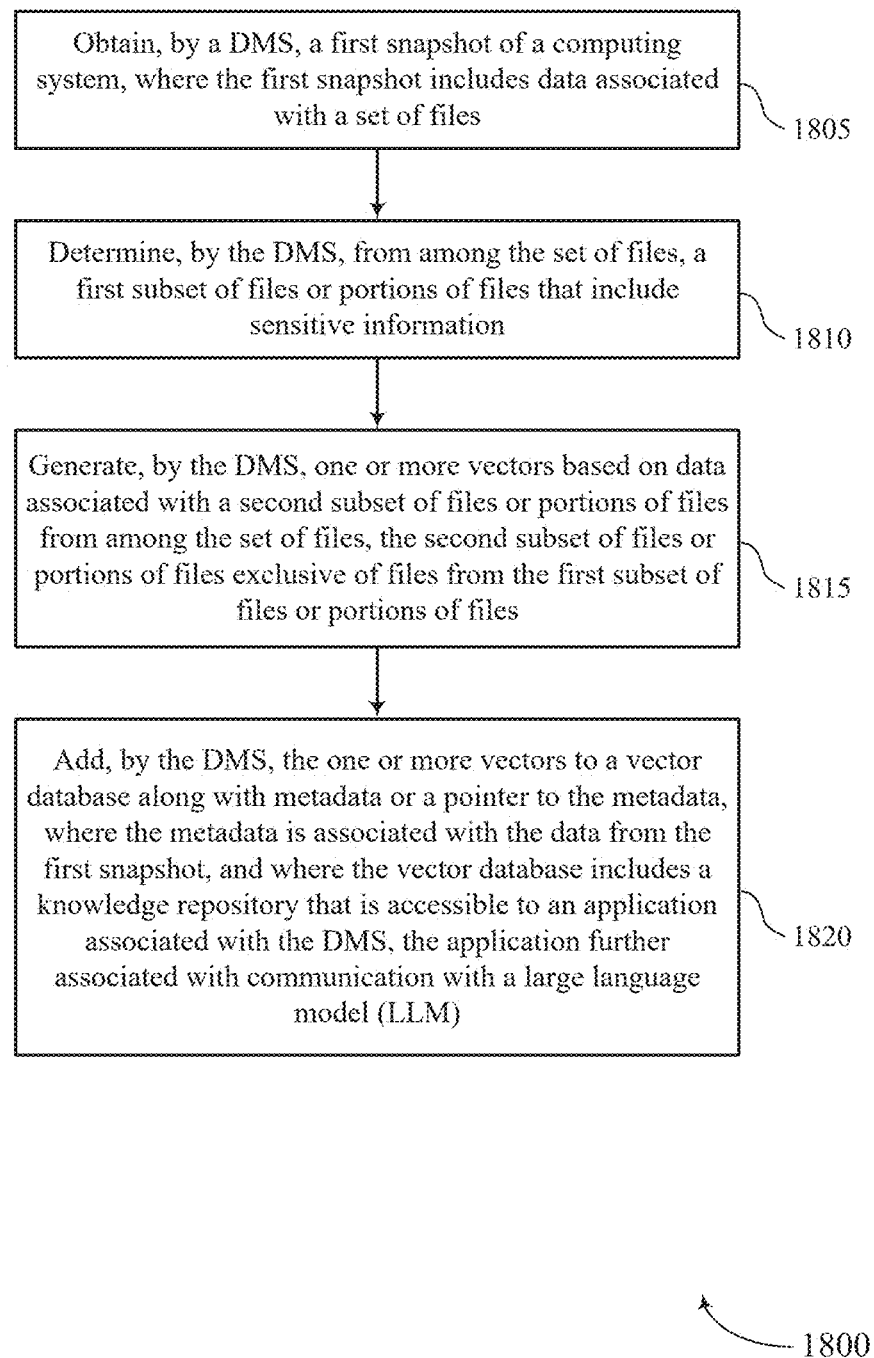

FIG. 18 shows a flowchart illustrating a method 1800 that supports RAG using backup data in accordance with aspects of the present disclosure. The operations of the method 1800 may be implemented by a DMS or its components as described herein. For example, the operations of the method 1800 may be performed by a DMS as described with reference to FIGS. 1 through 10. In some examples, a DMS may execute a set of instructions to control the functional elements of the DMS to perform the described functions. Additionally, or alternatively, the DMS may perform aspects of the described functions using special-purpose hardware.

At 1805, the method may include obtaining, by a DMS, a first snapshot of a computing system, where the first snapshot includes data associated with a set of files. The operations of 1805 may be performed in accordance with examples as disclosed herein. In some examples, aspects of the operations of 1805 may be performed by a snapshot acquisition manager 925 as described with reference to FIG. 9.

At 1810, the method may include determining, by the DMS, from among the set of files, a first subset of files or portions of files that include sensitive information. The operations of 1810 may be performed in accordance with examples as disclosed herein. In some examples, aspects of the operations of 1810 may be performed by a sensitive information detection manager 960 as described with reference to FIG. 9.

At 1815, the method may include generating, by the DMS, one or more vectors based on data associated with a second subset of files or portions of files from among the set of files, the second subset of files or portions of files exclusive of files from the first subset of files or portions of files. The operations of 1815 may be performed in accordance with examples as disclosed herein. In some examples, aspects of the operations of 1815 may be performed by a vector generation manager 930 as described with reference to FIG. 9.

At 1820, the method may include adding, by the DMS, the one or more vectors to a vector database along with metadata or a pointer to the metadata, where the metadata is associated with the data from the first snapshot, and where the vector database includes a knowledge repository that is accessible to an application associated with the DMS, the application further associated with communication with an LLM. The operations of 1820 may be performed in accordance with examples as disclosed herein. In some examples, aspects of the operations of 1820 may be performed by a vector database manager 935 as described with reference to FIG. 9.

Figure 19:
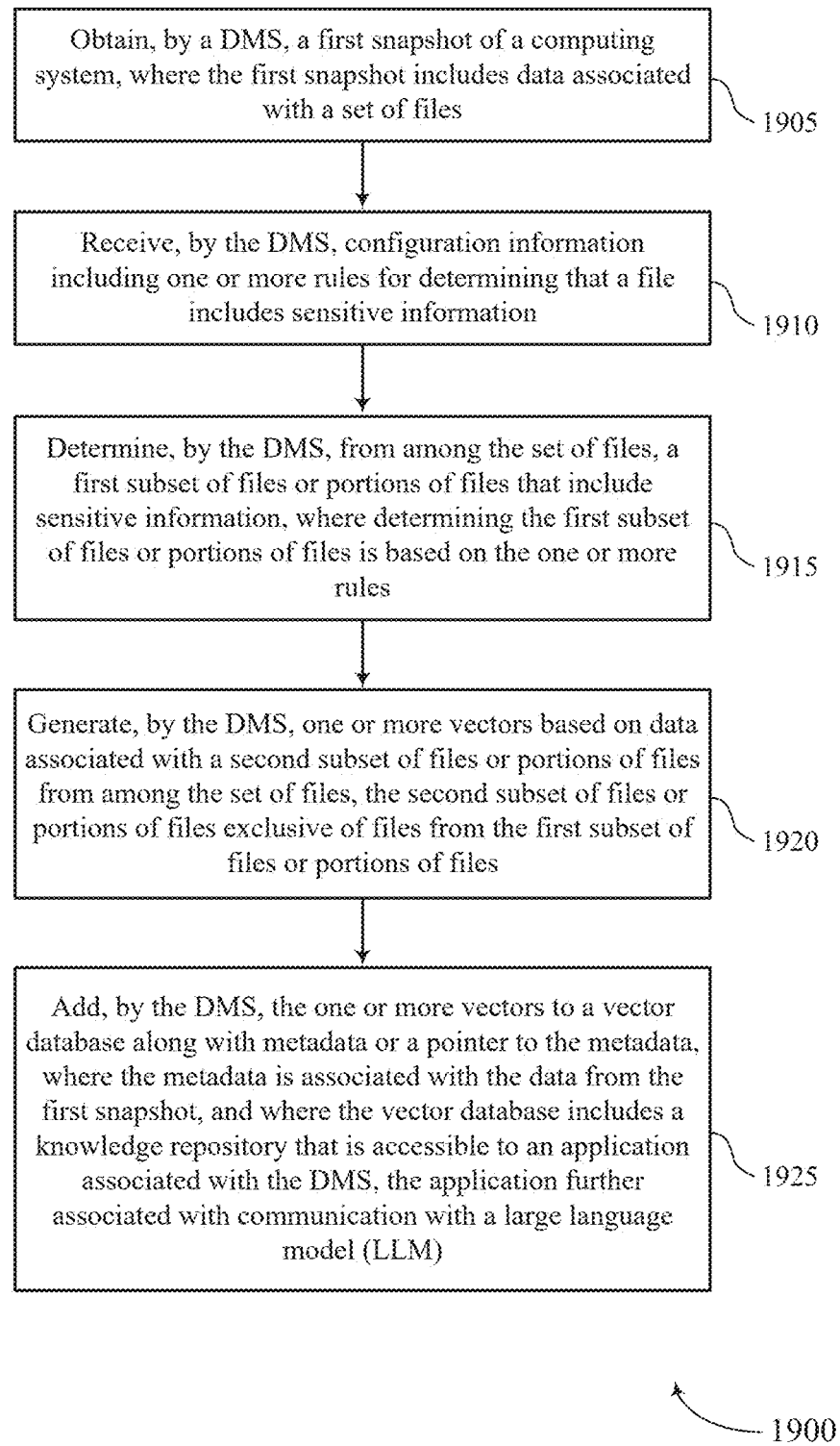

FIG. 19 shows a flowchart illustrating a method 1900 that supports RAG using backup data in accordance with aspects of the present disclosure. The operations of the method 1900 may be implemented by a DMS or its components as described herein. For example, the operations of the method 1900 may be performed by a DMS as described with reference to FIGS. 1 through 10. In some examples, a DMS may execute a set of instructions to control the functional elements of the DMS to perform the described functions. Additionally, or alternatively, the DMS may perform aspects of the described functions using special-purpose hardware.

At 1905, the method may include obtaining, by a DMS, a first snapshot of a computing system, where the first snapshot includes data associated with a set of files. The operations of 1905 may be performed in accordance with examples as disclosed herein. In some examples, aspects of the operations of 1905 may be performed by a snapshot acquisition manager 925 as described with reference to FIG. 9.

At 1910, the method may include receiving, by the DMS, configuration information including one or more rules for determining that a file includes sensitive information. The operations of 1910 may be performed in accordance with examples as disclosed herein. In some examples, aspects of the operations of 1910 may be performed by a vector generation configuration manager 975 as described with reference to FIG. 9.

At 1915, the method may include determining, by the DMS, from among the set of files, a first subset of files or portions of files that include sensitive information, where determining the first subset of files or portions of files is based on the one or more rules. The operations of 1915 may be performed in accordance with examples as disclosed herein. In some examples, aspects of the operations of 1915 may be performed by a sensitive information detection manager 960 as described with reference to FIG. 9.

At 1920, the method may include generating, by the DMS, one or more vectors based on data associated with a second subset of files or portions of files from among the set of files, the second subset of files or portions of files exclusive of files from the first subset of files or portions of files. The operations of 1920 may be performed in accordance with examples as disclosed herein. In some examples, aspects of the operations of 1920 may be performed by a vector generation manager 930 as described with reference to FIG. 9.

At 1925, the method may include adding, by the DMS, the one or more vectors to a vector database along with metadata or a pointer to the metadata, where the metadata is associated with the data from the first snapshot, and where the vector database includes a knowledge repository that is accessible to an application associated with the DMS, the application further associated with communication with an LLM. The operations of 1925 may be performed in accordance with examples as disclosed herein. In some examples, aspects of the operations of 1925 may be performed by a vector database manager 935 as described with reference to FIG. 9.

Figure 20:
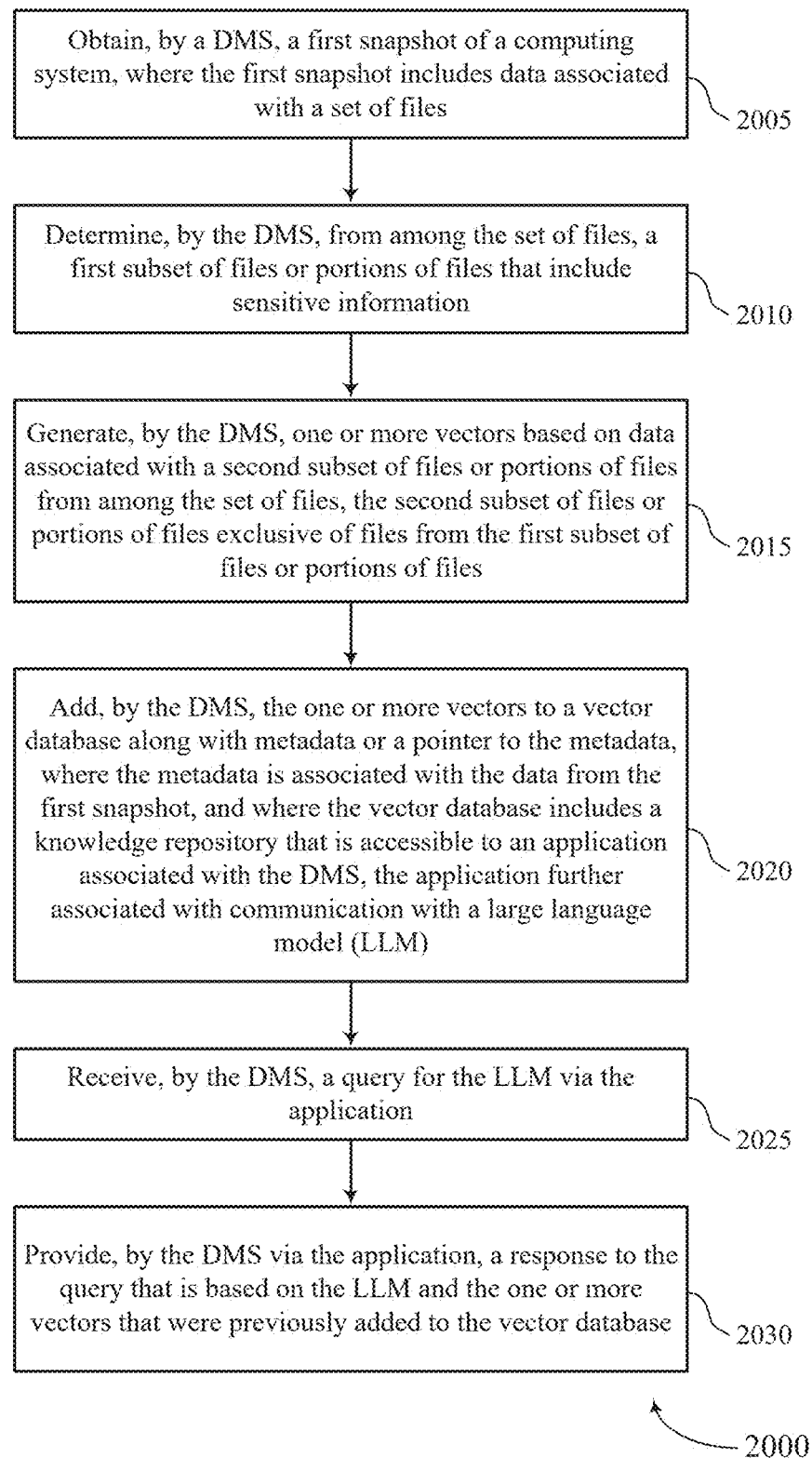

FIG. 20 shows a flowchart illustrating a method 2000 that supports RAG using backup data in accordance with aspects of the present disclosure. The operations of the method 2000 may be implemented by a DMS or its components as described herein. For example, the operations of the method 2000 may be performed by a DMS as described with reference to FIGS. 1 through 10. In some examples, a DMS may execute a set of instructions to control the functional elements of the DMS to perform the described functions. Additionally, or alternatively, the DMS may perform aspects of the described functions using special-purpose hardware.

At 2005, the method may include obtaining, by a DMS, a first snapshot of a computing system, where the first snapshot includes data associated with a set of files. The operations of 2005 may be performed in accordance with examples as disclosed herein. In some examples, aspects of the operations of 2005 may be performed by a snapshot acquisition manager 925 as described with reference to FIG. 9.

At 2010, the method may include determining, by the DMS, from among the set of files, a first subset of files or portions of files that include sensitive information. The operations of 2010 may be performed in accordance with examples as disclosed herein. In some examples, aspects of the operations of 2010 may be performed by a sensitive information detection manager 960 as described with reference to FIG. 9.

At 2015, the method may include generating, by the DMS, one or more vectors based on data associated with a second subset of files or portions of files from among the set of files, the second subset of files or portions of files exclusive of files from the first subset of files or portions of files. The operations of 2015 may be performed in accordance with examples as disclosed herein. In some examples, aspects of the operations of 2015 may be performed by a vector generation manager 930 as described with reference to FIG. 9.

At 2020, the method may include adding, by the DMS, the one or more vectors to a vector database along with metadata or a pointer to the metadata, where the metadata is associated with the data from the first snapshot, and where the vector database includes a knowledge repository that is accessible to an application associated with the DMS, the application further associated with communication with an LLM. The operations of 2020 may be performed in accordance with examples as disclosed herein. In some examples, aspects of the operations of 2020 may be performed by a vector database manager 935 as described with reference to FIG. 9.

At 2025, the method may include receiving, by the DMS, a query for the LLM via the application. The operations of 2025 may be performed in accordance with examples as disclosed herein. In some examples, aspects of the operations of 2025 may be performed by an LLM query manager 940 as described with reference to FIG. 9.

At 2030, the method may include providing, by the DMS via the application, a response to the query that is based on the LLM and the one or more vectors that were previously added to the vector database. The operations of 2030 may be performed in accordance with examples as disclosed herein. In some examples, aspects of the operations of 2030 may be performed by an LLM response manager 955 as described with reference to FIG. 9.

Figure 21:
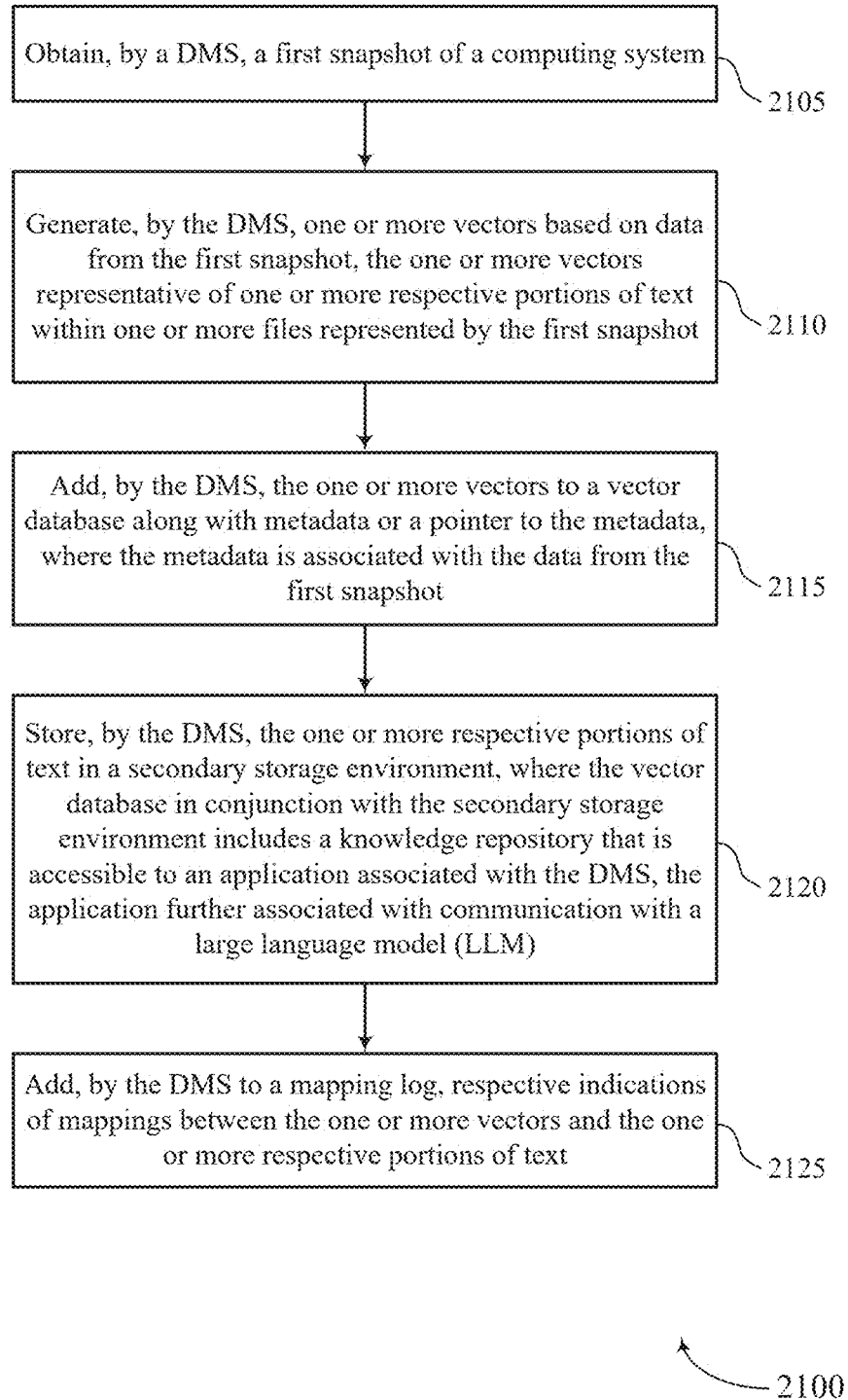

FIG. 21 shows a flowchart illustrating a method 2100 that supports RAG using backup data in accordance with aspects of the present disclosure. The operations of the method 2100 may be implemented by a DMS or its components as described herein. For example, the operations of the method 2100 may be performed by a DMS as described with reference to FIGS. 1 through 10. In some examples, a DMS may execute a set of instructions to control the functional elements of the DMS to perform the described functions. Additionally, or alternatively, the DMS may perform aspects of the described functions using special-purpose hardware.

At 2105, the method may include obtaining, by a DMS, a first snapshot of a computing system. The operations of 2105 may be performed in accordance with examples as disclosed herein. In some examples, aspects of the operations of 2105 may be performed by a snapshot acquisition manager 925 as described with reference to FIG. 9.

At 2110, the method may include generating, by the DMS, one or more vectors based on data from the first snapshot, the one or more vectors representative of one or more respective portions of text within one or more files represented by the first snapshot. The operations of 2110 may be performed in accordance with examples as disclosed herein. In some examples, aspects of the operations of 2110 may be performed by a vector generation manager 930 as described with reference to FIG. 9.

At 2115, the method may include adding, by the DMS, the one or more vectors to a vector database along with metadata or a pointer to the metadata, where the metadata is associated with the data from the first snapshot. The operations of 2115 may be performed in accordance with examples as disclosed herein. In some examples, aspects of the operations of 2115 may be performed by a vector database manager 935 as described with reference to FIG. 9.

At 2120, the method may include storing, by the DMS, the one or more respective portions of text in a secondary storage environment, where the vector database in conjunction with the secondary storage environment includes a knowledge repository that is accessible to an application associated with the DMS, the application further associated with communication with an LLM. The operations of 2120 may be performed in accordance with examples as disclosed herein. In some examples, aspects of the operations of 2120 may be performed by a text portion manager 965 as described with reference to FIG. 9.

At 2125, the method may include adding, by the DMS to a mapping log, respective indications of mappings between the one or more vectors and the one or more respective portions of text. The operations of 2125 may be performed in accordance with examples as disclosed herein. In some examples, aspects of the operations of 2125 may be performed by a vector text portion mapping manager 970 as described with reference to FIG. 9.

Figure 22:
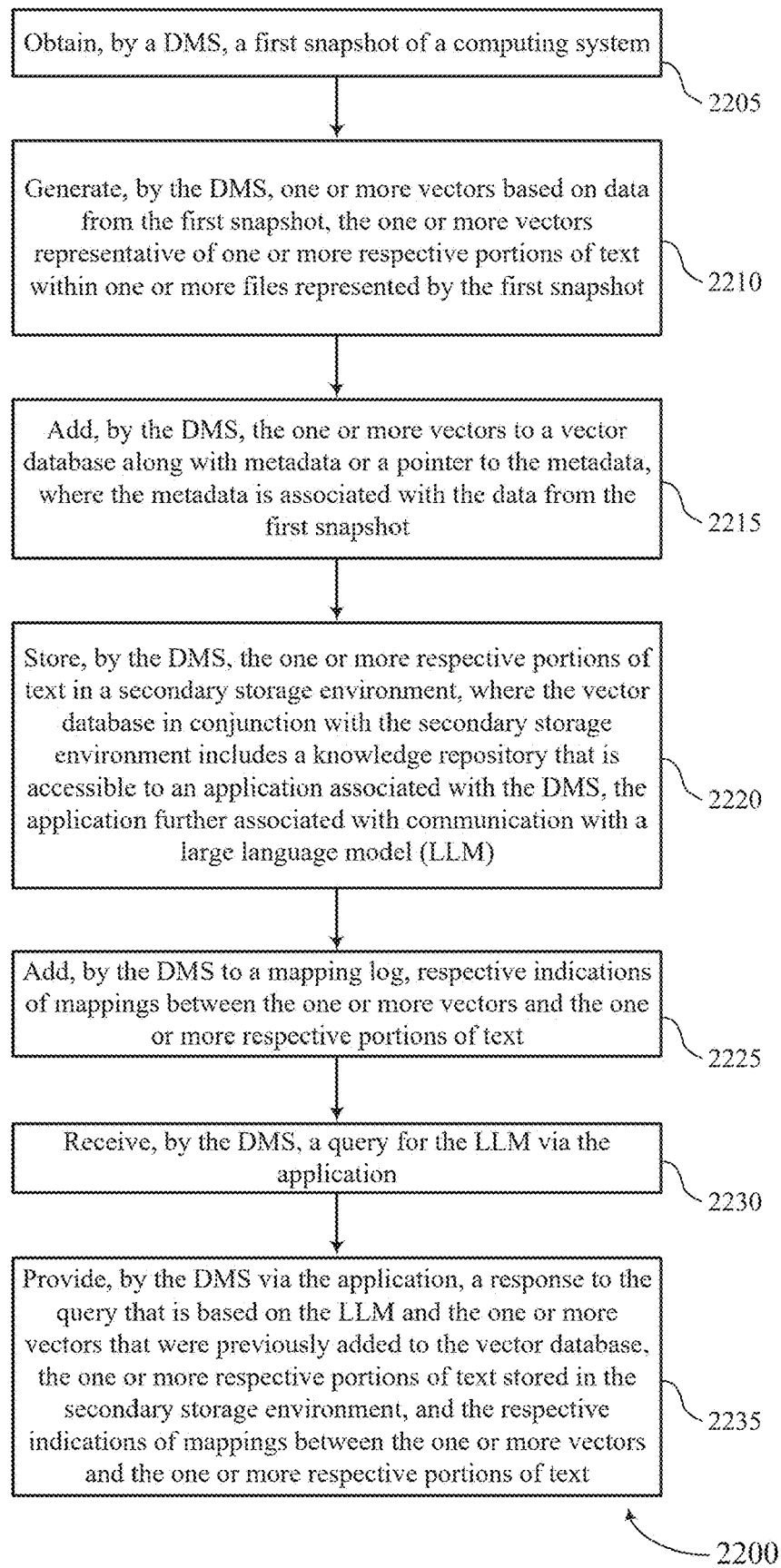

FIG. 22 shows a flowchart illustrating a method 2200 that supports RAG using backup data in accordance with aspects of the present disclosure. The operations of the method 2200 may be implemented by a DMS or its components as described herein. For example, the operations of the method 2200 may be performed by a DMS as described with reference to FIGS. 1 through 10. In some examples, a DMS may execute a set of instructions to control the functional elements of the DMS to perform the described functions. Additionally, or alternatively, the DMS may perform aspects of the described functions using special-purpose hardware.

At 2205, the method may include obtaining, by a DMS, a first snapshot of a computing system. The operations of 2205 may be performed in accordance with examples as disclosed herein. In some examples, aspects of the operations of 2205 may be performed by a snapshot acquisition manager 925 as described with reference to FIG. 9.

At 2210, the method may include generating, by the DMS, one or more vectors based on data from the first snapshot, the one or more vectors representative of one or more respective portions of text within one or more files represented by the first snapshot. The operations of 2210 may be performed in accordance with examples as disclosed herein. In some examples, aspects of the operations of 2210 may be performed by a vector generation manager 930 as described with reference to FIG. 9.

At 2215, the method may include adding, by the DMS, the one or more vectors to a vector database along with metadata or a pointer to the metadata, where the metadata is associated with the data from the first snapshot. The operations of 2215 may be performed in accordance with examples as disclosed herein. In some examples, aspects of the operations of 2215 may be performed by a vector database manager 935 as described with reference to FIG. 9.

At 2220, the method may include storing, by the DMS, the one or more respective portions of text in a secondary storage environment, where the vector database in conjunction with the secondary storage environment includes a knowledge repository that is accessible to an application associated with the DMS, the application further associated with communication with an LLM. The operations of 2220 may be performed in accordance with examples as disclosed herein. In some examples, aspects of the operations of 2220 may be performed by a text portion manager 965 as described with reference to FIG. 9.

At 2225, the method may include adding, by the DMS to a mapping log, respective indications of mappings between the one or more vectors and the one or more respective portions of text. The operations of 2225 may be performed in accordance with examples as disclosed herein. In some examples, aspects of the operations of 2225 may be performed by a vector text portion mapping manager 970 as described with reference to FIG. 9.

At 2230, the method may include receiving, by the DMS, a query for the LLM via the application. The operations of 2230 may be performed in accordance with examples as disclosed herein. In some examples, aspects of the operations of 2230 may be performed by an LLM query manager 940 as described with reference to FIG. 9.

At 2235, the method may include providing, by the DMS via the application, a response to the query that is based on the LLM and the one or more vectors that were previously added to the vector database, the one or more respective portions of text stored in the secondary storage environment, and the respective indications of mappings between the one or more vectors and the one or more respective portions of text. The operations of 2235 may be performed in accordance with examples as disclosed herein. In some examples, aspects of the operations of 2235 may be performed by an LLM response manager 955 as described with reference to FIG. 9.

Figure 23:
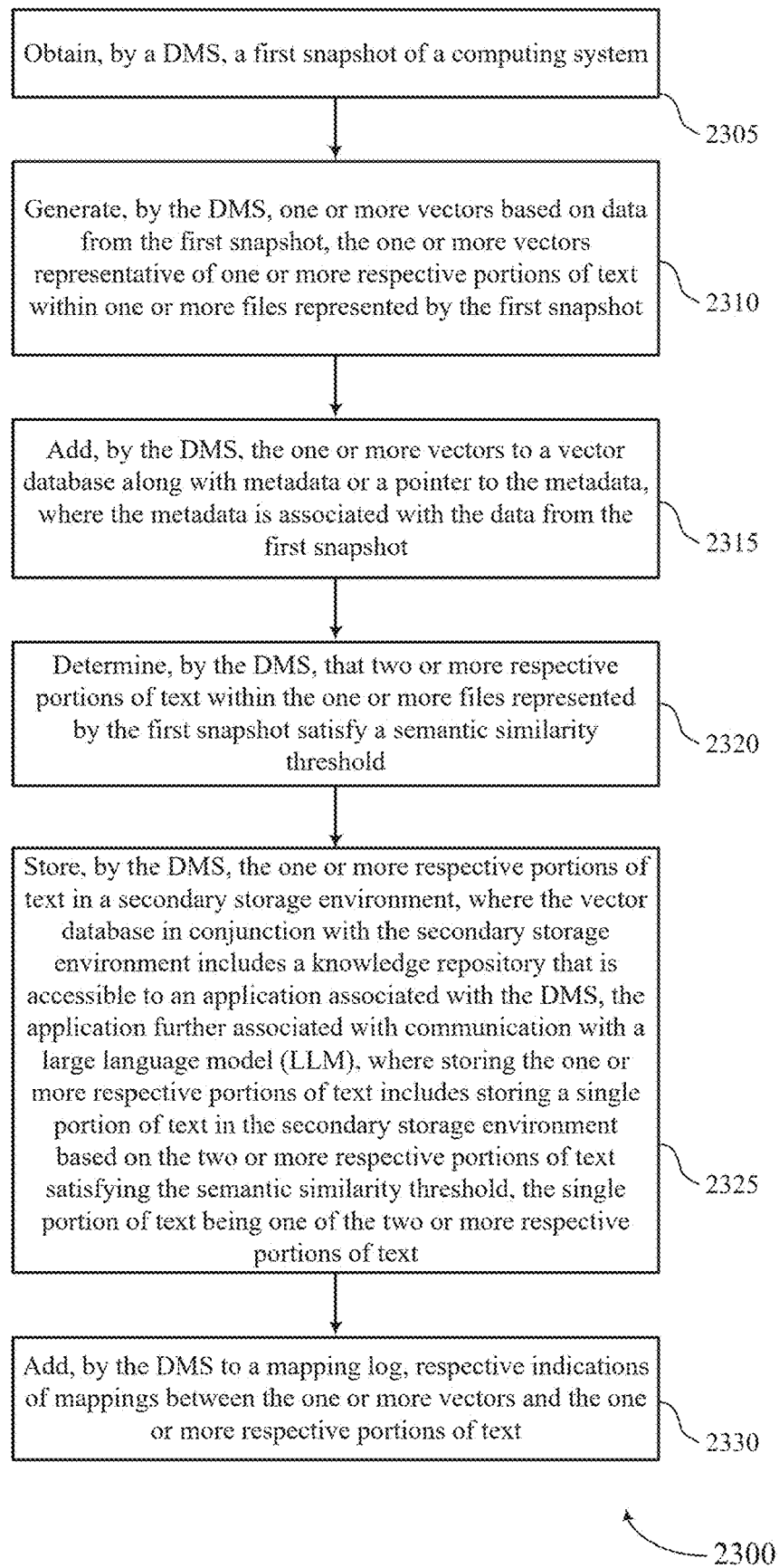

FIG. 23 shows a flowchart illustrating a method 2300 that supports RAG using backup data in accordance with aspects of the present disclosure. The operations of the method 2300 may be implemented by a DMS or its components as described herein. For example, the operations of the method 2300 may be performed by a DMS as described with reference to FIGS. 1 through 10. In some examples, a DMS may execute a set of instructions to control the functional elements of the DMS to perform the described functions. Additionally, or alternatively, the DMS may perform aspects of the described functions using special-purpose hardware.

At 2305, the method may include obtaining, by a DMS, a first snapshot of a computing system. The operations of 2305 may be performed in accordance with examples as disclosed herein. In some examples, aspects of the operations of 2305 may be performed by a snapshot acquisition manager 925 as described with reference to FIG. 9.

At 2310, the method may include generating, by the DMS, one or more vectors based on data from the first snapshot, the one or more vectors representative of one or more respective portions of text within one or more files represented by the first snapshot. The operations of 2310 may be performed in accordance with examples as disclosed herein. In some examples, aspects of the operations of 2310 may be performed by a vector generation manager 930 as described with reference to FIG. 9.

At 2315, the method may include adding, by the DMS, the one or more vectors to a vector database along with metadata or a pointer to the metadata, where the metadata is associated with the data from the first snapshot. The operations of 2315 may be performed in accordance with examples as disclosed herein. In some examples, aspects of the operations of 2315 may be performed by a vector database manager 935 as described with reference to FIG. 9.

At 2320, the method may include determining, by the DMS, that two or more respective portions of text within the one or more files represented by the first snapshot satisfy a semantic similarity threshold. The operations of 2320 may be performed in accordance with examples as disclosed herein. In some examples, aspects of the operations of 2320 may be performed by a deduplication manager 985 as described with reference to FIG. 9.

At 2325, the method may include storing, by the DMS, the one or more respective portions of text in a secondary storage environment, where the vector database in conjunction with the secondary storage environment includes a knowledge repository that is accessible to an application associated with the DMS, the application further associated with communication with an LLM, where storing the one or more respective portions of text includes storing a single portion of text in the secondary storage environment based on the two or more respective portions of text satisfying the semantic similarity threshold, the single portion of text being one of the two or more respective portions of text. The operations of 2325 may be performed in accordance with examples as disclosed herein. In some examples, aspects of the operations of 2325 may be performed by a text portion manager 965 as described with reference to FIG. 9.

At 2330, the method may include adding, by the DMS to a mapping log, respective indications of mappings between the one or more vectors and the one or more respective portions of text. The operations of 2330 may be performed in accordance with examples as disclosed herein. In some examples, aspects of the operations of 2330 may be performed by a vector text portion mapping manager 970 as described with reference to FIG. 9.

A method by an apparatus is described. The method may include obtaining, by a DMS, a first snapshot of a computing system, generating, by the DMS, one or more vectors based on data from the first snapshot, and adding, by the DMS, the one or more vectors to a vector database along with metadata or a pointer to the metadata, where the metadata is associated with the data from the first snapshot, and where the vector database includes a knowledge repository that is accessible to an application associated with the DMS, the application further associated with communication with an LLM.

An apparatus is described. The apparatus may include one or more memories storing processor executable code, and one or more processors coupled with the one or more memories. The one or more processors may individually or collectively be operable to execute the code to cause the apparatus to obtain, by a DMS, a first snapshot of a computing system, generate, by the DMS, one or more vectors based on data from the first snapshot, and add, by the DMS, the one or more vectors to a vector database along with metadata or a pointer to the metadata, where the metadata is associated with the data from the first snapshot, and where the vector database includes a knowledge repository that is accessible to an application associated with the DMS, the application further associated with communication with an LLM.

Another apparatus is described. The apparatus may include means for obtaining, by a DMS, a first snapshot of a computing system, means for generating, by the DMS, one or more vectors based on data from the first snapshot, and means for adding, by the DMS, the one or more vectors to a vector database along with metadata or a pointer to the metadata, where the metadata is associated with the data from the first snapshot, and where the vector database includes a knowledge repository that is accessible to an application associated with the DMS, the application further associated with communication with an LLM.

A non-transitory computer-readable medium storing code is described. The code may include instructions executable by one or more processors to obtain, by a DMS, a first snapshot of a computing system, generate, by the DMS, one or more vectors based on data from the first snapshot, and add, by the DMS, the one or more vectors to a vector database along with metadata or a pointer to the metadata, where the metadata is associated with the data from the first snapshot, and where the vector database includes a knowledge repository that is accessible to an application associated with the DMS, the application further associated with communication with an LLM.

Some examples of the method, apparatus, and non-transitory computer-readable medium described herein may further include operations, features, means, or instructions for receiving, by the DMS, configuration information that schedules the DMS to generate vectors for addition to the vector database in association with obtention of snapshots of the computing system, where generating the one or more vectors may be based on the configuration information.

Some examples of the method, apparatus, and non-transitory computer-readable medium described herein may further include operations, features, means, or instructions for receiving, by the DMS within the configuration information, an indication of one or more types of files for which to generate vectors for addition to the vector database and determining, by the DMS, a set of files within the first snapshot that match the one or more types of files, where the one or more vectors may be generated based on the set of files.

Some examples of the method, apparatus, and non-transitory computer-readable medium described herein may further include operations, features, means, or instructions for receiving, by the DMS, a query for the LLM via the application and providing, by the DMS via the application, a response to the query that may be based on the LLM and the one or more vectors that were previously added to the vector database.

Some examples of the method, apparatus, and non-transitory computer-readable medium described herein may further include operations, features, means, or instructions for retrieving, by the DMS and based on contextual information associated with the query, information from the vector database and generating, by the DMS and based on the query and the information, a prompt for the LLM, where the response to the query may be based on the prompt.

Some examples of the method, apparatus, and non-transitory computer-readable medium described herein may further include operations, features, means, or instructions for transmitting the prompt to the LLM and receiving, from the LLM, a reply to the prompt, where the response to the query may be based on the reply to the prompt.

In some examples of the method, apparatus, and non-transitory computer-readable medium described herein, the one or more vectors may be representative of one or more respective portions of text within one or more files represented by the first snapshot, the one or more respective portions of text stored in the vector database or in a secondary storage environment accessible to the DMS and in association with the one or more vectors and the information from the vector database includes a subset of the one or more respective portions of text that correspond to a subset of the one or more vectors identified based on the contextual information.

In some examples of the method, apparatus, and non-transitory computer-readable medium described herein, the metadata may be indicative of an identifier for the first snapshot, an identifier of the computing system, or any combination thereof.

Some examples of the method, apparatus, and non-transitory computer-readable medium described herein may further include operations, features, means, or instructions for generating, by the DMS, one or more second vectors based on the data from the first snapshot and adding, by the DMS, the one or more second vectors to a second vector database along with second metadata or a second pointer to the second metadata, where the second metadata may be associated with the data from the first snapshot, and where the second vector database includes a second knowledge repository that may be accessible to a second application associated with the DMS, the second application further associated with communication with the LLM.

In some examples of the method, apparatus, and non-transitory computer-readable medium described herein, the application may be associated with a first communication topic and the second application may be associated with a second communication topic.

Some examples of the method, apparatus, and non-transitory computer-readable medium described herein may further include operations, features, means, or instructions for receiving, by the DMS, configuration information that schedules the DMS to generate first vectors for addition to the vector database and second vectors for addition to the second vector database in association with obtention of snapshots of the computing system, where generation of the one or more vectors may be based on the configuration information, and where generation of the one or more second vectors may be based on the configuration information.

Some examples of the method, apparatus, and non-transitory computer-readable medium described herein may further include operations, features, means, or instructions for receiving, by the DMS, a second query for the LLM via the second application and providing, by the DMS via the application, a second response to the second query that may be based on the LLM and the one or more second vectors that were previously added to the second vector database.

Some examples of the method, apparatus, and non-transitory computer-readable medium described herein may further include operations, features, means, or instructions for storing, by the DMS, the first snapshot in one or more storage nodes accessible to the DMS and retrieving, by the DMS, the first snapshot from the one or more storage nodes to generate the one or more vectors.

Some examples of the method, apparatus, and non-transitory computer-readable medium described herein may further include operations, features, means, or instructions for obtaining, by the DMS and subsequent to obtaining the first snapshot, a second snapshot of the computing system, where the second snapshot includes one or more files that may be modified with respect to the first snapshot, generating, by the DMS, one or more second vectors based on second data from the one or more files that may be modified with respect to the first snapshot, and adding, by the DMS, the one or more second vectors to the vector database along with second metadata or a second pointer to the second metadata, where the second metadata may be associated with the second data from the second snapshot.

Some examples of the method, apparatus, and non-transitory computer-readable medium described herein may further include operations, features, means, or instructions for determining, by the DMS and based on the metadata, a subset of the one or more vectors corresponding to the one or more files that may be modified and deleting the subset of the one or more vectors from the vector database.

Some examples of the method, apparatus, and non-transitory computer-readable medium described herein may further include operations, features, means, or instructions for determining, by the DMS and based on the second snapshot, one or more files that may be deleted with respect to the first snapshot, determining, by the DMS and based on the metadata, a subset of the one or more vectors corresponding to the one or more files that may be deleted, and deleting the subset of the one or more vectors from the vector database.

In some examples of the method, apparatus, and non-transitory computer-readable medium described herein, each vector of the one or more vectors corresponds to a respective portion of text within a file represented by the first snapshot.

Some examples of the method, apparatus, and non-transitory computer-readable medium described herein may further include operations, features, means, or instructions for obtaining, by the DMS, a second snapshot of a second computing system associated with the DMS, generating, by the DMS, one or more second vectors based on second data from the second snapshot, and adding, by the DMS, the one or more second vectors to the vector database along with second metadata or a second pointer to the second metadata, where the second metadata may be associated with the second data from the second snapshot.

A method for data management by an apparatus is described. The method may include receiving, by a DMS, a query for an LLM via an application associated with the DMS, retrieving, by the DMS and based on contextual information associated with the query, information from a vector database accessible to the DMS, where the vector database includes one or more vectors including data associated with one or more snapshots obtained by the DMS of a computing system, generating, by the DMS and based on the query and the information, a prompt for the LLM, and providing, by the DMS via the application, a response to the query that is based on the prompt and the LLM.

An apparatus for data management is described. The apparatus may include one or more memories storing processor executable code, and one or more processors coupled with the one or more memories. The one or more processors may individually or collectively be operable to execute the code to cause the apparatus to receive, by a DMS, a query for an LLM via an application associated with the DMS, retrieve, by the DMS and based on contextual information associated with the query, information from a vector database accessible to the DMS, where the vector database includes one or more vectors including data associated with one or more snapshots obtained by the DMS of a computing system, generate, by the DMS and based on the query and the information, a prompt for the LLM, and providing, by the DMS via the application, a response to the query that is based on the prompt and the LLM.

Another apparatus for data management is described. The apparatus may include means for receiving, by a DMS, a query for an LLM via an application associated with the DMS, means for retrieving, by the DMS and based on contextual information associated with the query, information from a vector database accessible to the DMS, where the vector database includes one or more vectors including data associated with one or more snapshots obtained by the DMS of a computing system, means for generating, by the DMS and based on the query and the information, a prompt for the LLM, and means for providing, by the DMS via the application, a response to the query that is based on the prompt and the LLM.

A non-transitory computer-readable medium storing code for data management is described. The code may include instructions executable by one or more processors to receive, by a DMS, a query for an LLM via an application associated with the DMS, retrieve, by the DMS and based on contextual information associated with the query, information from a vector database accessible to the DMS, where the vector database includes one or more vectors including data associated with one or more snapshots obtained by the DMS of a computing system, generate, by the DMS and based on the query and the information, a prompt for the LLM, and providing, by the DMS via the application, a response to the query that is based on the prompt and the LLM.

In some examples of the method, apparatus, and non-transitory computer-readable medium described herein, operations, features, means, or instructions for retrieving the information from the vector database may include operations, features, means, or instructions for identifying a subset of the one or more vectors that satisfy a semantic similarity threshold with the contextual information, where the information includes data associated with the subset of the one or more vectors.

In some examples of the method, apparatus, and non-transitory computer-readable medium described herein, the one or more vectors may be representative of one or more respective portions of text within one or more files represented by the one or more snapshots, the one or more respective portions of text stored in the vector database or in a secondary storage environment accessible to the DMS and in association with the one or more vectors and the information from the vector database includes a subset of the one or more respective portions of text that correspond to the subset of the one or more vectors.

Some examples of the method, apparatus, and non-transitory computer-readable medium described herein may further include operations, features, means, or instructions for obtaining, by the DMS, the one or more snapshots, generating, by the DMS and based on obtaining the one or more snapshots, the one or more vectors, and adding, by the DMS, the one or more vectors to the vector database.

Some examples of the method, apparatus, and non-transitory computer-readable medium described herein may further include operations, features, means, or instructions for receiving, by the DMS, configuration information that schedules the DMS to generate vectors for addition to the vector database in association with obtention of snapshots of the computing system, where generating the one or more vectors may be based on the configuration information.

Some examples of the method, apparatus, and non-transitory computer-readable medium described herein may further include operations, features, means, or instructions for receiving, by the DMS within the configuration information, an indication of one or more types of files for which to generate vectors for addition to the vector database, where the one or more vectors may be generated based at least in part on one or more files in the one or more snapshots that match the one or more types of files.

Some examples of the method, apparatus, and non-transitory computer-readable medium described herein may further include operations, features, means, or instructions for receiving, by the DMS, a second query for the LLM via a second application associated with the DMS, retrieving, by the DMS and based on second contextual information associated with the second query, second information from a second vector database accessible to the DMS, where the second vector database includes one or more second vectors including second data associated with the one or more snapshots, generating, by the DMS and based on the second query and the second information, a second prompt for the LLM, and providing, by the DMS via the second application, a second response to the second query that may be based on the second prompt and the LLM.

In some examples of the method, apparatus, and non-transitory computer-readable medium described herein, the application may be associated with a first communication topic and the second application may be associated with a second communication topic.

Some examples of the method, apparatus, and non-transitory computer-readable medium described herein may further include operations, features, means, or instructions for receiving, by the DMS, configuration information that schedules the DMS to generate first vectors for addition to the vector database and second vectors for addition to the second vector database in association with obtention of snapshots of the computing system, where generation of the one or more vectors may be based on the configuration information, and where generation of the one or more second vectors may be based on the configuration information.

Some examples of the method, apparatus, and non-transitory computer-readable medium described herein may further include operations, features, means, or instructions for receiving, by the DMS, a second query for the LLM via the application, retrieving, by the DMS and based on second contextual information associated with the second query, second information from the vector database, generating, by the DMS and based on the second query and the second information, a second prompt for the LLM, and providing, by the DMS via the application, a second response to the second query that may be based on the second prompt and the LLM.

In some examples of the method, apparatus, and non-transitory computer-readable medium described herein, the vector database includes metadata associated with the one or more vectors or a pointer to the metadata, the metadata indicating a respective snapshot of the one or more snapshots associated with each of the one or more vectors, and retrieving the information may be further based on the metadata.

In some examples of the method, apparatus, and non-transitory computer-readable medium described herein, retrieving the information may be further based on weights assigned to dates of the one or more snapshots, and the metadata may be indicative of the dates of the one or more snapshots.

Some examples of the method, apparatus, and non-transitory computer-readable medium described herein may further include operations, features, means, or instructions for transmitting the prompt to the LLM and receiving, from the LLM, a reply to the prompt, where the response to the query may be based on the reply to the prompt.

In some examples of the method, apparatus, and non-transitory computer-readable medium described herein, operations, features, means, or instructions for receiving the query may include operations, features, means, or instructions for receiving the query via a UI associated with a user account, where the contextual information may be based on the user account.

Some examples of the method, apparatus, and non-transitory computer-readable medium described herein may further include operations, features, means, or instructions for identifying, by the DMS, one or more keywords in the query, where the contextual information may be based on the one or more keywords.

Some examples of the method, apparatus, and non-transitory computer-readable medium described herein may further include operations, features, means, or instructions for receiving, by the DMS and via a UI, a request for a communication session via the application, causing, by the DMS and at the UI in response to the request for the communication session, presentation of a set of multiple topics, and receiving, by the DMS and via the UI, an indication of a selected topic of the set of multiple topics, where the contextual information may be based on the selected topic.

A method for data management by an apparatus is described. The method may include obtaining, by a DMS, a first snapshot of a computing system, where the first snapshot includes data associated with a set of files, determining, by the DMS, from among the set of files, a first subset of files or portions of files that include sensitive information, generating, by the DMS, one or more vectors based on data associated with a second subset of files or portions of files from among the set of files, the second subset of files or portions of files exclusive of files from the first subset of files or portions of files, and adding, by the DMS, the one or more vectors to a vector database along with metadata or a pointer to the metadata, where the metadata is associated with the data from the first snapshot, and where the vector database includes a knowledge repository that is accessible to an application associated with the DMS, the application further associated with communication with an LLM.

An apparatus for data management is described. The apparatus may include one or more memories storing processor executable code, and one or more processors coupled with the one or more memories. The one or more processors may individually or collectively be operable to execute the code to cause the apparatus to obtain, by a DMS, a first snapshot of a computing system, where the first snapshot includes data associated with a set of files, determine, by the DMS, from among the set of files, a first subset of files or portions of files that include sensitive information, generate, by the DMS, one or more vectors based on data associated with a second subset of files or portions of files from among the set of files, the second subset of files or portions of files exclusive of files from the first subset of files or portions of files, and add, by the DMS, the one or more vectors to a vector database along with metadata or a pointer to the metadata, where the metadata is associated with the data from the first snapshot, and where the vector database includes a knowledge repository that is accessible to an application associated with the DMS, the application further associated with communication with an LLM.

Another apparatus for data management is described. The apparatus may include means for obtaining, by a DMS, a first snapshot of a computing system, where the first snapshot includes data associated with a set of files, means for determining, by the DMS, from among the set of files, a first subset of files or portions of files that include sensitive information, means for generating, by the DMS, one or more vectors based on data associated with a second subset of files or portions of files from among the set of files, the second subset of files or portions of files exclusive of files from the first subset of files or portions of files, and means for adding, by the DMS, the one or more vectors to a vector database along with metadata or a pointer to the metadata, where the metadata is associated with the data from the first snapshot, and where the vector database includes a knowledge repository that is accessible to an application associated with the DMS, the application further associated with communication with an LLM.

A non-transitory computer-readable medium storing code for data management is described. The code may include instructions executable by one or more processors to obtain, by a DMS, a first snapshot of a computing system, where the first snapshot includes data associated with a set of files, determine, by the DMS, from among the set of files, a first subset of files or portions of files that include sensitive information, generate, by the DMS, one or more vectors based on data associated with a second subset of files or portions of files from among the set of files, the second subset of files or portions of files exclusive of files from the first subset of files or portions of files, and add, by the DMS, the one or more vectors to a vector database along with metadata or a pointer to the metadata, where the metadata is associated with the data from the first snapshot, and where the vector database includes a knowledge repository that is accessible to an application associated with the DMS, the application further associated with communication with an LLM.

Some examples of the method, apparatus, and non-transitory computer-readable medium described herein may further include operations, features, means, or instructions for receiving, by the DMS, configuration information including one or more rules for determining that a file includes sensitive information, where determining the first subset of files or portions of files may be based on the one or more rules.

In some examples of the method, apparatus, and non-transitory computer-readable medium described herein, the one or more rules are based at least in part on a file type, inclusion of one or more keywords in a file name, inclusion of one or more keywords in text of a file, inclusion of one or more types of data structures in a file, or any combination thereof.

In some examples of the method, apparatus, and non-transitory computer-readable medium described herein, the configuration information further schedules the DMS to generate vectors for addition to the vector database in association with obtention of snapshots of the computing system and generating the one or more vectors may be based on the configuration information.

Some examples of the method, apparatus, and non-transitory computer-readable medium described herein may further include operations, features, means, or instructions for receiving, by the DMS with the configuration information, an indication of one or more types of files for which to generate vectors for addition to the vector database and determining, by the DMS, the set of files within the first snapshot that match the one or more types of files.

In some examples of the method, apparatus, and non-transitory computer-readable medium described herein, based on the first subset of files or portions of files including sensitive information, no vectors may be added to the vector database based on data associated with the first subset of files or portions of files that include sensitive information.

Some examples of the method, apparatus, and non-transitory computer-readable medium described herein may further include operations, features, means, or instructions for generating, by the DMS, one or more second vectors based on second data from the first snapshot, where the second data may be from at least some of the first subset of files or portions of files and adding, by the DMS, the one or more second vectors to a second vector database along with second metadata or a second pointer to the second metadata, where the second metadata may be associated with the data from the first snapshot, and where the second vector database includes a second knowledge repository that may be accessible to a second application associated with the DMS, the second application further associated with communication with the LLM.

Some examples of the method, apparatus, and non-transitory computer-readable medium described herein may further include operations, features, means, or instructions for receiving, by the DMS, configuration information that schedules the DMS to generate first vectors for addition to the vector database and second vectors for addition to the second vector database in association with obtention of snapshots of the computing system, where generating the one or more vectors may be based on the configuration information, and where generating the one or more second vectors may be based on the configuration information.

In some examples of the method, apparatus, and non-transitory computer-readable medium described herein, the configuration information indicates one or more first rules for determining that a file includes sensitive information in association with generating the one or more vectors and the configuration information indicates one or more second rules for determining that a file includes sensitive information in association with generating the one or more second vectors.

In some examples of the method, apparatus, and non-transitory computer-readable medium described herein, the application may be associated with a first communication topic and the second application may be associated with a second communication topic.

Some examples of the method, apparatus, and non-transitory computer-readable medium described herein may further include operations, features, means, or instructions for receiving, by the DMS, a query for the LLM via the application and providing, by the DMS via the application, a response to the query that may be based on the LLM and the one or more vectors that were previously added to the vector database.

Some examples of the method, apparatus, and non-transitory computer-readable medium described herein may further include operations, features, means, or instructions for retrieving, by the DMS and based on contextual information associated with the query, information from the vector database and generating, by the DMS and based on the query and the information, a prompt for the LLM, where the response to the query may be based on the prompt.

Some examples of the method, apparatus, and non-transitory computer-readable medium described herein may further include operations, features, means, or instructions for transmitting the prompt to the LLM and receiving, from the LLM, a reply to the prompt, where the response to the query may be based on the reply to the prompt.

In some examples of the method, apparatus, and non-transitory computer-readable medium described herein, the one or more vectors may be representative of one or more respective portions of text within one or more files of the second subset of files or portions of files, the one or more respective portions of text stored in the vector database or in a secondary storage environment accessible to the DMS and in association with the one or more vectors and the information from the vector database includes a subset of the one or more respective portions of text that correspond to a subset of the one or more vectors identified based on the contextual information.

In some examples of the method, apparatus, and non-transitory computer-readable medium described herein, the metadata may be indicative of an identifier for the first snapshot, an identifier of the computing system, or any combination thereof.

Some examples of the method, apparatus, and non-transitory computer-readable medium described herein may further include operations, features, means, or instructions for storing, by the DMS, the first snapshot in one or more storage nodes accessible to the DMS and retrieving, by the DMS, the first snapshot from the one or more storage nodes to generate the one or more vectors.

Some examples of the method, apparatus, and non-transitory computer-readable medium described herein may further include operations, features, means, or instructions for obtaining, by the DMS and subsequent to obtaining the first snapshot, a second snapshot of the computing system, where the second snapshot includes a second set of files that may be modified with respect to the first snapshot, determining, by the DMS, from among the second set of files, a third subset of files or portions of files that include sensitive information, generating, by the DMS, one or more second vectors based on data associated with a fourth subset of files or portions of files from among the second set of files, the fourth subset of files or portions of files exclusive of files from the third subset of files or portions of files, and adding, by the DMS, the one or more second vectors to the vector database along with second metadata or a second pointer to the second metadata, where the second metadata may be associated with the second snapshot.

Some examples of the method, apparatus, and non-transitory computer-readable medium described herein may further include operations, features, means, or instructions for determining, by the DMS and based on the metadata, a subset of the one or more vectors corresponding to the second set of files that may be modified and deleting the subset of the one or more vectors from the vector database.

Some examples of the method, apparatus, and non-transitory computer-readable medium described herein may further include operations, features, means, or instructions for determining, by the DMS and based on the second snapshot, one or more files that may be deleted with respect to the first snapshot, determining, by the DMS and based on the metadata, a subset of the one or more vectors corresponding to the one or more files that may be deleted, and deleting the subset of the one or more vectors from the vector database.

In some examples of the method, apparatus, and non-transitory computer-readable medium described herein, each vector of the one or more vectors corresponds to a respective portion of text within a file represented by the first snapshot.

A method by an apparatus is described. The method may include obtaining, by a DMS, a first snapshot of a computing system, generating, by the DMS, one or more vectors based on data from the first snapshot, the one or more vectors representative of one or more respective portions of text within one or more files represented by the first snapshot, adding, by the DMS, the one or more vectors to a vector database along with metadata or a pointer to the metadata, where the metadata is associated with the data from the first snapshot, storing, by the DMS, the one or more respective portions of text in a secondary storage environment, where the vector database in conjunction with the secondary storage environment includes a knowledge repository that is accessible to an application associated with the DMS, the application further associated with communication with an LLM, and adding, by the DMS to a mapping log, respective indications of mappings between the one or more vectors and the one or more respective portions of text.

An apparatus is described. The apparatus may include one or more memories storing processor executable code, and one or more processors coupled with the one or more memories. The one or more processors may individually or collectively be operable to execute the code to cause the apparatus to obtain, by a DMS, a first snapshot of a computing system, generate, by the DMS, one or more vectors based on data from the first snapshot, the one or more vectors representative of one or more respective portions of text within one or more files represented by the first snapshot, add, by the DMS, the one or more vectors to a vector database along with metadata or a pointer to the metadata, where the metadata is associated with the data from the first snapshot, store, by the DMS, the one or more respective portions of text in a secondary storage environment, where the vector database in conjunction with the secondary storage environment includes a knowledge repository that is accessible to an application associated with the DMS, the application further associated with communication with an LLM, and add, by the DMS to a mapping log, respective indications of mappings between the one or more vectors and the one or more respective portions of text.

Another apparatus is described. The apparatus may include means for obtaining, by a DMS, a first snapshot of a computing system, means for generating, by the DMS, one or more vectors based on data from the first snapshot, the one or more vectors representative of one or more respective portions of text within one or more files represented by the first snapshot, means for adding, by the DMS, the one or more vectors to a vector database along with metadata or a pointer to the metadata, where the metadata is associated with the data from the first snapshot, means for storing, by the DMS, the one or more respective portions of text in a secondary storage environment, where the vector database in conjunction with the secondary storage environment includes a knowledge repository that is accessible to an application associated with the DMS, the application further associated with communication with an LLM, and means for adding, by the DMS to a mapping log, respective indications of mappings between the one or more vectors and the one or more respective portions of text.

A non-transitory computer-readable medium storing code is described. The code may include instructions executable by one or more processors to obtain, by a DMS, a first snapshot of a computing system, generate, by the DMS, one or more vectors based on data from the first snapshot, the one or more vectors representative of one or more respective portions of text within one or more files represented by the first snapshot, add, by the DMS, the one or more vectors to a vector database along with metadata or a pointer to the metadata, where the metadata is associated with the data from the first snapshot, store, by the DMS, the one or more respective portions of text in a secondary storage environment, where the vector database in conjunction with the secondary storage environment includes a knowledge repository that is accessible to an application associated with the DMS, the application further associated with communication with an LLM, and add, by the DMS to a mapping log, respective indications of mappings between the one or more vectors and the one or more respective portions of text.

Some examples of the method, apparatus, and non-transitory computer-readable medium described herein may further include operations, features, means, or instructions for receiving, by the DMS, configuration information that schedules the DMS to generate vectors for addition to the vector database in association with obtention of snapshots of the computing system, where generating the one or more vectors may be based on the configuration information.

Some examples of the method, apparatus, and non-transitory computer-readable medium described herein may further include operations, features, means, or instructions for receiving, by the DMS within the configuration information, an indication to store the one or more respective portions of text in the secondary storage environment.

Some examples of the method, apparatus, and non-transitory computer-readable medium described herein may further include operations, features, means, or instructions for receiving, by the DMS within the configuration information, an indication of one or more types of files for which to generate vectors for addition to the vector database and identifying, by the DMS, a set of files within the first snapshot including the one or more types of files, where the one or more vectors may be generated based on the set of files.

Some examples of the method, apparatus, and non-transitory computer-readable medium described herein may further include operations, features, means, or instructions for receiving, by the DMS, a query for the LLM via the application and providing, by the DMS via the application, a response to the query that may be based on the LLM and the one or more vectors that were previously added to the vector database, the one or more respective portions of text stored in the secondary storage environment, and the respective indications of mappings between the one or more vectors and the one or more respective portions of text.

Some examples of the method, apparatus, and non-transitory computer-readable medium described herein may further include operations, features, means, or instructions for identifying, by the DMS and based on contextual information associated with the query, a subset of the one or more vectors, identifying, by the DMS and based on the mapping log, a subset of the one or more respective portions of text that corresponds to the subset of the one or more vectors, retrieving, based on identifying the subset of the one or more respective portions of text, the subset of the one or more respective portions of text from the secondary storage environment, and generating, by the DMS and based on the query and the subset of the one or more respective portions of text, a prompt for the LLM, where the response to the query may be based on the prompt.

Some examples of the method, apparatus, and non-transitory computer-readable medium described herein may further include operations, features, means, or instructions for transmitting the prompt to the LLM and receiving, from the LLM, a reply to the prompt, where the response to the query may be based on the reply to the prompt.

In some examples of the method, apparatus, and non-transitory computer-readable medium described herein, identifying the subset of the one or more vectors may include operations, features, means, or instructions for determining that each vector within the subset of the one or more vectors satisfies a semantic similarity threshold with the contextual information.

Some examples of the method, apparatus, and non-transitory computer-readable medium described herein may further include operations, features, means, or instructions for determining, by the DMS, that two or more respective portions of text within the one or more files represented by the first snapshot satisfy a semantic similarity threshold, where storing the one or more respective portions of text includes storing a single portion of text in the secondary storage environment based on the two or more respective portions of text satisfying the semantic similarity threshold, the single portion of text being one of the two or more respective portions of text.

Some examples of the method, apparatus, and non-transitory computer-readable medium described herein may further include operations, features, means, or instructions for determining, by the DMS, a satisfaction of a semantic similarity threshold between a respective portion of text of the one or more respective portions of text and a prior respective portion of text within one or more second files represented by a second snapshot of the computing system, the second snapshot corresponding to an earlier time than the first snapshot, where the prior respective portion of text may be stored at the secondary storage environment, deleting, based on determining of the satisfaction of the semantic similarity threshold, the prior respective portion of text from the secondary storage environment, and deleting, based on determining of the satisfaction of the semantic similarity threshold and based on the mapping log, a vector from the vector database that corresponds to the prior respective portion of text.

Some examples of the method, apparatus, and non-transitory computer-readable medium described herein may further include operations, features, means, or instructions for determining, by the DMS, a satisfaction of a semantic similarity threshold between a respective portion of text of the one or more respective portions of text and a prior respective portion of text within one or more second files represented by a second snapshot of the computing system, the second snapshot corresponding to an earlier time than the first snapshot, where the prior respective portion of text may be stored at the secondary storage environment, refraining, based on determining of the satisfaction of the semantic similarity threshold, from storing the respective portion of text in the secondary storage environment, and refraining, based on determining of the satisfaction of the semantic similarity threshold, from adding a vector that corresponds to the respective portion of text to the vector database.

In some examples of the method, apparatus, and non-transitory computer-readable medium described herein, the metadata may be indicative of an identifier for the first snapshot, an identifier of the computing system, or any combination thereof.

Some examples of the method, apparatus, and non-transitory computer-readable medium described herein may further include operations, features, means, or instructions for generating, by the DMS, one or more second vectors based on data from the first snapshot, the one or more second vectors representative of one or more second respective portions of text within one or more second files represented by the first snapshot, adding, by the DMS, the one or more second vectors to a second vector database along with second metadata or a second pointer to the second metadata, where the second metadata may be associated with the data from the first snapshot, storing, by the DMS, the one or more second respective portions of text in the secondary storage environment, where the second vector database in conjunction with the secondary storage environment includes a second knowledge repository that may be accessible to a second application associated with the DMS, the second application further associated with communication with the LLM, and adding, by the DMS to the mapping log or a second mapping log, second respective indications of mappings between the one or more second vectors and the one or more second respective portions of text.

In some examples of the method, apparatus, and non-transitory computer-readable medium described herein, the application may be associated with a first communication topic, and the second application may be associated with a second communication topic.

Some examples of the method, apparatus, and non-transitory computer-readable medium described herein may further include operations, features, means, or instructions for receiving, by the DMS, a second query for the LLM via the second application and providing, by the DMS via the second application, a second response to the second query that may be based on the LLM and the one or more second vectors that were previously added to the second vector database, the one or more second respective portions of text stored in the secondary storage environment, and the second respective indications of mappings between the one or more second vectors and the one or more second respective portions of text.

Some examples of the method, apparatus, and non-transitory computer-readable medium described herein may further include operations, features, means, or instructions for storing, by the DMS, the first snapshot in one or more storage nodes accessible to the DMS and retrieving, by the DMS, the first snapshot from the one or more storage nodes to generate the one or more vectors and to store the one or more respective portions of text in the secondary storage environment.

Some examples of the method, apparatus, and non-transitory computer-readable medium described herein may further include operations, features, means, or instructions for obtaining, by the DMS and subsequent to obtaining the first snapshot, a second snapshot of the computing system, where the second snapshot includes one or more second files that may be modified with respect to the first snapshot, generating, by the DMS, one or more second vectors based on second data from the second snapshot, the one or more second vectors representative of one or more second respective portions of text within the one or more second files that may be modified with respect to the first snapshot, adding, by the DMS, the one or more second vectors to the vector database along with second metadata or a second pointer to the second metadata, where the second metadata may be associated with the second data from the second snapshot, storing, by the DMS, the one or more second respective portions of text in the secondary storage environment, and adding, by the DMS to the mapping log, second respective indications of mappings between the one or more second vectors and the one or more second respective portions of text.

Some examples of the method, apparatus, and non-transitory computer-readable medium described herein may further include operations, features, means, or instructions for identifying, by the DMS and based on the metadata, a subset of the one or more vectors corresponding to the one or more second files that may be modified, deleting the subset of the one or more vectors from the vector database, and deleting, based on the mapping log, a subset of the one or more respective portions of text that correspond to the subset of the one or more vectors.

Some examples of the method, apparatus, and non-transitory computer-readable medium described herein may further include operations, features, means, or instructions for identifying, by the DMS and based on the second snapshot, one or more third files that may be deleted with respect to the first snapshot, identifying, by the DMS and based on the metadata, a subset of the one or more vectors corresponding to the one or more third files that may be deleted, deleting the subset of the one or more vectors from the vector database, and deleting, based on the mapping log, a subset of the one or more respective portions of text that correspond to the subset of the one or more vectors.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, "a component" having characteristics or performing functions may refer to "at least one of one or more components" having a particular characteristic or performing a particular function. Subsequent reference to a component introduced with the article "a" using the terms "the" or "said" refers to any or all of the one or more components. For example, a component introduced with the article "a" shall be understood to mean "one or more components," and referring to "the component" subsequently in the claims shall be understood to be equivalent to referring to "at least one of the one or more components."

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:
   obtaining, by a data management system (DMS), a first snapshot of a computing system;
   generating, by the DMS, one or more vectors based at least in part on data from the first snapshot, the one or more vectors representative of one or more respective portions of text within one or more files represented by the first snapshot;
   adding, by the DMS, the one or more vectors to a vector database along with metadata or a pointer to the metadata, wherein the metadata is associated with the data from the first snapshot;
   storing, by the DMS, the one or more respective portions of text in a secondary storage environment, wherein the vector database in conjunction with the secondary storage environment comprises a knowledge repository that is accessible to an application associated with the DMS, the application further associated with communication with a large language model (LLM); and adding, by the DMS to a mapping log, respective indications of mappings between the one or more vectors and the one or more respective portions of text.

2. The method of claim 1, further comprising:
receiving, by the DMS, configuration information that schedules the DMS to generate vectors for addition to the vector database in association with obtention of snapshots of the computing system, wherein generating the one or more vectors is based at least in part on the configuration information.

3. The method of claim 2, further comprising:
receiving, by the DMS within the configuration information, an indication to store the one or more respective portions of text in the secondary storage environment.

4. The method of claim 2, further comprising:
receiving, by the DMS within the configuration information, an indication of one or more types of files for which to generate vectors for addition to the vector database; and
identifying, by the DMS, a set of files within the first snapshot comprising the one or more types of files, wherein the one or more vectors are generated based at least in part on the set of files.

5. The method of claim 1, further comprising:
determining, by the DMS, that two or more respective portions of text within the one or more files represented by the first snapshot satisfy a semantic similarity threshold, wherein storing the one or more respective portions of text comprises storing a single portion of text in the secondary storage environment based at least in part on the two or more respective portions of text satisfying the semantic similarity threshold, the single portion of text comprising one of the two or more respective portions of text.

6. The method of claim 1, further comprising:
determining, by the DMS, a satisfaction of a semantic similarity threshold between a respective portion of text of the one or more respective portions of text and a prior respective portion of text within one or more second files represented by a second snapshot of the computing system, the second snapshot corresponding to an earlier time than the first snapshot, wherein the prior respective portion of text is stored at the secondary storage environment;
deleting, based at least in part on determining of the satisfaction of the semantic similarity threshold, the prior respective portion of text from the secondary storage environment; and
deleting, based at least in part on determining of the satisfaction of the semantic similarity threshold and based at least in part on the mapping log, a vector from the vector database that corresponds to the prior respective portion of text.

7. The method of claim 1, further comprising:
determining, by the DMS, a satisfaction of a semantic similarity threshold between a respective portion of text of the one or more respective portions of text and a prior respective portion of text within one or more second files represented by a second snapshot of the computing system, the second snapshot corresponding to an earlier time than the first snapshot, wherein the prior respective portion of text is stored at the secondary storage environment;
refraining, based at least in part on determining of the satisfaction of the semantic similarity threshold, from storing the respective portion of text in the secondary storage environment; and refraining, based at least in part on determining of the satisfaction of the semantic similarity threshold, from adding a vector that corresponds to the respective portion of text to the vector database.

8. The method of claim 1, wherein the metadata is indicative of an identifier for the first snapshot, an identifier of the computing system, or any combination thereof.

9. The method of claim 1, further comprising:
generating, by the DMS, one or more second vectors based at least in part on data from the first snapshot, the one or more second vectors representative of one or more second respective portions of text within one or more second files represented by the first snapshot;
adding, by the DMS, the one or more second vectors to a second vector database along with second metadata or a second pointer to the second metadata, wherein the second metadata is associated with the data from the first snapshot;
storing, by the DMS, the one or more second respective portions of text in the secondary storage environment, wherein the second vector database in conjunction with the secondary storage environment comprises a second knowledge repository that is accessible to a second application associated with the DMS, the second application further associated with communication with the LLM; and
adding, by the DMS to the mapping log or a second mapping log, second respective indications of mappings between the one or more second vectors and the one or more second respective portions of text.

10. The method of claim 1, further comprising:
obtaining, by the DMS and subsequent to obtaining the first snapshot, a second snapshot of the computing system, wherein the second snapshot includes one or more second files that are modified with respect to the first snapshot;
generating, by the DMS, one or more second vectors based at least in part on second data from the second snapshot, the one or more second vectors representative of one or more second respective portions of text within the one or more second files that are modified with respect to the first snapshot;
adding, by the DMS, the one or more second vectors to the vector database along with second metadata or a second pointer to the second metadata, wherein the second metadata is associated with the second data from the second snapshot;
storing, by the DMS, the one or more second respective portions of text in the secondary storage environment; and
adding, by the DMS to the mapping log, second respective indications of mappings between the one or more second vectors and the one or more second respective portions of text.

11. An apparatus, comprising:
one or more memories storing processor-executable code; and
one or more processors coupled with the one or more memories and individually or collectively operable to execute the code to cause the apparatus to:
obtain, by a data management system (DMS), a first snapshot of a computing system;
generate, by the DMS, one or more vectors based at least in part on data from the first snapshot, the one or more vectors representative of one or more respective portions of text within one or more files represented by the first snapshot;

add, by the DMS, the one or more vectors to a vector database along with metadata or a pointer to the metadata, wherein the metadata is associated with the data from the first snapshot;

store, by the DMS, the one or more respective portions of text in a secondary storage environment, wherein the vector database in conjunction with the secondary storage environment comprises a knowledge repository that is accessible to an application associated with the DMS, the application further associated with communication with a large language model (LLM); and add, by the DMS to a mapping log, respective indications of mappings between the one or more vectors and the one or more respective portions of text.

12. The apparatus of claim 11, wherein the one or more processors are individually or collectively further operable to execute the code to cause the apparatus to:

receive, by the DMS, configuration information that schedules the DMS to generate vectors for addition to the vector database in association with obtention of snapshots of the computing system, wherein the one or more processors are individually or collectively operable to execute the code to cause the apparatus to generate the one or more vectors based at least in part on the configuration information.

13. The apparatus of claim 11, wherein the one or more processors are individually or collectively further operable to execute the code to cause the apparatus to:

determine, by the DMS, that two or more respective portions of text within the one or more files represented by the first snapshot satisfy a semantic similarity threshold, wherein, to store the one or more respective portions of text, the one or more processors are individually or collectively operable to execute the code to cause the apparatus to store a single portion of text in the secondary storage environment based at least in part on the two or more respective portions of text satisfying the semantic similarity threshold, the single portion of text comprising one of the two or more respective portions of text.

14. The apparatus of claim 11, wherein the one or more processors are individually or collectively further operable to execute the code to cause the apparatus to:

determine, by the DMS, a satisfaction of a semantic similarity threshold between a respective portion of text of the one or more respective portions of text and a prior respective portion of text within one or more second files represented by a second snapshot of the computing system, the second snapshot corresponding to an earlier time than the first snapshot, wherein the prior respective portion of text is stored at the secondary storage environment;

delete, based at least in part on determining of the satisfaction of the semantic similarity threshold, the prior respective portion of text from the secondary storage environment; and delete, based at least in part on determining of the satisfaction of the semantic similarity threshold and based at least in part on the mapping log, a vector from the vector database that corresponds to the prior respective portion of text.

15. The apparatus of claim 11, wherein the one or more processors are individually or collectively further operable to execute the code to cause the apparatus to:

determine, by the DMS, a satisfaction of a semantic similarity threshold between a respective portion of text of the one or more respective portions of text and a prior respective portion of text within one or more second files represented by a second snapshot of the computing system, the second snapshot corresponding to an earlier time than the first snapshot, wherein the prior respective portion of text is stored at the secondary storage environment;

refrain, based at least in part on determining of the satisfaction of the semantic similarity threshold, from storing the respective portion of text in the secondary storage environment; and refrain, based at least in part on determining of the satisfaction of the semantic similarity threshold, from adding a vector that corresponds to the respective portion of text to the vector database.

16. A non-transitory computer-readable medium storing code, the code comprising instructions executable by one or more processors to:

obtain, by a data management system (DMS), a first snapshot of a computing system;

generate, by the DMS, one or more vectors based at least in part on data from the first snapshot, the one or more vectors representative of one or more respective portions of text within one or more files represented by the first snapshot;

add, by the DMS, the one or more vectors to a vector database along with metadata or a pointer to the metadata, wherein the metadata is associated with the data from the first snapshot;

store, by the DMS, the one or more respective portions of text in a secondary storage environment, wherein the vector database in conjunction with the secondary storage environment comprises a knowledge repository that is accessible to an application associated with the DMS, the application further associated with communication with a large language model (LLM); and add, by the DMS to a mapping log, respective indications of mappings between the one or more vectors and the one or more respective portions of text.

17. The non-transitory computer-readable medium of claim 16, wherein the instructions are further executable by the one or more processors to:

receive, by the DMS, configuration information that schedules the DMS to generate vectors for addition to the vector database in association with obtention of snapshots of the computing system, wherein the instructions are executable by the one or more processors to generate the one or more vectors is based at least in part on the configuration information.

18. The non-transitory computer-readable medium of claim 16, wherein the instructions are further executable by the one or more processors to:

determine, by the DMS, that two or more respective portions of text within the one or more files represented by the first snapshot satisfy a semantic similarity threshold, wherein, to store the one or more respective portions of text, the instructions are executable by the one or more processors to store a single portion of text in the secondary storage environment based at least in part on the two or more respective portions of text satisfying the semantic similarity threshold, the single portion of text comprising one of the two or more respective portions of text.

19. The non-transitory computer-readable medium of claim 16, wherein the instructions are further executable by the one or more processors to:

determine, by the DMS, a satisfaction of a semantic similarity threshold between a respective portion of text of the one or more respective portions of text and a prior respective portion of text within one or more second files represented by a second snapshot of the computing system, the second snapshot corresponding to an earlier time than the first snapshot, wherein the prior respective portion of text is stored at the secondary storage environment;
delete, based at least in part on determining of the satisfaction of the semantic similarity threshold, the prior respective portion of text from the secondary storage environment; and
delete, based at least in part on determining of the satisfaction of the semantic similarity threshold and based at least in part on the mapping log, a vector from the vector database that corresponds to the prior respective portion of text.

20. The non-transitory computer-readable medium of claim 16, wherein the instructions are further executable by the one or more processors to:

determine, by the DMS, a satisfaction of a semantic similarity threshold between a respective portion of text of the one or more respective portions of text and a prior respective portion of text within one or more second files represented by a second snapshot of the computing system, the second snapshot corresponding to an earlier time than the first snapshot, wherein the prior respective portion of text is stored at the secondary storage environment;
refrain, based at least in part on determining of the satisfaction of the semantic similarity threshold, from storing the respective portion of text in the secondary storage environment; and
refrain, based at least in part on determining of the satisfaction of the semantic similarity threshold, from adding a vector that corresponds to the respective portion of text to the vector database.

\* \* \* \* \*